United States Patent

[11] 3,629,859

[72] Inventors George V. Copland;
Edward W. Gass, both of Duncan, Okla.
[21] Appl. No. 876,911
[22] Filed Nov. 14, 1969
[45] Patented Dec. 21, 1971
[73] Assignee Halliburton Company
Duncan, Okla.

[54] OIL FIELD PRODUCTION AUTOMATION AND APPARATUS
52 Claims, 22 Drawing Figs.

[52] U.S. Cl. .......... 340/172.5, 235/151.1
[51] Int. Cl. .......... H04b 3/00
[50] Field of Search .......... 340/172.5; 235/151.1

[56] References Cited
UNITED STATES PATENTS

| | | | |
|---|---|---|---|
| 3,296,596 | 1/1967 | Tagusic et al. | 340/172.5 |
| 3,350,687 | 10/1967 | Gabrielson et al. | 340/172.5 X |
| 3,351,910 | 11/1967 | Miller et al. | 340/172.5 |
| 3,363,234 | 1/1968 | Erickson et al. | 340/172.5 |
| 3,403,382 | 9/1968 | Frielinghaus et al. | 340/172.5 |
| 3,438,019 | 4/1969 | Gowan | 340/172.5 X |
| 3,516,072 | 6/1970 | Wallace | 340/172.5 |

*Primary Examiner*—Gareth D. Shaw
*Assistant Examiner*—R. F. Chapuran
*Attorneys*—Burns, Doane, Swecker & Mathis and John H. Tregoning

ABSTRACT: Method and apparatus for remote computer evaluation and control of oil fields commercially installed telephone lines. Digital well condition sensors and interface circuitry for asynchronous data transmission are disclosed.

SYSTEM

FIG 1 SYSTEM

PATENTED DEC 21 1971 3,629,859

SHEET 02 OF 22

402 C DATA SET

WELL TEST UNIT

DATA TERMINAL UNIT

CONTROL LOGIC

CLOCK

CHANNEL SELECT SHIFT REGISTER

GATE

VALVE ACCUMULATOR

TRANSFER HOLD REGISTER

OUTPUT INTERFACE

OIL FIELD PRODUCTION AUTOMATION AND APPARATUS

BACKGROUND OF THE INVENTION

The subject invention relates to a method and apparatus for the acquisition of production data at a central control station from a plurality of remote well test stations, and, more specifically, to the automatic monitoring and evaluation of conditions at a plurality of distant wells and the modification of the conditions in response to the evaluation.

Producing oil wells are often widely spaced, not only in a given field, but the fields of interest to any given party may be spread across the nation and even around the world. It is often desirable to monitor the production fluid at each producing oil well, not only for volume, but also for other conditions, such as oil and gas content, temperature, salinity and pressure. The overall operation of the formation may also be of interest. Indeed, monitoring these conditions may be required by law in operations such as the comingling of leases. These conditions further may require the institution of corrective action to prevent the disasters too often prevalent in the production of oil, and to prevent waste in the form of contamination, spillage, the unnecessary handling of fluids, etc.

While data representative of conditions at the wells has in the past been gathered by recording instruments located in the fields, this monitoring has generally required the services of large numbers of personnel stationed in the fields to gather the data accumulated by the recording devices, to evaluate the data, and to perform the function of control in response to the evaluation. Inaccuracies in transcribing the data have traditionally been a problem. The assignment of a number of wells to one man has been the natural compromise between the expense attendant to large numbers of employees in the fields and the delay occasioned by the lack of an attendant immediately present in reacting to an adverse condition.

It has been proposed that the evaluation functions be performed with the assistance of computers at a central station. In an effort to implement the central evaluation and control concept, initial efforts generally involved the recording of analog data at the various well sites and the periodic collection of the data by personnel for delivery to a field office for conversion to machine readable form and for transmission to the central station. Control function commands could thereafter be relayed from the personnel at the field office to personnel at the well site for execution.

A more recent development in increasing the availability of information at the central station for evaluation purposes and in increasing the speed of execution of the command signals at the well site has involved closed circuit telegraph or telephone lines for the transmission of data, alarms and command signals. While systems such as these have provided split second control due to having the computer at the central station constantly online with the wells, the degree of control is generally quite excessive and the expense associated with the installation of a closed loop system is quite high. These systems have in general further required the installation of an analog to digital converters at each of the remote stations to interface the analog data with the transmission system. No storage of the information is normally furnished until the data is stored in the computer at the central station.

It is accordingly an object of the present invention to obviate much of the expense of installing and maintaining a closed loop system together with the waste of computer time by having the computer constantly online with the wells.

It is another object of the present invention to provide a novel method and apparatus for the remote acquisition of production data from a plurality of well test stations, each having a plurality of producing oil wells associated therewith while simultaneously controlling apparatus with the well test stations and the associated oil wells.

It is another object of the present invention to perform the above functions by the utilization of a remote third generation or time sharing programmable general purpose digital computer with 8 bit parallel data transfer from a plurality of digital data sensors at the well test station to the computer.

Another object of the present invention is to provide a novel system including a master station having digital data processing apparatus and control means for selectively generating command signals, including a plurality of remote satellite stations each having a plurality of condition responsive sensors, digital data storage means, and apparatus to be controlled, and including a conventional commercial voice quality communication system interconnecting the master station and satellite stations.

Still another object of the present invention is to provide a novel data terminal unit for selectively transmitting 8 bit parallel data from a plurality of digital data accumulators upon command from a remote computer.

Yet another object of the present invention is to provide a novel method and apparatus for the selective transmission, error checking, and execution of a command word at a remote station under the control of a master station.

A further object of the present invention is to provide a novel method and system for simultaneous plural bit parallel data transfer in one direction to, and control word transfer in the reverse direction from, a computer over commercial and conventional voice quality telephone line in which the necessity for interface apparatus between the telephone line and the computer has been eliminated.

Still a further object of the present invention is to provide a novel method and apparatus for oil field production automation which is directly expandable within the capacity of a general purpose digital computer to include additional data terminal units and additional digital transducers at each of the data terminal units.

Yet a further object of the present invention is to provide a novel system in which the maintenance and service groups are already established for the data processing and communication equipment, thereby realizing a substantial cost savings in the minimizing of the additional sensing equipment required.

Yet still another object of the present invention is to provide a novel system wherein the data is generated and handled throughout by digital techniques, thus eliminating the need for expensive analog-to-digital and digital-to-analog converters.

Yet still a further object of the present invention is to provide a novel method and system in which the time base customarily generated at the field interface terminal for the purpose of accumulating digital data over a fixed time interval is eliminated by the utilization of a bank of a digital data accumulator at the remote terminal unit responsive to the time base within the data processing equipment at the master station.

Another object of the present invention is to provide a novel method and system in which the transmission of eight parallel bits of digital data from the satellite station at rates up to 75 characters per second is controlled by timing transitions within the data set at the satellite station and which has a capacity for simultaneously receiving data up to 20 characters per second from the master station whereby the remote satellite station is under constant control of the computer at the master station even while transmitting data.

Another object of the present invention is to provide a novel method and system in which the transmission speed of the data multiplexer at the satellite station does not depend upon internal synchronization and which may use any clock speed below the maximum data transfer rate of the data transceiver, thereby accommodating the system to data lines having limited bandwidths.

Another object of the present invention is to provide a novel method and system in which an initial transmission of all ZERO's is utilized with an end transmission of all ONE's to provide a test of both data transceiver and the data transmission line.

Another object of the present invention is to provide a novel method and apparatus in which the accumulation of data may be selectively inhibited during the transmission of data from the satellite to the master station, thereby allowing multiple transmissions for an accuracy check.

These and other objects and advantages will be readily apparent to one skilled in the art to which the invention pertains from the claims and from the following literated description when read in conjunction with the appended drawings.

THE DRAWINGS

THE DETAILED DESCRIPTION

An understanding of the system of the present invention may be facilitated by a general functional description followed by a more detailed description of the components and an explanation of a typical operational sequence as set out in accordance with the following table:

TABLE OF CONTENTS

I. General System Description
II. The Master Station
A. The Computer
B. The 402 D Data Set
III. The Communication System
IV. The Satellite Station
A. The 402 C Data Set
B. The Data Terminal Unit
C. The Well Test Unit
V. Establishing the Call
VI. Transmission of Data
VII. Command Execution
VIII. Detailed Circuit Description of the Data Terminal Unit
IX. Operational Sequence of Waveform Generation

I. GENERAL SYSTEM DESCRIPTION

Figure 1:
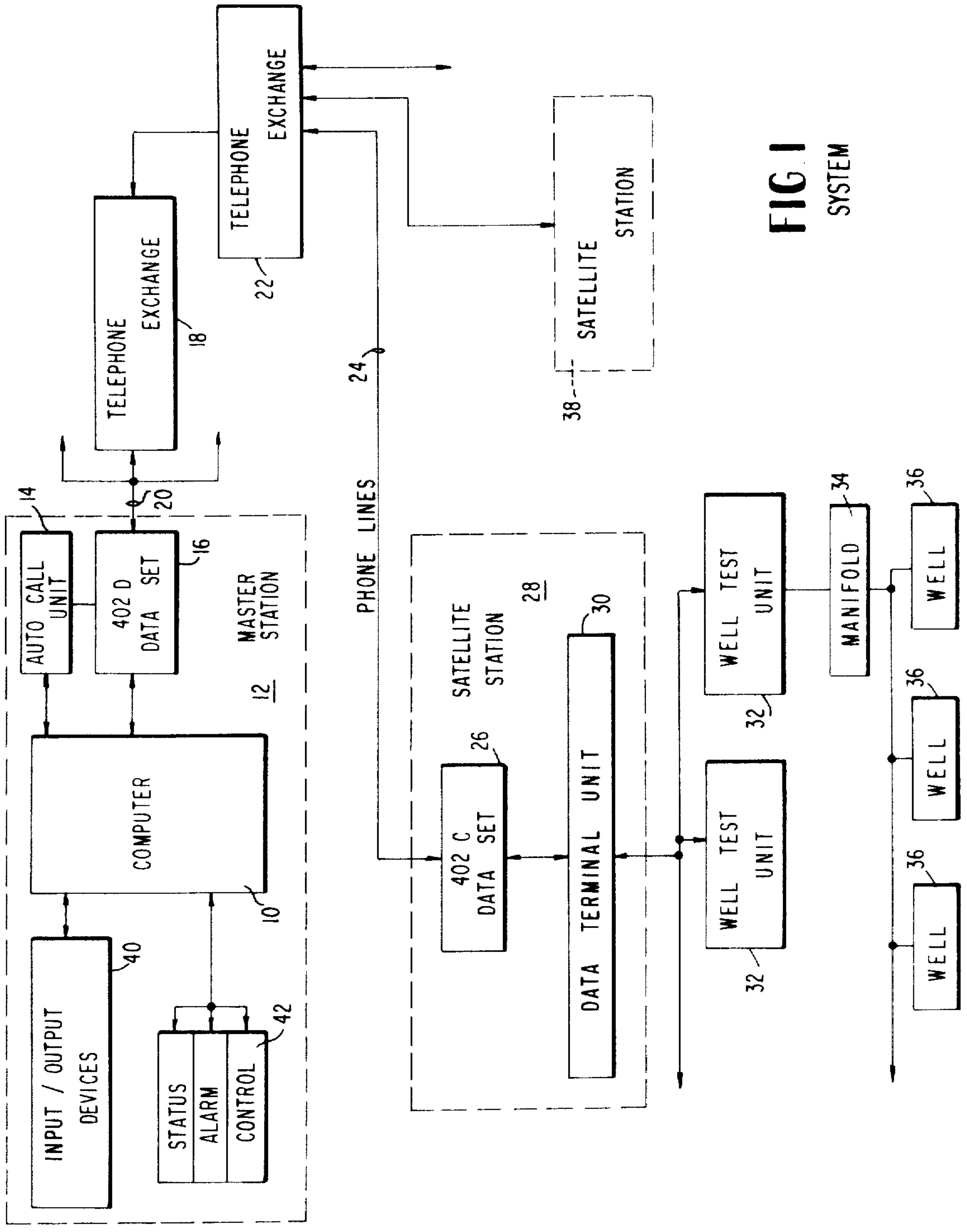
FIG. 1 is a functional block diagram of the system of the present invention.

Referring to FIG. 1, a computer 10 at a master station 12 is programmed to initiate a telephone call to a particular satellite station. The computer 10 at the appropriate time initiates a telephone call through the automatic call unit 14 and the 402 D data set 16. Data set 16 is connected to a local telephone exchange 18 via a commercially installed telephone line 20. The call thus initiated is processed in the usual manner to establish a telephonic connection through one or more remote telephone exchanges 22 and transmission lines 24 to the 402 C data set 26 at a particular satellite station 28. The particular satellite station 28 with which the computer 10 is thus connected by means of the commercial telephone lines 24 and the telephone exchanges 18 and 22 is, of course, dependent upon the telephone number assigned to the satellite station 28 by the telephone company subscriber service and dialed by the automatic call unit 14 under the control of the computer 10.

At the satellite station 28, the data set 26 is interfaced with a data terminal unit 30. The data terminal unit 30, or remote terminal unit as it may herein after be called, includes a number of data accumulators (not shown) connected to one of the well test units 32. Each of the well test units 32 may be connected by means of a manifold 34 to selectively receive the output of one of the producing wells 36.

Each of the other satellite stations 38 may be identical to satellite station 28 with the exception that the number of data accumulators required to accumulate the desired information in the data terminal unit 30 may vary widely. The number of producing wells 36 which may be connected to a particular well test unit 32 may likewise be varied as desired.

Once the telephone connection is established by the computer 10 with the desired satellite station 28, the computer 10 will send a Request Data command signal enabling a clock (not shown) at the data terminal unit 30 which provides the data transfer initiating pulses. The data transferred is that stored in the data accumulators of the data terminal unit 30 which may contain any desired relevant information such as gross fluid flow, net oil flow, gas flow, temperature, pressure, valve position, and the like.

After the data in the accumulators of the data terminal unit 30 has been transmitted and entered into the memory unit of the computer 10, it may be verified by comparing the data with a second duplicative transmission of the same data before further processing.

An important feature of the present invention resides in the fact that the computer 10 may be programmed to initiate a command signal which can be sent to the data terminal unit 30, read back to the computer 10 for comparison, and then, if correct, ordered by the computer 10 to thereafter be executed or modified as desired.

This command signal from the computer 10 may, for example, cause the operation of the appropriate valves in the manifold 34 to substitute a second producing oil well for the previously connected to the well test unit 32 so that a new set of data may be accumulated for subsequent transmission. Pumps may be turned off to avoid tank overflows in the event of equipment malfunction and safety equipment such as fire extinguishers may be activated, all without human intervention or presence of personnel at the actual well site. The foregoing command signals may be instituted by the computer 10 at any time that it is connected to the particular satellite station 28 and need not necessarily be preceded by the transmission of data.

After the computer 10 at the master station 12 has performed the specific tasks assigned to it by the software program provided, the telephone circuit may be disconnected. Thereafter, the computer 10 may be programmed to immediately place a call to a further one of the satellite stations 38 and to execute the instructions of the program applicable to that particular station and to a particular producing well.

From the foregoing, it is evident that a single master station can monitor and supervise the operation of a vast number of producing oil wells. The only limitation on the geographic relationship between the master station 12 and the producing wells 36 is the availability of a direct dialing system. The expense of installing and maintaining a special data link is obviated by the use of existing telephone lines. New satellite stations may be added to the system merely by providing the equipment at the new satellite station, securing the assignment of a telephone number by the telephone company subscriber service and adding another telephone number and subprogram to the computer software program.

II. THE MASTER STATION

As illustrated in FIG. 1, the master station 12 includes a computer 10 and a plurality of input/output devices 40 which may be various printout and data input devices. These devices 40 are commercially available and are well known in the art. Hence, no description as to their operation is deemed necessary.

Also connected to the computer 10 at the master station 12 may be a number of status, alarm, and control devices 42 such as indicator panels with visual and/or sonic alarms. The control functions of the devices 42 may likewise be conventional and they may be connected to the computer 10 in a well-known manner.

The function of the automatic call unit 14 connected between the computer 10 and the 402 D data set 16 is one of providing the conventional dialing impulses or tones as directed by the computer 10. The commercially available Western Electric 801A6 Automatic Call Unit has been found satisfactory for this purpose.

A. The Computer

The computer utilized with the system of the present invention may be any suitable process control digital computer. A typical computer whose performance has been found satisfactory is an IBM SYSTEM 1800. The computer 10 must be directly programmable for control. Processing of 8 bit parallel data transmitted is at a rate of 600 bits per second. A time sharing feature of the IBM SYSTEM 1800 allows the computer to take data from one or more of the data terminal units of FIG. 1 while simultaneously establishing another call. This feature is, of course, particularly desirable once the number of satellite stations connected into the system becomes large.

Inasmuch as the data transmission system of the present invention is asynchronous in operation and the satellite station is relied upon to provide the timing pulses which have no absolute time reference, the computer 10 may be programmable to calculate the time interval between the successive sampling of a particular data terminal unit 30 so as to calculate average rates where this information is desired. This data as to time may be accumulated in an accumulator at the data terminal unit 30 which is reset after being read by the computer 10.

Figure 2:
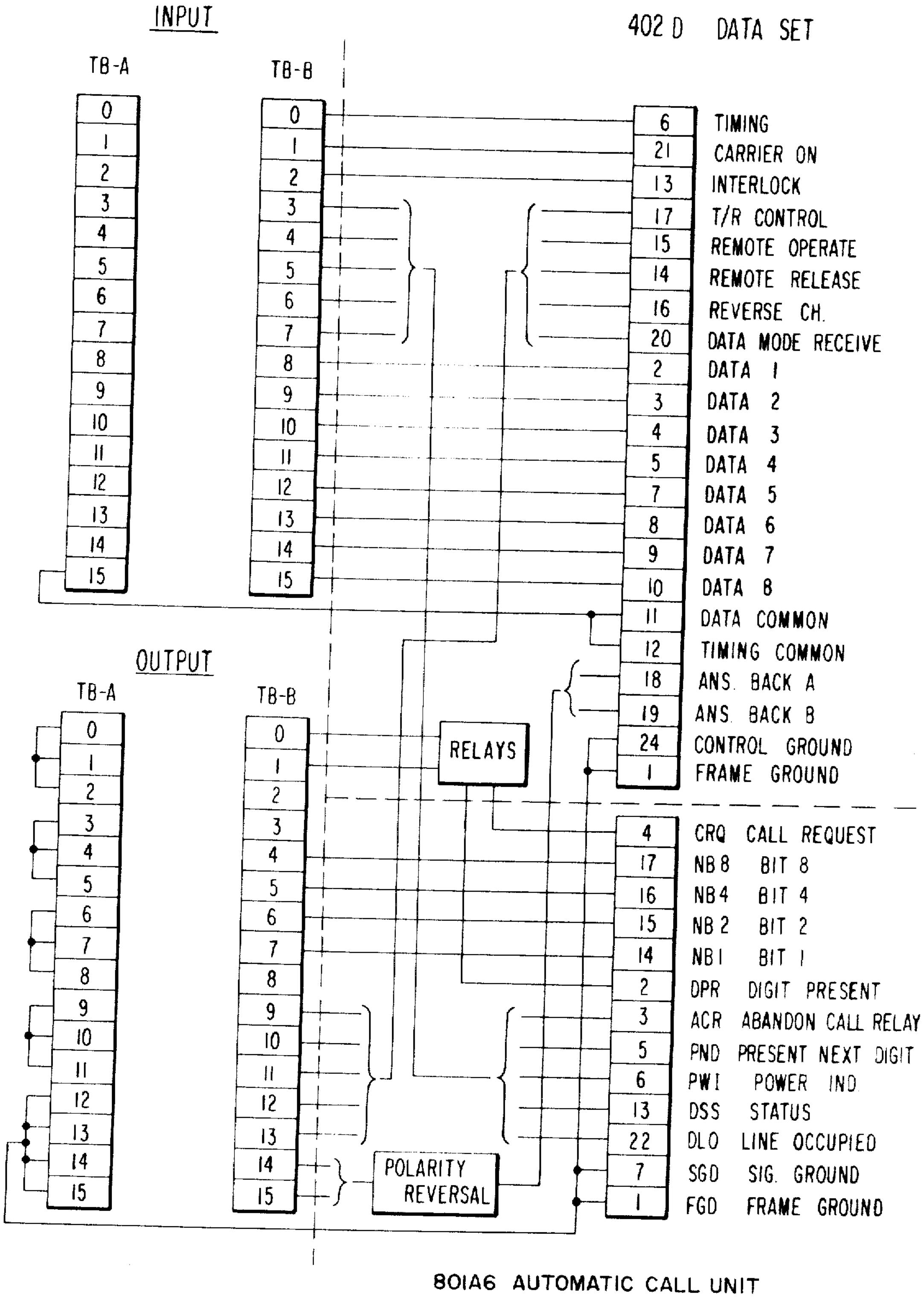
FIG. 2 is a wiring diagram showing the connections between the automatic call unit, the data set and the computer of FIG. 1.

The respective input/output terminal boards TB–A and TB–B of the referenced IBM computer 10 are shown on the left-hand side of FIG. 2. The function of the signals appearing on these terminals will be hereinafter explained in connection with the apparatus to which they are connected, as illustrated, by suitable cable to the terminals of the data set 16 and automatic call unit 14 (A.C.U.), both commercially available from the telephone company.

The terminals available on the 402 D data set 16 are identified on the terminal board shown at the upper right-hand side of FIG. 2. Apart from the need for some signal modification provided by relays as indicated on the leads connected to terminals 2 and 4 of the 801A6 Automatic Call unit shown at the lower right-hand side of FIG. 2, the circuit of FIG. 2 is essentially no more than one or more multiple conductor electrical cables. The terminals available on the computer are shown and identified on the left-hand side of FIG. 2.

B. The 402 D Data Set

Figure 3:
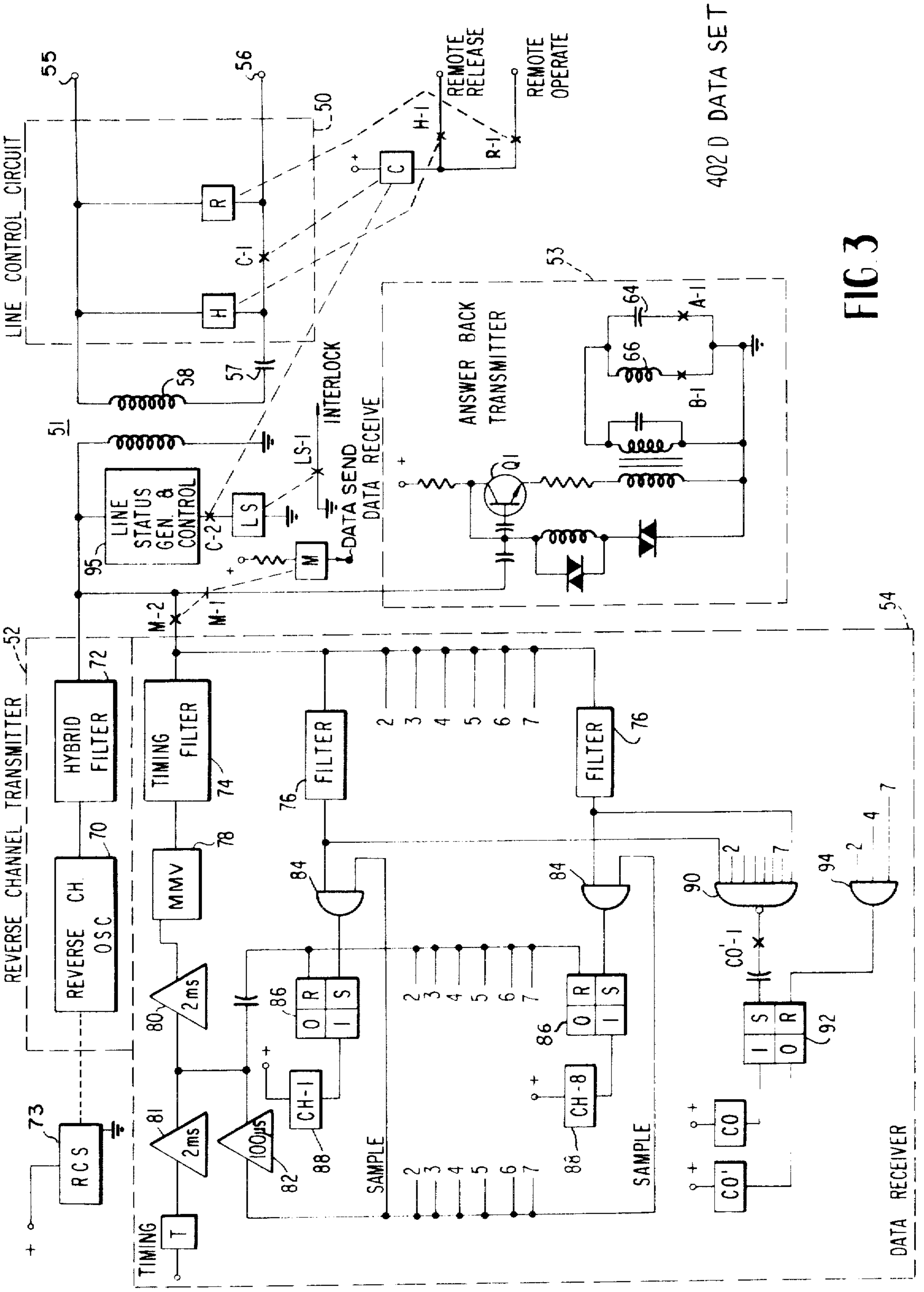
FIG. 3 is a functional block diagram of the master station data set of FIG. 1.

The data set 16 of FIG. 1 is shown in greater detail in FIG. 3. Referring now to FIG. 3, a line control circuit 50 is connected to a reverse channel transmitter 52, an answer back transmitter 53, and a data receiver 54 whose functions will be substantially explained.

The line control circuit 50 includes a Ring relay R connected across a pair of telephone line terminals 55 and 56. Connected across the line in parallel with the Ring relay R is a Hold relay H in series with the normally open contacts C–1 of a Control relay C hereinafter to be described. A capacitor 57 and a winding 58 of the transformer 51 provide the coupling of the line communication signals appearing across terminals 55 and 56 to the remainder of the circuit.

The functions of the line control circuit 50 and the Line Status Generator 95 hereinafter described may be provided by a Data Auxiliary Set such as the Western Electric 804 A or some other Data Set such as the 402 C.

As illustrated in FIG. 3, the control relay C may be energized by the grounding of the Remote Operable lead and the simultaneous operation of the Hold relay H. The Remote Release lead can not be utilized for this purpose due to the normally open contacts R–1 or H–1, respectively, of the Ring and Hold relays R and H. The Call Request signal appears on terminal 0 of the output terminal board TB–B of FIG. 2 and is directly applied to terminal 4 of the automatic Call Unit 14 as shown. The Remote Operate lead of the Control relay C is thus grounded by the automatic Call Unit 14 after initiation of the call and the Hold relay H is momentarily actuated by a special circuit which is not shown in the automatic Call Unit 14.

The Control relay C closes the contacts C–1 to place the data set across the telephone line.

The call is terminated by the ungrounding of the Remote Operate lead, the Call Request lead, and the Remote Release lead which causes the Control relay C to drop out and contacts C–1 to open, terminating the central telephone office connection.

The Remote Operate lead is directly connected to ground by the computer 10 if automatic answering of incoming calls is desired. It is opened to disable the automatic answering feature, as may be the usual case when the computer 10 initiates all calls.

When the Remote Operate lead of the data set is grounded for automatic answering and the Remote Release lead is closed and no outgoing call is being attempted, the data set 16 is conditioned to accept incoming calls. The application of ringing current to the telephone line terminals 55 and 56 causes the operation of the Ring Relay which closes the Ring relay R–1 contacts to energize the Control Relay C. The operation of the Control Relay C closes the contacts C–1 to cause the operation of the Hold relay H by the line current provided by the telephone central office. The operation of the Hold relay H closes the contacts H–1 to prevent the loss of the Control Relay C when ringing has ceased. Ringing is terminated and the connection from the calling party completed upon the sensing of the current through the Hold relay H by the telephone central office equipment.

The connection may be terminated when the telephone central office ceases to provide the line current necessary to hold the Hold relay H energized. The opening of contacts H–1 in the Remote Release lead causes the Control relay C to drop out opening contacts C–1 and returning the data set 16 to its inactive state. The connection may also be terminated by the opening of the Remote Release lead by the computer 10.

With continued reference to FIG. 3, the transformer 51 is connected through the normally closed contacts M–1 of the computer 10 (see Section V) controlled Data Mode Receive relay M to the Answer Back Transmitter 53.

The Answer Back Transmitter 53 is basically an oscillator having a single NPN-transistor Q–1 with parallel LC branches in the tank circuit of the emitter electrode. Closure of the normally open contacts A–1 of an Answer Back A relay (not shown) operates to switch a capacitor 64 into the tank circuit of transistor Q–1 thus lowering the output frequency of the oscillator. Similarly, the closure of the normally open contacts B–1 of the Answer Back B relay (not shown) operates to add an inductor 66 to the tank circuit of the transistor Q–1 thereby increasing the output frequency of the oscillator.

Since the respective reactants of the capacitor 64 and the inductor 66 are unequal, at the particular frequencies utilized the closure of both contacts A–1 and B–1 results in an oscillator output frequency intermediate of the extremes which result from the operation of the Answer Back A and Answer Back B relays alone but which also differs from the output frequency of the oscillator when neither the Answer Back A nor Answer Back B relay has been operated.

The Answer Back A and Answer Back B relays may be operated by the computer 10 which provides an output signal on the terminals 14 and 15 of the output terminal board TB–B. As shown in FIG. 2, these signals are reversed in polarity and applied to terminals 18 and 19 of the data set 16. The Data Mode Receive relay contacts M–1 are likewise controlled by the computer 10, the signal from the terminal 13 of the output terminal board TB–B of FIG. 2 being applied to terminal 20 of the data set 16.

Transformer 51 is directly connected to a reverse Channel Oscillator 70 in the reverse channel transmitter 52 by way of a hybrid filter 72. The reverse channel oscillator 70 is conventional in its circuitry and operation and generates an output signal having a frequency of 387 Hz. The oscillator 70 is controlled by means of a Reverse Channel Send relay RCS 73. The RCS relay 73 is operated by a signal on the terminal 12 of the output terminal board TB–B of FIG. 2 which is directly connected to the terminal 16 of the data set 16 as shown.

The transformer 51 is also connected through the normally open contacts M–2 of the computer 10 controlled Data Mode Receive relay M to the data receiver 54. The data receiver 54 comprises a first timing signal channel including a timing filter 74 and a data signal channel which includes the eight frequency discriminators or filters 76 which separate the eight data channels of the system.

The timing filter 74 is a conventional narrow band zero crossing detector and, together with its associated circuitry, provides a pulse delayed for 4 milliseconds and having a 5 millisecond duration for each timing transition detected.

A conventional one-shot or monostable multivibrator 78 may be connected to receive the output signal from the timing filter 74 on its trigger terminal and will produce an output signal on the "1" output terminal of the requisite duration. The output signal from the multivibrator 78, a binary ONE, is delayed 2 milliseconds in each of the delay circuits 80 and 81, and is used to operate a Timing relay T to indicate to the computer 10 that the data channels should be sampled.

The 2 millisecond delay introduced in the delay circuit 80 is provided to permit the signals in the eight data channel filters 76 to stabilize. The output signal of the delay circuit 80 is immediately applied to the reset terminal "R" of the eight conventional bistable multivibrators or flip-flops 86 associated one each with the data channels. The binary ONE output signal from the "1" terminal of each of the flip-flops 86 may be applied to a data channel relay 88 to close the associated data contact (not shown) read by the computer 10 upon the operation of the timing relay T.

A further 100 microsecond delay of the output signal of the delay circuit 80 is introduced in a delay circuit 82 to permit the resetting of all of the flip-flops 86 prior to the sampling of the signal from the eight data channel filters 76 by the application of the delayed pulse to the eight AND-gates 84 to which the outputs of the associated eight data channel filters 76 are applied.

When a signal from the associated data filter 76 is present during the application of the 5 millisecond gating or sampling pulse from the monostable multivibrator 78, the output signal from the AND-gate 84 will set a binary ONE at the "1" output terminal of the associated data channel flip-flop 86. The output signal of each of the flip-flops 86 is used to operate the respective one of the data channel relays 88 to effect the appropriate data channel contact closure for subsequent detection by the computer 10. The additional 2 millisecond delay introduced by the delay circuit 81 in the operation of the timing relay T allows the data channel relays 88 to operate prior to sampling of their contacts by the computer 10.

The operation of the Timing relay T and the eight channel relays produce signals on the terminals 6, 2–5, and 7–10 of the data set 16 which, as illustrated in FIG. 2, are directly applied to terminals 0 and 8–15 of the input terminal board TB–B of the computer 10. As will be subsequently explained, the timing signal indicates to the computer 10 that the signals which thereafter appear in the 5 millisecond period represent the data requested.

The output signal from each of the eight data channel filters 76 is also fed to an eight input terminal All Space NAND-gate 90. The simultaneous detection of spacing signal, the lack of a binary ONE or mark signal, in all eight data channels is used to indicate "Start of Message" to the data set. Closure of the normally open contacts CO′–1 of the Carrier Off relay CO′ is, of course, a prerequisite to the setting of a binary ONE at the output of a flip-flop 92 and thus the operation of the Carrier On relay CO.

The Carrier Off relay CO′ is operated in the absence of a signal from a three input terminal AND-gate 94 on the reset terminals of the flip-flop 92. This resetting pulse is derived from the simultaneous presence of signals from the filters 76 of the data channels 2, 4 and 7.

The Carrier Off signal is not applied to the computer 10. The presence or absence of the Carrier On signal on the terminal 21 of the data set 16 is, however, detected at the terminal 1 of the input terminal board TB–B of the computer 10 as shown in FIG. 2, and indicates that the data set is correctly receiving signals from another data set.

A line status generator 95 is connected in series with the normally open contacts C–2 of the Control relay C and a Line Status relay LS. Operation of the Control relay C in the manner earlier described in connection with the line control circuit 50 enables the line status generator 95 for a period of time determined by an internal timer. This signal is used to disable the echo suppressors (not shown) in the telephone lines.

The operation of the Line Status relay LS closes the normally open contacts LS–1 to provide an Interlock signal I on terminal 13 of the data set 16 after the line status generator 95 has detected the 2025 Hz. echo suppressor signal from the other data set and transmitted a similar one. As shown in FIG. 2, this signal is applied to the terminal 2 of the input terminal board TB–B of the computer 10 and indicates that the data set 16 is connected to a working telephone circuit, has an operating power supply, and is in the data mode, i.e., prepared to either receive data or to transmit Answer Back or Reverse Channel signals.

III. THE COMMUNICATION SYSTEM

With reference again to FIG. 1, the communication system comprises an automatic call unit 14, the 402 D data set 16 located at the master station 12, the commercially installed and maintained telephone lines 24 including various telephone exchanges 18 and 22, and the 402 C data set 26 located at the satellite station 28.

Reference to the automatic call unit 14 was made in the General System Description supra. An exemplary unit is the 801A6 automatic call unit produced by the Western Electric Company. The connections between the automatic call unit 14, the IBM 1800 computer 10, and the 402 D data set 16 are shown in the terminal block diagram of FIG. 2.

The circuitry and operation of the 402 D data set 16 at the master station 12 has been briefly described in connection with FIG. 3.

The telephone lines connecting the data set 16 to the local exchange 18, the remote exchange 22 to the data set 26 at the satellite station 28, and the number of telephone exchanges 18 and 22 as may be required, are installed and maintained by the telephone company as a part of their regular commercially available subscriber service. It is only necessary for the operation of the system of the present invention that the telephone lines be of voice quality.

Utilization of existing commercial telephone lines provides not only a substantial reduction in the expense incurred in the initial installation of such a system, but provides extraordinary flexibility as well. As an example, it is possible for a computer located at a master station in one location such as Oklahoma to monitor and control the operation of satellite stations throughout the continental United States and in any foreign country to which a telephone call may be directly dialed. It is further possible, during a period when the master station is inoperative while undergoing downtime for routine and/or emergency maintenance and repair, for a second or supplemental master station at a different location, such as in Texas, to temporarily assume the data gathering and control functions of the Oklahoma computer. As a further advantage, the communication system has for long distance calls many alternative routes that are automatically available in the event of a disruption in a part of the communication circuit due, for example, to local adverse weather conditions or equipment failure.

It is necessary to disable the echo suppressors spaced along the telephone lines to utilize the data frequencies which lie outside the normal spectrum expected in voice communications. As will be subsequently explained, this is accomplished by means of the line status generator at the data sets 16 and 26 at opposite ends of the line.

The 402 C data set 26 used at each of the satellite stations 28 of FIG. 1 will be hereinafter explained in connection with the circuitry and operation of the satellite station 28 and the overall operation of the system.

IV. THE SATELLITE STATION

With continued reference to FIG. 1, the satellite station 28 comprises the 402 C data set 26 and the data terminal unit 30, the operation of which will hereinafter respectively be described in detail in connection with FIGS. 4 and 5–22.

A. The 402 C Data Set

Figure 4:
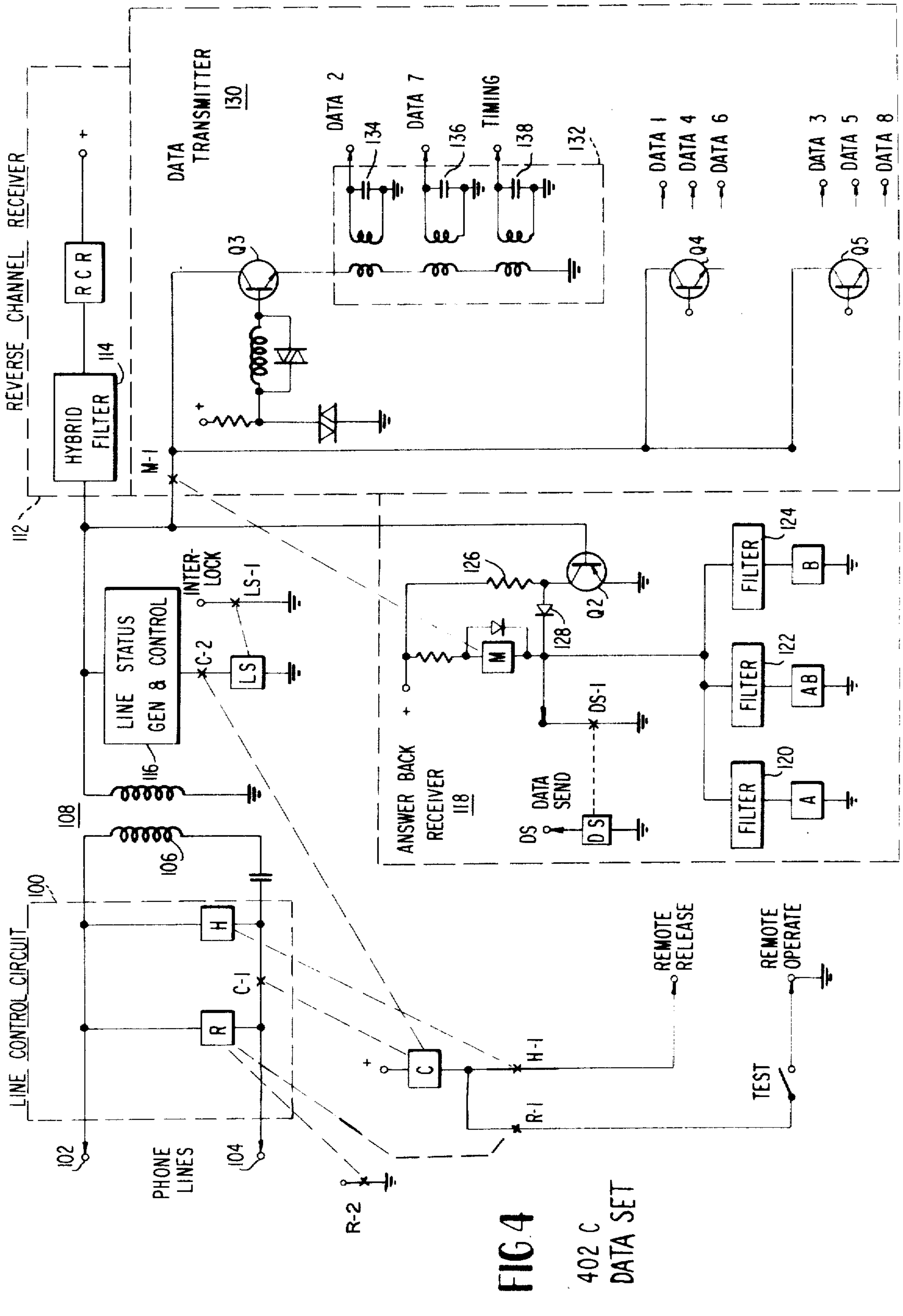
FIG. 4 is a functional block diagram of the satellite station data set of FIG. 1.

Referring now to FIG. 4, a line control circuit 100 is connected between the telephone line terminals 102 and 104 and the winding 106 of a coupling transformer 108. The line control circuit 100 includes a Ring relay R connected in parallel with a series connected Hold relay H and the normally open contacts C–1 of the Control relay C. The operation of the line control circuit 100 is similar to that of the line control circuit 50 of the 804A Aux data set used with the 402 D data set as earlier described in conjunction with FIG. 3.

Briefly, operation of the ring power responsive Ring relay R closes the normally open contacts R–1 in the Remote Operate lead of the Control relay C. The operation of the Control relay C closes the normally open contacts C–1 and causes the Hold relay H to operate from line current provided on the telephone circuit. Operation of the Hold relay H holds the normally open contacts H–1 in the Remote Release lead of the Control relay C closed when the Ring relay R drops out with a loss of ring power from the local telephone exchange 22. The Hold relay drops out a maximum of 45 seconds after the call is terminated due to the disconnecting by the central office equipment of the batteries providing the line current.

Operation of the Ring relay R also closes the normally open contacts (not shown) to provide a Ring signal on the Ring Indicator lead of the data terminal unit 30 for a purpose explained infra.

Signals appearing across terminals 102 and 104 are inductively coupled through the transformer 108 to a reverse channel receiver 112. The reverse channel receiver 112 comprises a hybrid filter 114 tuned to pass a 387 cps signal which may be suitably amplified in a narrow band tone-on/tone-off receiver (not shown) to drive a Reverse Channel Receive relay RCR to indicate that these signals are being received and to provide a control signal for the data terminal unit 30 as will be explained.

The output of the transformer 108 is also fed to a line status generator 116. Connected between the line status generator 116 and ground are the normally open contacts C–2 of the Control relay C, and a Line Status relay LS.

The output of the line status generator 116 is a 2025 Hz. recognition and echo suppressor disabling tone. As earlier explained, the echo suppressors are basically amplifiers located at spaced points along the telephone lines. These suppressors have the capability of bucking out signals appearing on the line which are outside the normal frequency band. It is necessary to disable the suppressors before data transmission can be accomplished.

Upon completion of the 2025 Hz. tone from the line status generator 116 under control of an internal timer, the relay LS is operated to provide a signal on the Interlock lead. As will be subsequently explained, the data terminal unit 30 does not, in the embodiment described, normally utilize the Interlock signal except for trouble shooting purposes.

Signals from transformer 108 above a frequency of 700 Hz. are fed to the base electrode of a transistor Q–2 in the answer back receiver 118. The answer back receiver 118 is a three tone detector. The signal applied to the base electrode of transistor Q–2 is amplified thereby and applied to three frequency discriminators or filters 120, 122 and 124. Filter 120 is tuned to a frequency of 1017 Hz. to operate Answer Back Relay A. Filter 124 is similarly tuned to a frequency of 2025 Hz. to operate an Answer Back B relay, and filter 122 is tuned to the frequency 1785 Hz. to drive an Answer Back AB relay utilized for command purposes by the data control unit 30.

Grounding of the Data Send lead of the answer back receiver 118 through the closure of the normally open contacts DS–1 by the data terminal unit 30 effectively takes transistor Q–2 out of the circuit by removing the bias voltage supplied through resistor 126. It also provides a current path from the source of positive potential through the Data Mode Receive relay M to ground to cause the operation thereof. The data transmitter 130 is thus connected to the coupling transformer 108 by the closing of the normally open contacts M–1 of the Data Mode Receive relay M and unwanted operation of the Answer Back relays A, B, or AB is prevented.

The data transmitter 130 is, as stated, connected through the normally open contacts M–1 of the Data Mode Receive relay M to the transformer 108. The data transmitter 130 comprises three single transistor, multiple frequency oscillators of which the oscillator of transistor Q–3 is exemplary. The frequencies of the three output signals of the oscillator of transistor Q–3 are switched between mark and space tones as a function of the reactance of the emitter electrode tank circuit 132. Capacitors 134, 136 and 138 may be selectively switched into the tank circuit 132 by the respective grounding of the data leads 2, 4 and 7.

The three simultaneous frequencies of the output signal of the transistor Q–4 oscillator are similarly determined by the grounding of data leads 1, 4 and 6, as are the frequencies of the output signals of the transistor Q–5 oscillator by the grounding of data leads 3, 5 and 8. Data and Timing leads may be grounded by relays, or transistor switch closures as described and provided by the customer equipment.

B. The Data Terminal Unit

Figure 5:
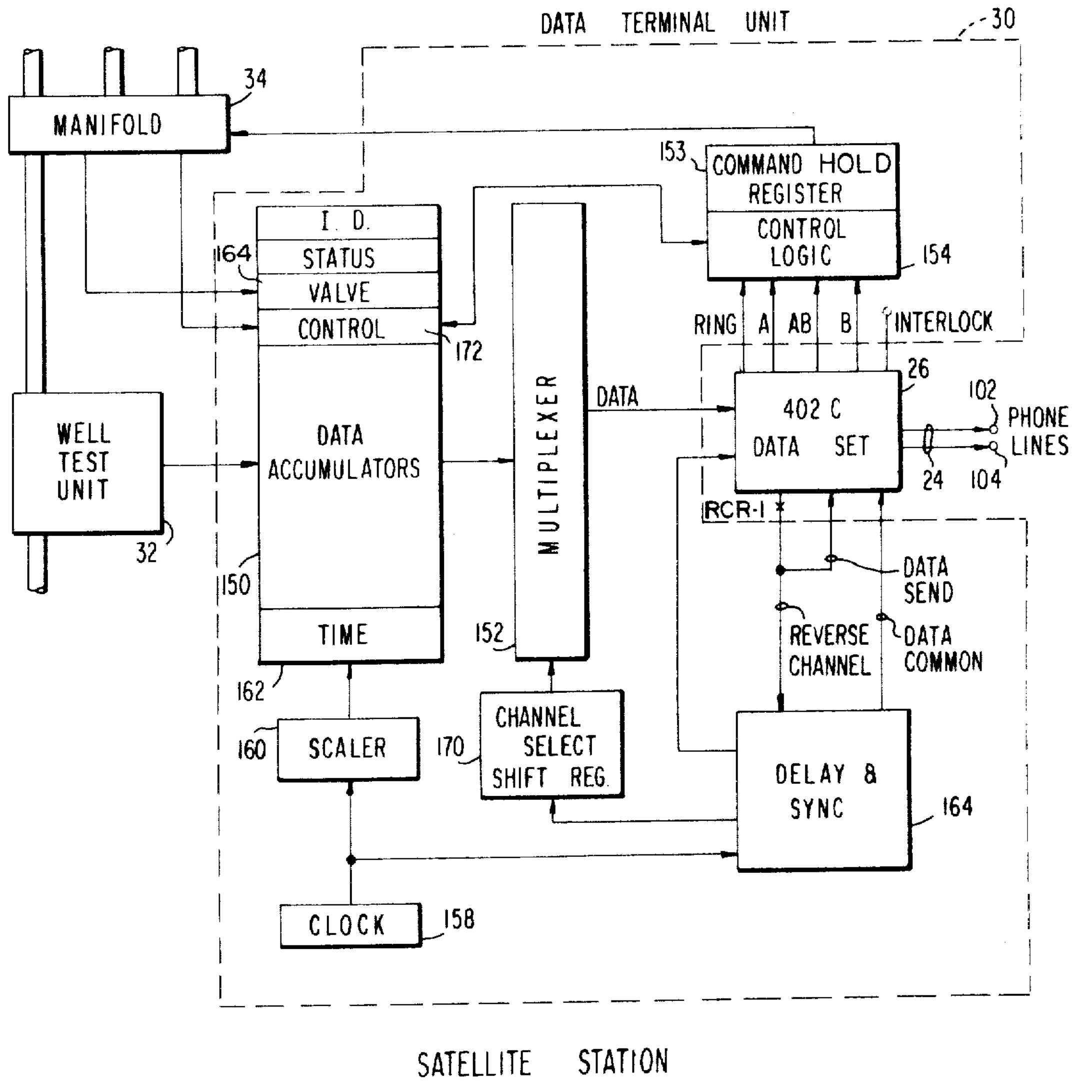
FIG. 5 is a functional block diagram of the satellite station of FIG. 1.

With reference now to the functional block diagram of FIG. 5, the data terminal unit 30 of the satellite station 28 of FIG. 1 includes a data accumulator bank 150, a multiplexer 152, a command shift register 153, and control logic 154. The data accumulator bank 150 comprises a plurality of digital data accumulators as will be explained more fully in connection with FIG. 6.

The accumulators of the data accumulator bank 150 are connected to the data set 26 and thus to the telephone lines by means of the multiplexer 152. Digital data from the selected well test unit 32 is fed to the data accumulator bank 150 as may be time information derived from a clock 158.

The clock 158 in turn derives its output signals from an AC power supply (not shown) or other suitable source in a manner to be subsequently explained. The clock pulses may be appropriately scaled by a scaler 160 before being applied to the time accumulator 162 of the data accumulator bank 150. Additional information as to the status of various valves of the manifold 34 may likewise be accumulated in the valve accumulator 164 of the data accumulator bank 150.

As illustrated in FIG. 5, the output signals of the data set 26 appear on six leads, Ring (R), Answer Back A (ANS BK A), Answer Back B (ANS BK B), Answer Back AB (ANS BK AB), Interlock (I), and Reverse Channel (RC). The first four of these control signals are applied to the control logic 154. While the Interlock signal I is not utilized in the present embodiment for control purposes, the use thereof for the purpose of providing a code for the enabling of the data transmitter 126 for security reasons lies within the scope of the present invention. The Reverse Channel signal (RC) is applied to a delay circuit 164 and to the sync circuit 228.

As we have seen, the operation of the reverse channel transmitter 52 of the data set 16 of FIG. 3 under the control of the computer 10 results in the operation of Reverse Channel Receiver relay RCR of the Reverse Channel Receiver 112 of FIG. 4 to ultimately cause the closure of the contacts DS–1 grounding the Data Send lead. The grounding of the Data Send lead causes the operation of the Data Mode Receive relay M connecting the data transmitter 130 to the line and disabling the answer back receiver 118.

The application of the RC signal to the delay and sync circuit 164 supplies the output signals Zero Shift Register (ZERO SR), Transfer (TRANSFER) and Data Send (DS) to the Data Set 26 causing the transmission of all binary ZERO'S to set the flip-flop 92 in data receiver 54 of data set 16 as shown in FIG. 3. This operates the Carrier On relay CO to provide the Carrier On signal to the computer 10.

As previously stated, the data terminal unit 30 is asynchronous in operation; i.e., the timing signals originate at the satellite station 28. Timing pulses coincide with each 8 bit transfer of data and signal the computer 10 that the data associated with that particular timing pulse is being transmitted.

The timing signals for the data accumulator bank 150 and the multiplexer 152 are supplied by a fixed frequency (equal to or less than 75 Hz.) reference source (not shown). The scaler 160 is used to appropriately scale the 60 cycle signal input to the time accumulator 162 of the data accumulator bank 150 to provide an indication of the elapsed time in minutes or hours as desired since the last reading of the data accumulator bank 150. The fixed frequency source originated timing signal is produced in the delay and sync circuit 164 and fed to the channel select shift register 170 which controls the gating of the data in the data accumulator bank 150 through the multiplexer 152 to the telephone lines 102 and 104.

The clock 158 also provides the timing signal T for the data set 26. However, the data set 26 operates on transitions as will be explained and not on the equally separated pulses of the clock 158. The data set is, therefore, effectively driven by a square wave at a frequency one half that of the clock 158.

The data accumulator bank 150 comprises a number of 8-bit data accumulators which are scanned at least twice during the data transfer for error checking purposes. The accumulators are generally of two types. One type, a simple counter, is used in the data section for the accumulation of pulses from the various transducers that may be employed at the well test unit of FIG. 6. These data section accumulators may be inhibited during the reading thereof to prevent discrepancies between the two immediately successive readings. Alternatively, the value of the counters may be sampled at the commencement of the read cycle and this sampled value used for successive scans.

The other type of accumulator may be static; i.e., they may represent a series of eight contact closures indicating the off-on condition of equipment, the seating of valves or any other data which may be expressed as a binary number.

The generation of the ANS BK A and ANS BK AB signals under the control of the computer 10 causes the application of the mutually exclusive ANS BK A and ANS BK AB signals at a maximum switching frequency of 20 Hz. to the control logic 154 which decodes the command signal and loads the command hold register 153 and the control accumulator 172.

The command word thus transferred to the control accumulator 172 in the data accumulator bank 150 may then be checked before causing the execution thereof. This may be done by generating anew the RC signal to switch the data terminal unit 30 to the data mode for a second reading of the data accumulator bank 150 including the command word. After the command word has been verified by the computer 10, the data set 26 may be switched back to the answer back mode and the Answer Back B relay contacts closed by the computer 10 to generate an ANS BK B signal which initiates the execution of the command stored in the command hold register 153.

C. The Well Test Unit

Figure 6:
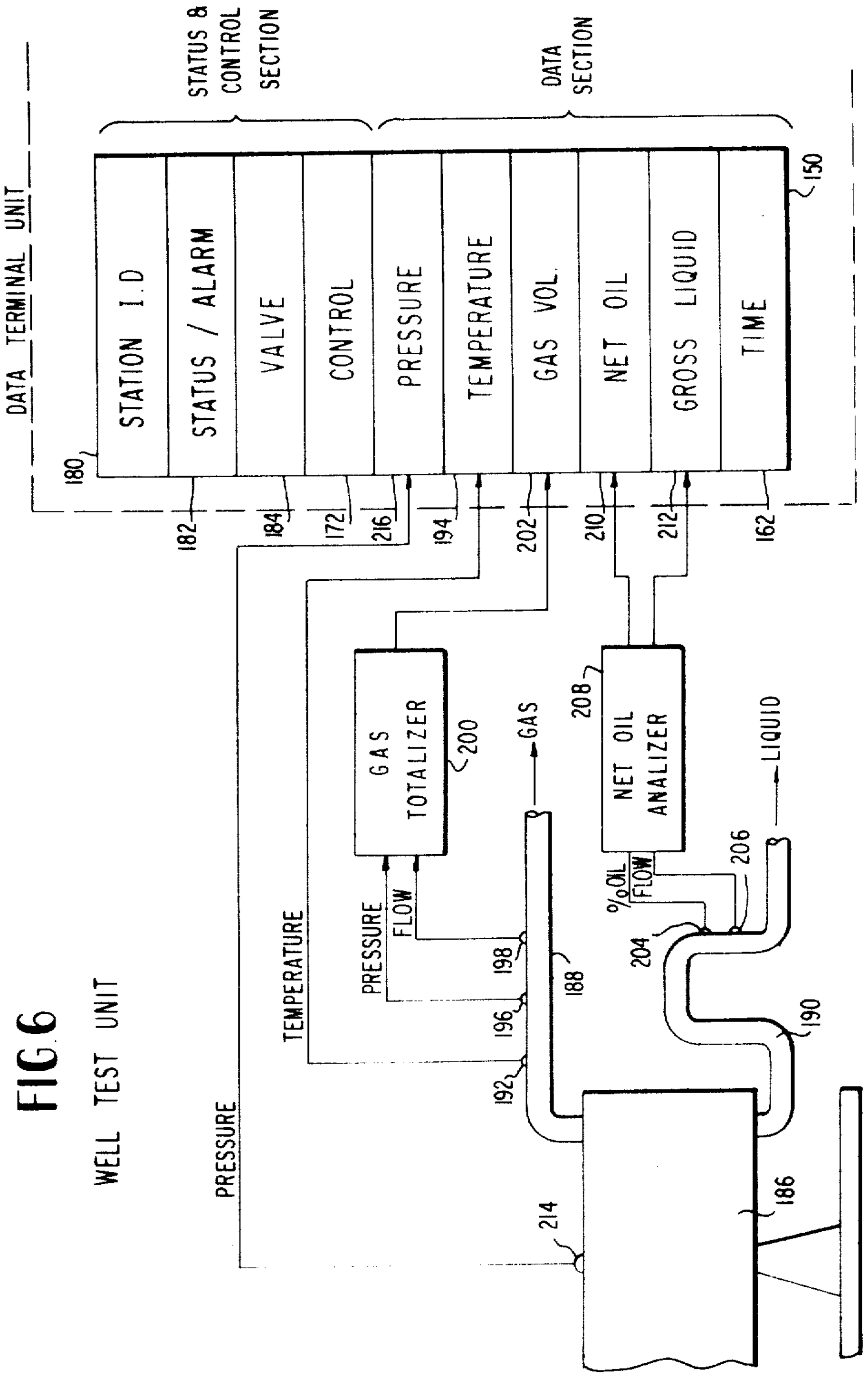
FIG. 6 is a functional block diagram of the well test unit of FIG. 5.

As may be more clearly seen in FIG. 6, the data accumulator bank 150 comprises a series of 8-bit accumulators, 16 in the embodiment illustrated. The first four of these accumulators comprise the status and control section and the last 12 data accumulators, two for each of the 6 data functions illustrated, will hereinafter be referred to as the data section of the data accumulator bank 150.

The status and control section accumulators are static accumulators while the data section accumulators are basically digital counters for storing the pulses supplied from the associated digital transducers at the well test unit 32. The time accumulator 162 is the exception in this later group in that it stores pulses from an internal clock 158 as earlier described in connection with FIG. 5.

To increase the capacity of the accumulators in the data section, the 8-bit accumulators are connected serially in groups of two to make a 16-bit accumulator for each data function. The storage capacity is thus increased to 32,767 or 9,999 depending upon whether the natural binary or binary coded decimal interpretation is to be utilized. All 16 of the 8-bit accumulators will be scanned by the multiplexer 152 and the information contained therein transmitted as data to the computer 10 in the manner earlier described.

The station identification accumulator 180 may be a set of switches or wired terminals to provide the encoding of a number up to 255 for identification of the particular well test unit 32.

The status/alarm accumulator 182 may be a series of eight gates which may be encoded by dry contact switches to indicate appropriate status or alarm functions such as would occur from high/low level switches or power on/off indications, no flow indications, pressure and fire alarm detectors.

The valve accumulator 184 may be similarly a series of eight gates controlled by limit switches on the valves of the manifold 34 to indicate the open or closed position of a particular valve.

The control accumulator 172 provides storage for the 8-bit control message word transmitted from the computer 10 to the data terminal unit 26 and manifested by the ANS BK A and ANS BK AB signals. The control accumulator 172 may thus be read by the computer 10 prior to execution of the command stored therein. As indicated in FIG. 5, the word stored in the control accumulator 172 is executed by the command execute shift register 153 on receipt of an ANS BK B signal. The capability of eight channels of on/off control is thus provided. This control word may be used, for example, to position 8 valves remotely or to control pumping motors or other associated equipment as desired.

With continued reference to FIG. 6, fluid from a particular well 36 is fed to a separator 186 at the well test unit 32. The respective outputs from the separator 186 are gases taken from a conduit 188 in the upper portion thereof and liquids taken from a conduit 190 in the lower portion thereof.

A digital temperature sensor 192 in the gas flow conduit 188 is connected to the serially connected accumulators which together comprise the temperature accumulator 194 of the data accumulator bank 150. A suitable sensor for this purpose has been found to be that disclosed and claimed in Fish et al. application, Ser. No. 692,980, filed Dec. 2, 1968, and assigned to the assignee of the present invention.

Similarly, the output from a pressure transducer 196 and from a turbine-type flowmeter 198 are fed to a gas totalizer unit 200 such as disclosed and claimed in the copending U.S. application, Ser. No. 704,403 of Carl W. Zimmerman et al., filed Feb. 9, 1968, and assigned to the assignee of the present invention. The output of the gas totalizer 200 is applied to the two serially connected accumulators which together comprise the gas volume accumulator 202.

The pressure sensor 196 may be of the type disclosed and claimed in Love application, Ser. No. 657,811 now U.S. Pat. No. 3,478,594 filed Aug. 2, 1967. The flowmeter 198 may be of the type disclosed and claimed in the copending application, Ser. No. 646,272 of Robert G. Love et al. filed June 15, 1967 now U.S. Pat. No. 3,526,133, and assigned to the assignee of the present invention.

The output signal from a percent oil detector 204 such as that disclosed and claimed in the copending application, Ser. No. 718,694 to Robert Love et al., filed Apr. 4, 1968, now U.S. Pat. No. 3,523,245 and assigned to the assignee of the present invention, and the output signal from a turbine flowmeter 206 are fed to a net oil analyzer 208. The flowmeter 206 may be of the type disclosed and claimed in the previously referenced Love et al. application, Ser. No. 646,272, and the net oil analyzer 208 may be of the type disclosed and claimed in the Carl W. Zimmerman et al. application, Ser. No. 704,403, supra. The two output signals from the net oil analyzer 208 are fed respectively to the net oil and gross liquid accumulators 210 and 212 in the data section of the data accumulator bank 150.

The output signal of an additional pressure sensor 214 at the separator 186 is fed to the two serially connected accumulators which together comprise the pressure accumulator 216 of the data accumulator bank 150. This pressure transducer may be of a type similar to the pressure transducer 196 discussed previously.

V. ESTABLISHING THE CALL

With reference to FIG. 1, the telephonic connection between the computer 10 at the master station 12 and the data terminal unit 30 at the satellite station 28 is initiated by the computer 10 through the automatic call unit 14. The automatic call unit 14 provides the conventional dialing tones or pulses which enable the telephone company equipment to process the call and establish the connection with data set 26 of the particular satellite station 28 identified by the telephone number selected by the computer 10. This call set up, as implemented by the Bell Telephone Company ACU 801A6, requires approximately 15 seconds.

Referring to FIG. 3, the Remote Operate and Remote Release leads of the 402 D data set 16, terminals 15 and 14 respectively of FIG. 2 are held open by the computer 10 while a Call Request signal is applied to the automatic call unit (A.C.U.) 14 on terminal 4. The Call Request signal is a directive to the A.C.U. 14 to effectively pick up the phone.

A Present Next Digit signal from the A.C.U. 14 on terminal 5 indicates to the computer 10 that a dial tone has been received and that the next digit may be presented.

The computer 10 then effectively dials the first digit of the desired telephone number by applying the appropriate (binary coded decimal) digital bit signals to the A.C.U. 14 terminals 14–17, inclusive.

The cycle of a Digit Present signal from A.C.U. 14 terminal 5 and the presenting of a digit in the form of signals on the terminals 4–7 of the output terminal board TB–B of computer 10 is repeated until the dialing function has been completed.

In the absence of a Data Line Occupied (DLO) or "busy" signal from the A.C.U. 14 terminal 22, the Data Set is automatically placed "on line" when the call is answered. A Status signal should appear on the A.C.U. 14 terminal 13 advising the computer 10 when the data set is in the data mode. This also may be sensed by the data set leads.

Referring now to FIG. 4, the establishment of the telephonic connection causes the 402 C data set 26 Ring relay R to operate from the application of ring voltage by the remote telephone exchange. Operation of the Ring relay R causes the normally open contacts R–1 to close. This in turn operates the Control relay C which is latched by the Hold relay H which receives battery voltage from the telephone central office in the manner previously described in section IV A.

Any signal then appearing across the terminals 102 and 104 in FIG. 4 is inductively coupled through transformer 108 to the line status generator 116. Since the normally open contacts C–2 of the Control relay C were closed by the operation of the relay C, the line status generator 116 causes the transmission of the 2025 Hz. echo suppressor disabling tone and its receipt by the data set 16 causes it to also transmit the 2025 Hz. tone. The Line Status relay LS of the data set 26 is operated upon completion of the 2025 Hz. signal and closes the normally open contacts LS–1 to provide an Interlock signal to indicate that the data set 26 is in the data mode, i.e., not voice.

The closure of the normally open contacts C–2 of the data set 26 enables the line status generator 116 which provides a 2025 Hz. signal of from 2 to 5 seconds duration as determined by an internal timer. This 2025 Hz. signal is inductively coupled through the transformer 108 to disable the echo suppressors in the telephone lines as previously discussed and to provide a recognition signal for the automatic call unit 14 at the master station 12.

At this point in time, the computer 10 of FIG. 1 may cause a signal to appear on terminal 13 of output terminal board TB–B and thus on the Data Receive terminal 20 of the 402 D data set 16 as shown in FIG. 2. This signal provides for the grounding of the Data Send lead in FIG. 3 to cause the operation of the Data Mode Receive relay M to connect the data receiver 54 to the line through the normally open contacts M–2 and to disconnect the answer back transmitter 53 by opening the normally closed contacts M–1.

As earlier described in connection with FIG. 4, the closure of the contacts C–2 enables the line status generator 116 and thus causes the generation of a 2025 Hz. signal for a 2 to 5 second interval as determined by an internal timer. The completion of the 2025 Hz. signal is detected by the Line Status Generator and Control Circuit 116 of Data Set 26 and grounds the Interlock lead via the Line Status relay LS. This signal provides an indication that echo suppressor disabling has taken place and may or may not be used by the device connected to the Data Set 26.

Automatic answering and generation of the 2025 Hz. tone by the 402 C Data Set 26 is provided if the Remote Operate lead is grounded.

Transmission of the 2025 Hz. signal by both data sets causes the echo suppressors provided on the long distance network to be disabled. These echo suppressors effectively widen the bandwidth of the standard voice grade telephone circuit and allow all of the tones used to transmit data to pass without appreciable distortion or attenuation.

A "quiet period" of 100 milliseconds or more in which no data is transmitted will cause these echo suppressors to be enabled again. For this reason the system provides that under normal operating procedures there are no "quiet periods" of such duration.

The generation of the 2025 Hz. signal by the data set 16 at the master station 12 and the data set 26 at the satellite station 28 is followed by a silent interval of 20 to 40 milliseconds duration. This silent interval permits automatic call unit 14 to switch the line 20 of FIG. 1 directly to the data set 16.

VI. TRANSMISSION OF DATA

With continued reference to FIG. 4, the operation of the Data Mode Receive relay M in the answer back receiver 118 in the manner described closes the normally open contacts M-1 to connect the data transmitter 126 to the telephone line and to render the answer back receiver 118 nonresponsive to spurious answer back signals.

Transmission of all zeros or spaces by the data transmitter 126 at the satellite station 128 is detected by the All Space eight input terminal NAND-gate 90 of the data receiver 54 at the master station 12 (See FIG. 3). Since the normally open contacts CO'-1 of the Carrier Off relay CO' are closed in the absence of the data input signals 2, 4 and 7 to the AND-gate 94, the flip-flop 92 is switched to the set condition to operate the Carrier On relay CO.

The Carrier On signal is applied to terminal 21 of the data set 16 by the operation of the Carrier On relay CO. As indicated in FIG. 2, this signal is applied to terminal 1 of the input terminal board TB–B of the computer 10. The Carrier On signal will be maintained so long as the data set 16 continues to receive the carrier frequency from the satellite station 28. The Carrier On lead is automatically disconnected from the Data Common lead within 30 milliseconds after the loss of the carrier frequency, i.e., the simultaneous reception of the data 2, 4 and 7 signals.

The system is then in the data mode and ready for the transmission of data. The contact closures of the three multiple frequency oscillators of the data transmitter 130 are then sampled under the control of the multiplexer 152 of the data terminal unit 30 of FIG. 5. The data signals D generated by the data transmitter 130 are tones having the frequency Hz. indicated in the following table:

| Channel | 1 | 2 | 3 | 4 | T | 5 | 6 | 7 | 8 |
|---|---|---|---|---|---|---|---|---|---|
| Mark | 730 | 900 | 1,070 | 1,240 | 1,410 | 1,580 | 1,750 | 1,920 | 2,090 |
| Space | 800 | 970 | 1,140 | 1,310 | 1,480 | 1,650 | 1,820 | 1,990 | 2,160 |

The signal generated by the reverse channel transmitter 52 of the data set 16 of FIG. 3 under the control of the computer 10 is received by the reverse channel receiver 112 of the data set 26 of FIG. 4 to zero the channel select shift register 170 of FIG. 5. Closure of the Data Send lead by the operation of relay RCR inhibits the counting of the accumulators in the data accumulator bank 150 and enables the clock 158 in a manner to be subsequently explained.

Detection of the timing signal T by the timing filter 74 of the data receiver 54 of FIG. 3 triggers the multivibrator 78 to provide a binary ONE output signal. This output signal is delayed two milliseconds in the delay circuit 80.

During this 2 millisecond period, the mark and space frequencies transmitted by the data transmitter 130 of FIG. 4 are detected in the filters 76 of the data receiver 54 and applied to one input of the associated AND-gates 84. The signal from the delay circuit 80 is delayed an additional 100 microseconds in delay circuit 82 and then applied simultaneously to the other input terminal of each of the AND-gates 84.

Should the output of the filter 76 of channel 1, for example, be present in the form of a binary ONE on the input terminal of the channel 1 AND-gate 84 when the delayed enabling timing signal is applied, the data 1 flip-flop 86 will be switched to its set condition to provide a binary ONE output signal. This signal may be used to operate a data relay 88 which can be read by the computer 10.

The operation of the data 1 relay provides a signal on terminal 2 of the data set 16. As shown in FIG. 2, this signal is applied to terminal 8 of the input terminal board TB–B of the computer 10.

Similarly, the enabling of the others of the AND-gates 84 associated with the remaining filters 76 in the data channels 2–8 operates the associated data relay to provide a signal on the proper terminals 3–5 and 7–10 of the data set 16. These data terminals are directly connected to terminals 8–15 of the input terminal board TB–B of the computer 10, as shown in FIG. 2.

The delayed timing signal from the delay circuit 80 is additionally delayed 2 milliseconds in delay circuit 81 and used to operate a timing relay T and to reset each of the flip-flops 85 associated with the data channels 1–8.

The operation of the timing relay T applies a signal to terminal 6 of the data set 16 which is directly connected to terminal O of the input terminal board TB–B of the computer 10 to signal the computer 10 that the signals applied to the data input terminals 8–15 represent the output signals of the data transmitter 130 at the satellite station 28.

Each timing signal T causes the channel select shift register 170 to step the multiplexer 152 to the next data channel in a manner to be explained in connection with FIG. 7. Two complete cycles of data transmission may be utilized for error checking purposes.

Upon the completion of the data transfer, the computer 10 removes the output signal on terminal 12 of the output terminal board TB–B. As shown in FIG. 2, this signal is connected to terminal 16 of the data set and the removal therefrom is used to disable the reverse channel oscillator 70 of the reverse channel transmitter 52 of FIG. 3. The loss of the Reverse Channel signal RC at the reverse channel receiver 112 of the data set 26 of FIG. 4 causes the Reverse Channel relay RCR to drop out, switching the system to the answer back mode by disabling the Data Send relay DS. The Data Mode Receive relay M is thus caused to drop out enabling the answer back receiver 118 by applying bias to the collector electrode of the transistor Q2 and disconnecting the data transmitter 126 by opening the contacts M-1.

VII. COMMAND EXECUTION

As we have seen, the enabling of the command function occurs with the disabling of the reverse channel transmitter 52 by the computer 10. The loss of the Reverse Channel signal causes the Reverse Channel Receive relay RCR to drop out opening the contacts RCR-1 in the Data Send lead of the answer back receiver 118 of FIG. 4. The dropping out of the Data Mode Receive relay M which accompanies the opening of the Data Send lead disconnects the data transmitter from the line by opening the contact M-1 and removes the ground from the collector electrode of the transistor Q-2 thus making the answer back receiver 118 responsive to the Answer Back A, Answer Back B, and Answer Back AB signals from the answer back transmitter 53 of FIG. 3.

As shown in FIG. 2, the Answer Back A and Answer Back B signals from the computer 10 are taken from terminals 14 and 15 in the output terminal board TB–B, are reversed in polarity, and are applied to terminals 18 and 19 of the data set 16 to cause the operation of the normally open contacts A-1 and B-1 in the tank circuit of the answer back transmitter 53 of FIG. 3. These Answer Back signals appear on the lines A, AB, and B of FIG. 5 and are routed in the control logic 154 for storage in the control accumulator 172.

The reapplication of the Reverse Channel signal may then be caused by the computer 10 to switch the system to the data mode and to reinitiate the data transmission cycle as earlier described for the purpose of checking the command signal stored in the control accumulator 172 prior to its execution by the command shift register 153. At the end of this checking process, the Reverse Channel transmitter 52 may be again disabled by the computer 10 in the manner described and an Answer Back B signal used to transfer, by means of the command shift register 153, the commands stored in the control accumulator 172 to an appropriate relay driver circuit (not shown) at the manifold 34 to cause the execution of the command signals.

VIII. THE DATA TERMINAL UNIT

DETAILED DESCRIPTION

As indicated in FIG. 5, the output from the data set 26 comprises Ring (R), Interlock (I), Reverse Channel (RC), Answer Back A (ANS BK A), Answer Back B (ANS BK B), and Answer Back AB (ANS BK AB) signals which are applied to the data terminal unit 30 to initiate data transmission and to perform control functions. The data set 26 receives from the data terminal unit 30 the Data Send, Timing and Data signals. Functionally, the Data Send signal switches the data set 26 to the data mode and the Data signal comprises eight bits of parallel binary data, each Data signal being preceded by a Timing signal which indicates to the computer 10 that the signals which immediately follow are representative of the data at the input to the 402 C data set 26.

Figure 7:
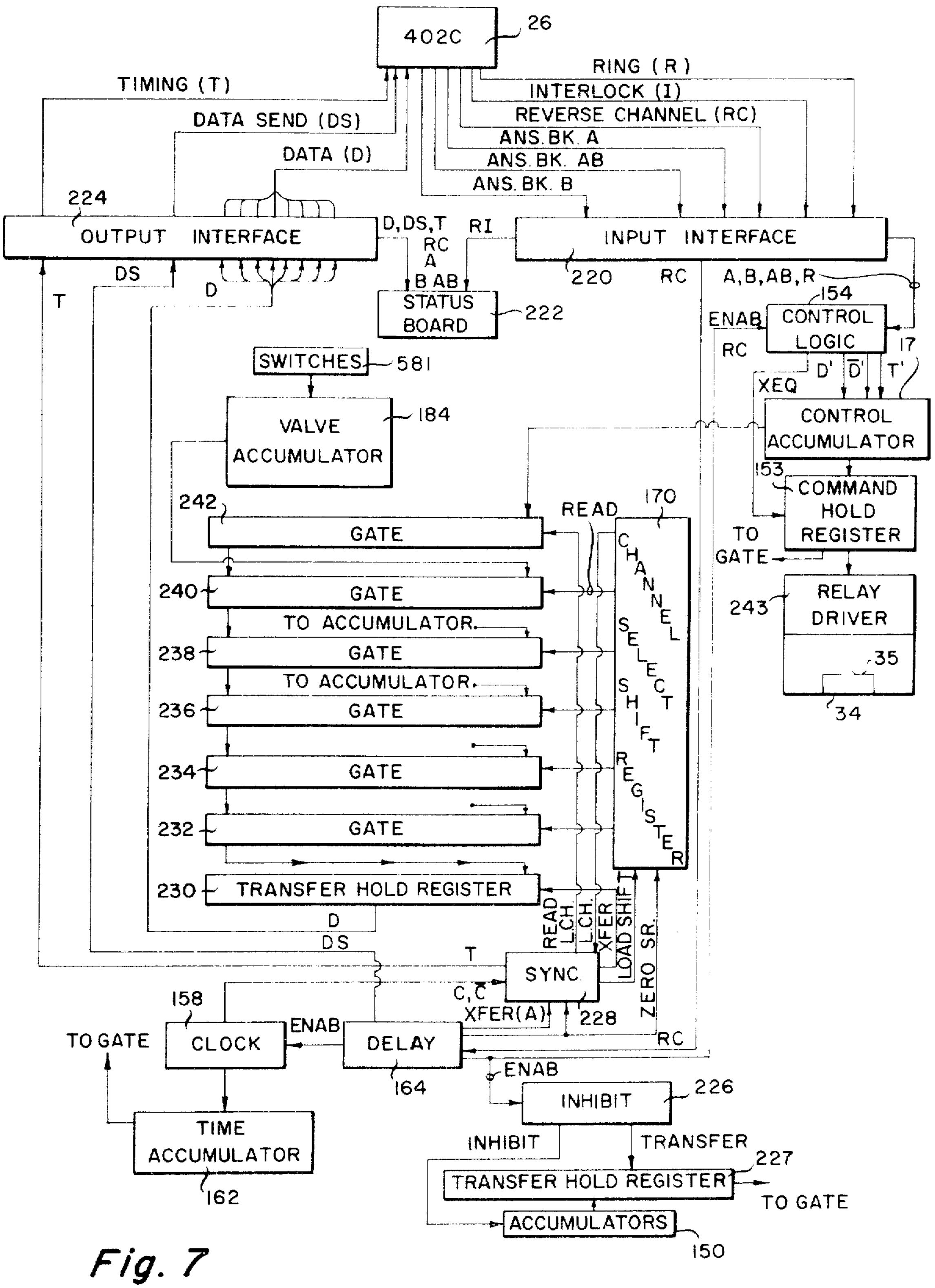
FIG. 7 is a functional block diagram of the data terminal unit of FIG. 5.

Referring now to FIG. 7 for a functional block diagram of the actual circuit of one embodiment of the data terminal unit 30, the output signals from the data set 26 of FIG. 1 are directly connected to an input interface circuit 220 which functions to transform the circuit operating levels of the data set 26 to the operating levels of the digital logic circuitry of the data terminal unit 30. These output signals from the data set 26 may be connected from the input interface circuit 220 to a status board 222 to facilitate the maintenance of the system.

The R, ANS BK A, ANS BK B and ANS BK AB signals from the input interface circuit 220 are applied to the control logic 154. The ANS BK A and ANS BK AB cause the production of the data (D' and $\overline{D}$') and timing (T') signals necessary to load the control accumulator 172 with a control word to be subsequently executed by mechanical or electrical means upon receipt of an ANS BK B signal. The R signal inhibits the unintentional execution of the control word stored in the control accumulator 172 by the ANS BK B echo suppressor disabling signal from the data set 16 of FIG. 1. The next ANS BK B signal received after the reception of the ANS BK A, ANS BK B or RC signals is used to generate an execute signal XEQ to shift the control word stored in the control accumulator 172 through the command hold register 153 to a relay driver circuit 243 whereby the closure of a set of contacts 35 may be effected. These contacts 35 may be utilized to perform any desired function and may, for example, be located at the manifold 34 or elsewhere, as desired.

The RC signal output of the input interface circuit 220 is applied to the delay circuit 164 which enables the clock 158, an inhibit circuit 226, and the control logic 154 by the generation of an enabling signal ENAB. The delay circuit 164 provides the sync circuit 228 with the initial transfer signal XFER (A) which provides the binary ZERO's for the data transmission which operates the Carrier On relay CO for the data receiver 54 of the data set 16 as explained supra in connection with FIG. 3. The sync circuit 228 is also provided with a zero shift register signal ZERO SR signal which enables the generation of the initial LOAD signal. The initial LOAD signal will be shifted along the channel select shift register 170 to sequentially enable the gate circuits 232–242 connected between each of the accumulators of the data accumulator bank 150 and a transfer circuit 230.

A ZERO SR signal is also provided by the delay circuit 164 to the channel select shift register 170 for the initial disabling of all of the gate circuits 232–242. The data send signal DS is applied to the output interface circuit 224 to switch the data set 26 to the data mode. The application of the DS signal may likewise be indicated in the status board 222 for system maintenance as may the timing signal T subsequently to be generated in the sync circuit 228.

The clock 158 provides signals to the time accumulator 162 which may be utilized to indicate the elapsed time between subsequent readings of the data accumulator bank 150. The time accumulator 162 may be connected through one of the gate circuits 232–242 for selective gating to the transfer circuit 230 by the channel select shift register 170. The time accumulator 162 and its associated gate circuit may, of course, be omitted if this feature is not desired.

Periodic clocking signals C and $\overline{C}$ are also generated by the clock 158 and are applied to the sync circuit 228 to control the generation of the LOAD, SHIFT and XFER signals. The LOAD and SHIFT signals are applied to the channel select shift register 170 to successively enable the gate circuits 232–242 between the transfer circuit 230 and the respective accumulators of the data accumulator bank 150. The XFER signal is applied to the transfer signal 230 to transfer the eight bits of binary data from the accumulator associated with the presently enabled one of the gate circuits 232–242 to the output interface circuit 224 as a data signal D. The eight data signals D may also be monitored by means of suitable indicators on the status board 222.

The channel select shift register 170 provides, as previously indicated, the gate circuit 232–242 enabling READ signals and a last channel signal L CH to the sync circuit 228. The delay circuit 164 provides a read last channel signal READ L CH to the last gate 242. The purpose in enabling the last gate circuit 242 from the channel select shift register 170 through the sync circuit 228 is to cause the generation of a further LOAD signal which initiates anew the successive enabling of the gate circuits 232–242 for a retransmission of the data of the accumulator of the data accumulator bank 150.

An inhibit circuit 226 is connected to those accumulators in the data accumulator bank 150 in which the accumulation of data is to be inhibited during the reading of the accumulator. It may not be desirable to inhibit the accumulation of data in all of the accumulators in the data accumulator bank 150. These later accumulators may be connected to a transfer circuit 227 so that the eight bits of digital data in the accumulator may be transferred thereto for multiple readings by the computer 10 while the accumulator continues to update the data contained therein.

Each of the accumulators of the data accumulator bank 150 including the time accumulator 162, control accumulator 172, and valve accumulator 184, is connected to one of the gate circuits 232–242 although these connections are not all shown in FIG. 7 in the interest of clarity. Each of the gate circuits 232–242 is adapted to pass, when disabled by the channel select shift register 170, the output data from the subsequently enabled gate circuit to the transfer circuit 230.

The operation of the data terminal unit 30 will be subsequently explained in greater detail in connection with the timing diagrams of FIGS. 20, 21 and 22. Briefly the application of the RC signal from the input interface circuit 220 to the delay circuit results in the zeroing of the channel select shift register 170 and the transfer of the resulting eight ZERO's in the input of the transfer circuit 230 to the output thereof. The delay circuit 164 also provides the DS signal to the output interface circuit 224 and then generates the enabling signal which enables the clock 158 and inhibits the count of the accumulators in the data accumulator bank 150.

The sync circuit 228, in response to the periodic C and $\overline{C}$ signals from the clock 158, causes the channel select shift register 170 to successively enable the gate circuits 232–242. The enabling of one of the gate circuits transfers the data from the associated accumulator in the data accumulator bank 150 to the input to the transfer circuit 230.

The loss of the RC signal from the input interface circuit 220 returns the system to the answer back mode. The computer 10 can then load the control accumulator 172 with a control word by the use of the ANS BK A and ANS BK AB signals. The control accumulator 172 is connected to one of the gate circuits 242 so that the computer 10 may interrogate the data terminal unit 30 to determine if the control word has been properly received by the data terminal unit 30 prior to its execution.

The control word is subsequently executed by its transfer to the command hold register 153 to control the circuits of the relay driver 243 upon the application of an ANS BK B signal to the control logic 154. The electrical contacts controlled by the relay driver circuit 243 may, for example, control various valves or other control devices at the manifold 34. The status of these valves at the manifold 34 may be sensed by switches which feed the valve accumulator 184 so that the proper execution of the command word may also be checked by the computer 10 by a subsequent interrogation of the data accumulator bank 150.

With continued reference to the block diagram of FIG. 7, the Ring (R), Interlock (I), Reverse Channel (RC), Answer Back A (ANS BK A), Answer Back (ANS BK B), and Answer Back AB (ANS BK AB) signals are applied to the input interface circuit 220. The R signal which results from the closure of the normally open contacts R-2 of FIG. 4 is used to inhibit the execution of the control word stored in the command shift register 153 by the receipt of the ANS BK B signal used to disable the echo suppressor. The R signal is also applied to the status board 222 to provide a visual indication for trouble shooting the system.

The I signal which results from the operation of the Line Status relay LS and the closure of the normally open contacts LS-1 of FIG. 4 is also applied to the status board 222 to provide a visual indication. This signal is not further utilized in the present embodiment but may be used to disable various control functions when the unit is not being interrogated.

The RC signal which results from the operation of the RCR relay is applied to the delay circuit 164 and is there used to generate a ZERO SR signal which causes the generation of the LOAD signal and zeros the input signals to the transfer circuit 230 by zeroing the channel select shift register 170. The ZERO's which appear on the input side of the transfer circuit 230 when none of the gate circuits 232–242 are enabled by the channel select shift register 170 are transferred to the output side of the transfer circuit 230 by a XFER (A) signal generated in the delay circuit 164. The trailing edge of the XFER (A) signal also effects the generation of a timing signal T.

It may be desirable to modify the operation of the system to cause another timing signal T to appear a predetermined period of time after the DS signal and before the transmission of the data in the first channel. A timing transmission or signal T which occurs about 40 milliseconds after the DS signal has been found to be appropriate.

The timing signal T which occurs immediately after the XFER (A) signal may not be recognized by the computer. A timing signal 40 milliseconds after the DS signal will be recognized by the computer. This first eight bit data signal D that the computer receives will thus be all ZERO's rather than the data contents of the first data accumulator 232. The second data signal D will thus be the data from channel one and the data in each of the other data channels will be received in their normal sequence.

The above modification, while not necessary, provides additional dependability in the operation of certain data sets of early manufacture. The addition of this circuit is a simple matter for a person skilled in the art and will not be further discussed.

The reverse channel indicator lamp at the status board 222 may also be desirably lighted at this time since the RC signal determines the direction of data transmission between the data sets 16 and 26.

Receipt of the RC signal also causes a DS signal to appear as an output of the delay circuit 164. The DS signal is fed through the output interface circuit 224 to effect the operation of the Data Send relay DS of FIG. 4 thereby grounding the Data Send lead through the contacts DS-1. The grounding of the Data Send lead switches the data terminal unit 30 to the data mode in the manner described in connection with the operation of the circuit of FIG. 4. The delay circuit 164 also generates a clock 158 enabling signal ENAB. The ENAB signal is also used to inhibit the counting of the accumulators in the data section of the data accumulator bank 150 by means of an inhibit circuit 226 subsequently to be described.

The clock 158, once enabled by the ENAB signal from the delay circuit 164, will commence the generation of the periodic signals C and $\overline{C}$ commencing always with a full width C signal and a concluding always with a full width C signal. The first pulse from the clock 158 operates through the generation of a SHIFT signal in the sync circuit 228 to cause the first position of the channel select shift register 170 to assume the voltage level of the LOAD signal, a binary ONE in this case. The LOAD signal thereupon assumes the voltage level of the last channel binary in the channel select shift register, in this case a binary ZERO. The application of each SHIFT signal to the channel select shift register causes each binary element therein to assume the voltage level of the binary immediately preceding.

The binary ONE which appears at the first binary element of the channel select shift register 170 is applied to the first gate circuit as a READ signal. The data signals D stored in the gate 232 of channel 1 are thereby transferred to the input side of the transfer hold register 230 to await the next SHIFT signal.

A transfer signal XFER is generated upon the cessation of the first pulse of the C signal. This inverted C signal, hereinafter referred to as $\overline{C}$, causes the data from the first data accumulator loaded in the input of the transfer hold register 230 by the first clock pulse to be moved to the output thereof. A timing signal T is generated by the cessation of the XFER signal and effects the transmission of the data held in the output side of the transfer hold register 230. The timing signal T is used by the computer 10 for synchronization of the data transmission in the manner previously described in connection with the operation of the circuit of FIG. 3.

The second pulse of the C signal from the clock 158 causes the sync circuit 228 to generate a SHIFT signal which moves the binary ONE into the second or channel 2 position of the channel select shift register 170. The presence of the binary ONE in channel 2 of the channel select register 170 enables the channel 2 gate circuit 234 by a READ signal which moves the data from the channel 2 accumulator through the disabled channel 1 gate 232 to the input side of the transfer hold register 230.

The second pulse of the $\overline{C}$ signal causes the sync circuit 228 to generate a second XFER signal which moves the data D at the input of the transfer circuit 230 to the output thereof. The $\overline{C}$ signal also causes the generation of another timing signal T. The T signal causes the transmission of the output of the transfer hold register 230, the contact closure of the first accumulator in this case, through the output interface circuit 224 to the data set 26.

The third pulse of the C signal causes the sync circuit 228 to generate another SHIFT signal which, when applied to the channel select shift register 170, enables the channel 3, gate circuit 236 by a READ signal. The data contained in the accumulator associated with the channel 3 gate circuit 236 is moved directly through the enabled gate circuit 236 and the disabled channel 1 and 2 gate circuits 232 and 234 to the input of the transfer circuit 230. The contents of the input of the transfer circuit 230 are applied to the data set 26 with the generation of the timing signal T by the sync circuit 228.

This procedure continues in response to the periodic C and $\overline{C}$ signals until the data in the last channel is transmitted and gate circuit enabling binary ONE walks out of the end of the channel select shift register 170. The last accumulator may be wired to transmit all ONE's. The transfer circuit 230 then contains all ZERO's and the eight ZERO's are transmitted to the computer 10. In this manner, what is considered by the data set manufacturer to be the worst case in regard to the data transmission, i.e., the transition from all ONE's to all ZERO's, is presented to the computer 10.

The Last Channel signal (L. CH.) from the last of the channels in the channel select register 170 is applied to the sync circuit 228 where a Read Last Channel signal (READ L. CH.) is generated. The READ L. CH. signal, in addition to enabling the last gate circuit 242, also causes a LOAD signal to be generated following the next SHIFT signal.

A binary ONE is thus reloaded into the channel select shift register 170 by the sync circuit 228. Each of the data channel gates 230–242 is then successively enabled in the manner described supra to retransmit the data contained in the eight data channels of each of the accumulators of the data accumulator bank 150 for error checking purposes. The accumulators of the data accumulator bank 150 having been inhibited in the manner explained in Section IV—Data Transmission, errors will not be indicated to the computer by the interim updating of the data contained therein between the two data transmissions.

Upon receipt of the second complete transmission of the data and a match in the data received, the computer 10 may cause the Reverse Channel Relay RCR to drop out.

The loss of the RC signal stops the transmission of data from the DTU 30 to the computer and switches the system to the answer back mode by opening the FIG. 4 DS–1 contacts in the Data Send lead to release the Data Mode Receive relay M in the answer back receiver 118 of the data set 26. The data transmitter 130 is thus disconnected from the line. Opening the Data Send lead also applies positive bias to the collector electrode of the transistor Q–2 to thereby make the answer back receiver 118 responsive to the Answer Back A, Answer Back B and Answer Back AB signals from the computer 10.

The ANS BK A and ANS BK AB signals from the data set 26 on the Answer Back A and AB leads are converted to data signals D′ and timing signals T′ in the control logic 154. Response to these signals is inhibited by the presence of the RC signal as will be explained infra. The control word represented by the ANS BK A and ANS BK AB signals are walked into the control accumulator 172 for subsequent transmission to the driver circuit 243 at the manifold 34 through the command shift register 153 upon execution by an ANS BK B responsive XEQ signal generated in the control logic 154.

The RCR–1 contacts of the Reverse Channel Receiver relay RCR may be again closed by the computer 10 by the operation of the reverse channel transmitter 52 to switch the system back to the data mode, The command signals stored in the control accumulator 172 may then be read in the manner described for the purpose of checking for errors prior to the execution of the control word.

The command hold register 153 is essentially a transfer circuit and may be similar in every respect to that of the transfer hold register 230. As shown in FIG. 7, the signal stored in the command hold register 153 may be applied to a gate circuit for subsequent reading by computer 10. In this way, the transfer of the control word may additionally be checked prior to execution. Thus, the transmission of the control word from the computer 10 to the control accumulator 172 and the transfer from the control accumulator 172 to the relay driver circuit 293 may each be checked by the computer 10 to prevent the execution of an undesired command.

Figure 8:
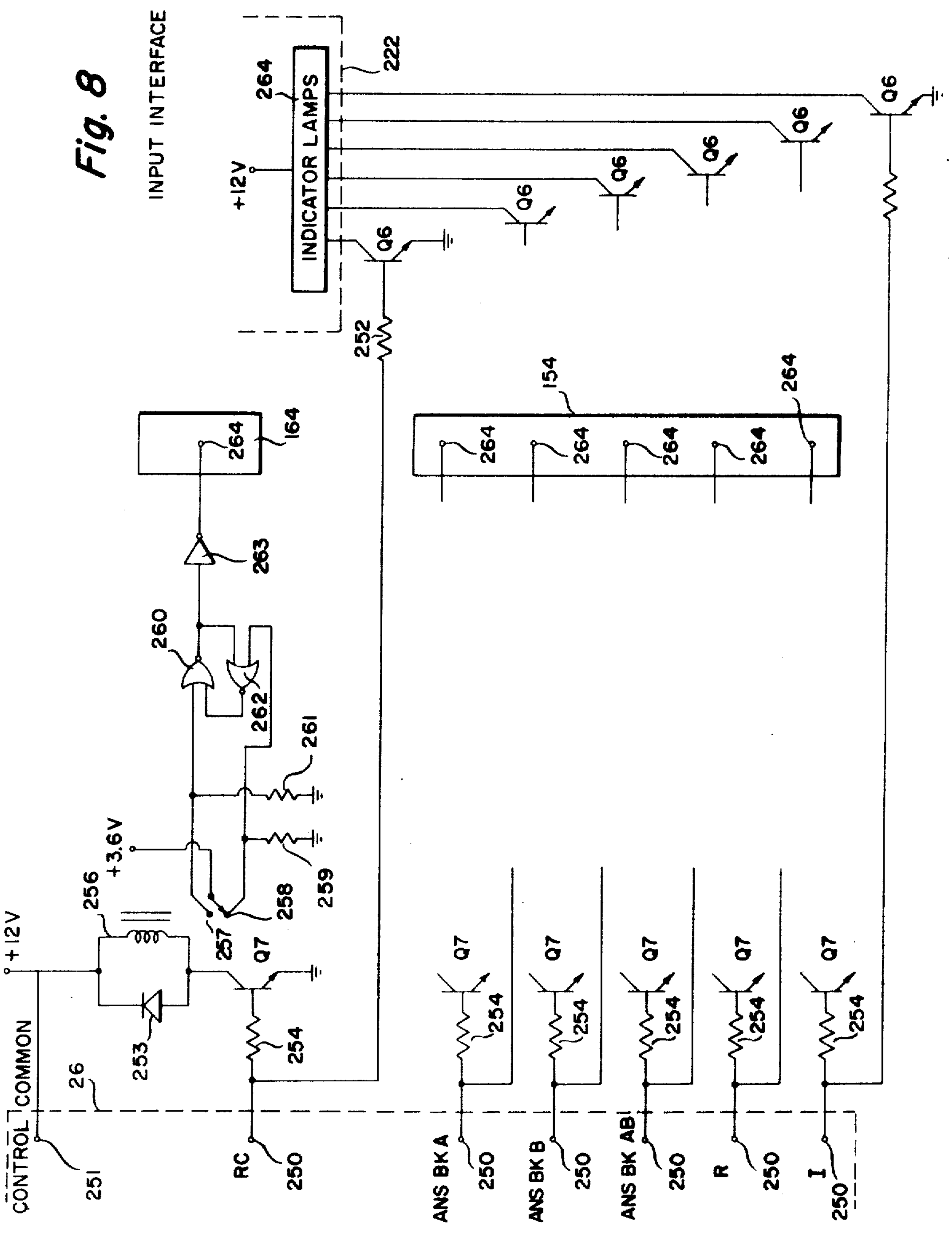
FIG. 8 is a schematic diagram of the input interface circuit of FIG. 7.

The input interface circuit 220 of FIG. 7 is shown in detail in FIG. 8. As stated previously, the purpose of the input interface circuit 220 is to convert the voltage levels of the contact closures of the data set 26 to the voltage levels acceptable to the data terminal unit 30.

As seen in FIG. 8, a schematic diagram of the input interface circuit 220, the Reverse Channel (RC), Answer Back A (ANS BK A), Answer Back B (ANS BK B), Answer Back AB (ANS BK AB), Ring (R), and Interlock (I) input signals to the input interface circuit 220 correspond to the six outputs from the data set 26 shown in FIG. 5. The signals which appear on these leads are generated by contact closures which apply a positive voltage of between 12 and 18 volts by way of their common lead when the appropriate contact is in the "on" position and approximately 0 volts when the appropriate contact is in the "off" position.

Each of the above input signals is applied to on input terminal 250 at the data set 26, through a resistor 252 to the base electrode of a NPN-transistor Q6. The emitter electrode of each of the transistors Q 6 is grounded and the collector electrode thereof is connected to a bank of indicator lamps 264 energized by a 12 volt DC source in the status board 222 of FIG. 7.

Each of the terminals 250 is also connected through a resistor 254 to the base electrode of an NPN-transistor Q 7. The emitter electrode of each of the transistors Q7 is grounded and the collector electrode is connected through a relay coil 256 to a positive 12 volt source of DC. A 12 volt DC source may also be connected to the CONTROL COMMON terminal 251 of the data set 26 to provide the supply voltage for each of the terminals 250. A diode 253 may parallel each of the relay coils 256.

A normally open relay contact 257 and a normally closed relay contact 258 may be provided for each of the relays 256. Each of the relay contacts 257 is connected to ground through a resistor 261 and to one input terminal a NOR-gate 259. Each of the relay contacts 258 is grounded through a resistor 261 and is connected to one input terminal of a NOR-gate 262. The output terminals of both of the NOR-gates 260 and 262 are connected to the other input of the other of the NOR-gates 262 and 260. The output terminal of the NOR-gate 260 is also connected through an inverter 263 to an output terminal 264. The output terminal 264 associated with the RC signal input terminal 250 is directly connected to the delay circuit 164 of FIGS. 7 and 11. The output terminals 264 associated with the remaining terminals 250 of the data set 26 are directly connected to the control logic 154 of FIGS. 7 and 8.

In operation, the presence of a 12 volt positive signal, a binary ONE, on one of the input terminals 250 drives the associated transistor Q6 into saturation. The current path from the 12 volt source of the status board 222 through the appropriate lamp in the bank of the indicator lamps 264 is thus completed through the transistor Q6 to provide a visual indication of the presence of the signal for purposes of trouble shooting and the servicing of the data terminal unit 30.

The application of the 12 volt positive signal through the associated resistors 254 to the base electrode of the associated transistors Q 7 also drives it into saturation thus providing a current path from the 12 volt source of terminal 251 of the data set 26 through the associated relay coil 256 and the emitter collector path of the transistor Q 7 to ground.

Operation of the contacts associated with the relay coil 256 will apply 3.6 volts, a binary ONE, to the input terminal of the NOR-gate 260 while removing the binary ONE from the input terminal of the NOR-gate 262. The binary ONE signal appearing on the output terminal of the NOR-gate 260 is thus inhibited and a substantially 3.6 volt binary ONE applied to the associated terminal 264.

Exemplary values of the respective electrical components of the input interface circuit 220 of FIG. 8 are as follows:

| | |
|---|---|
| Transistors Q6 and Q7 | 2N 697 |
| Resistors 252 and 254 | 6.8 kΩ |
| Resistors 259 and 261 | 1.0 kΩohms |
| Diodes 260 | IN 3254 |

Figure 11:
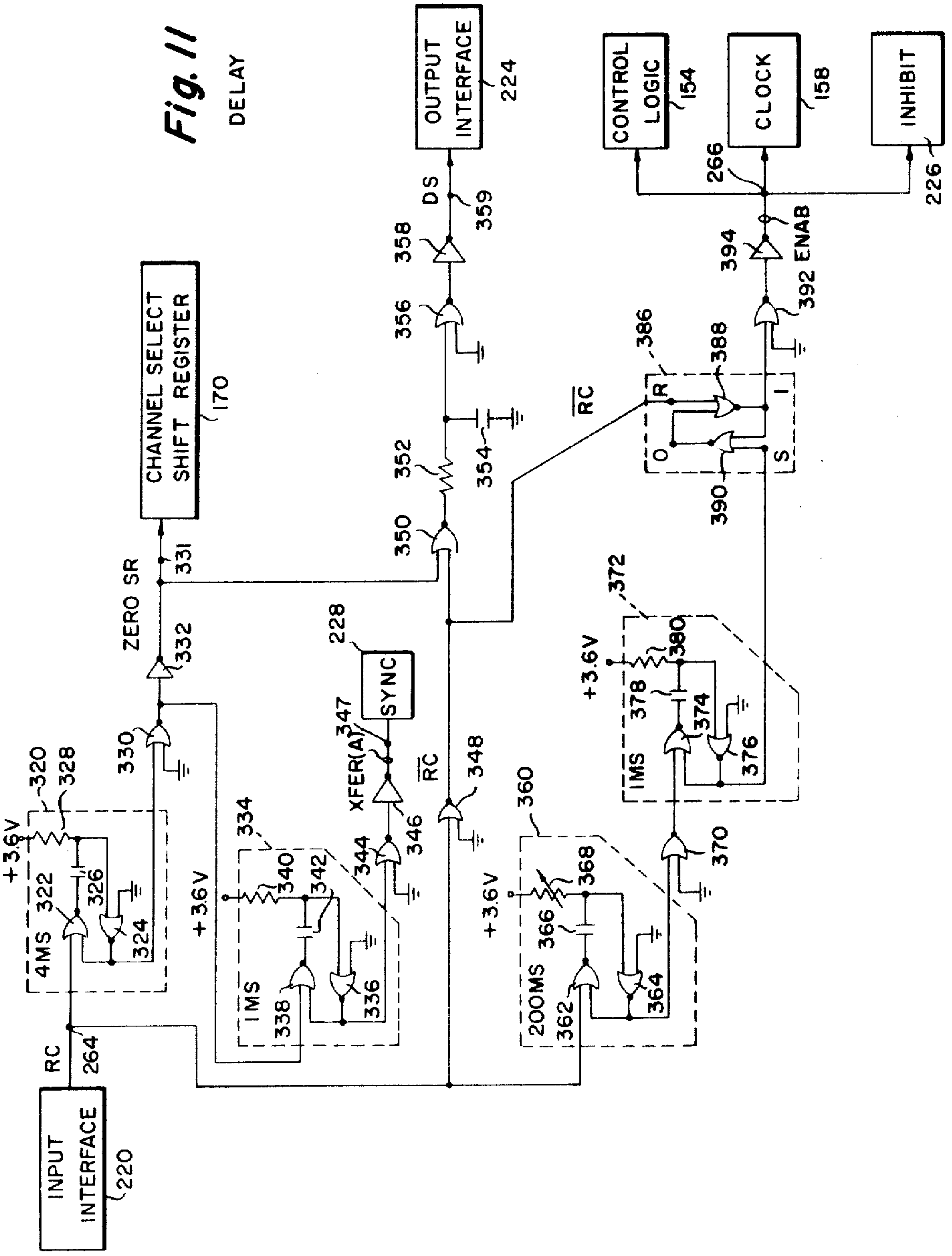
FIG. 11 is a schematic diagram of the delay circuit of FIG. 7.

As indicated in FIGS. 7, 8 and 11, the Reverse Channel signal RC is fed to the delay circuit 164 and from there to the control logic 154 with the enabling signal ENAB. The generation of the ENAB signal will be subsequently discussed in connection with the delay circuit 164 of FIG. 11. The RC signal also acts, to inhibit the production of the timing signal T′ and the data signals D and $\overline{D}'$ to the control accumulator 172 while the data set 26 is in the data mode.

Figure 9:
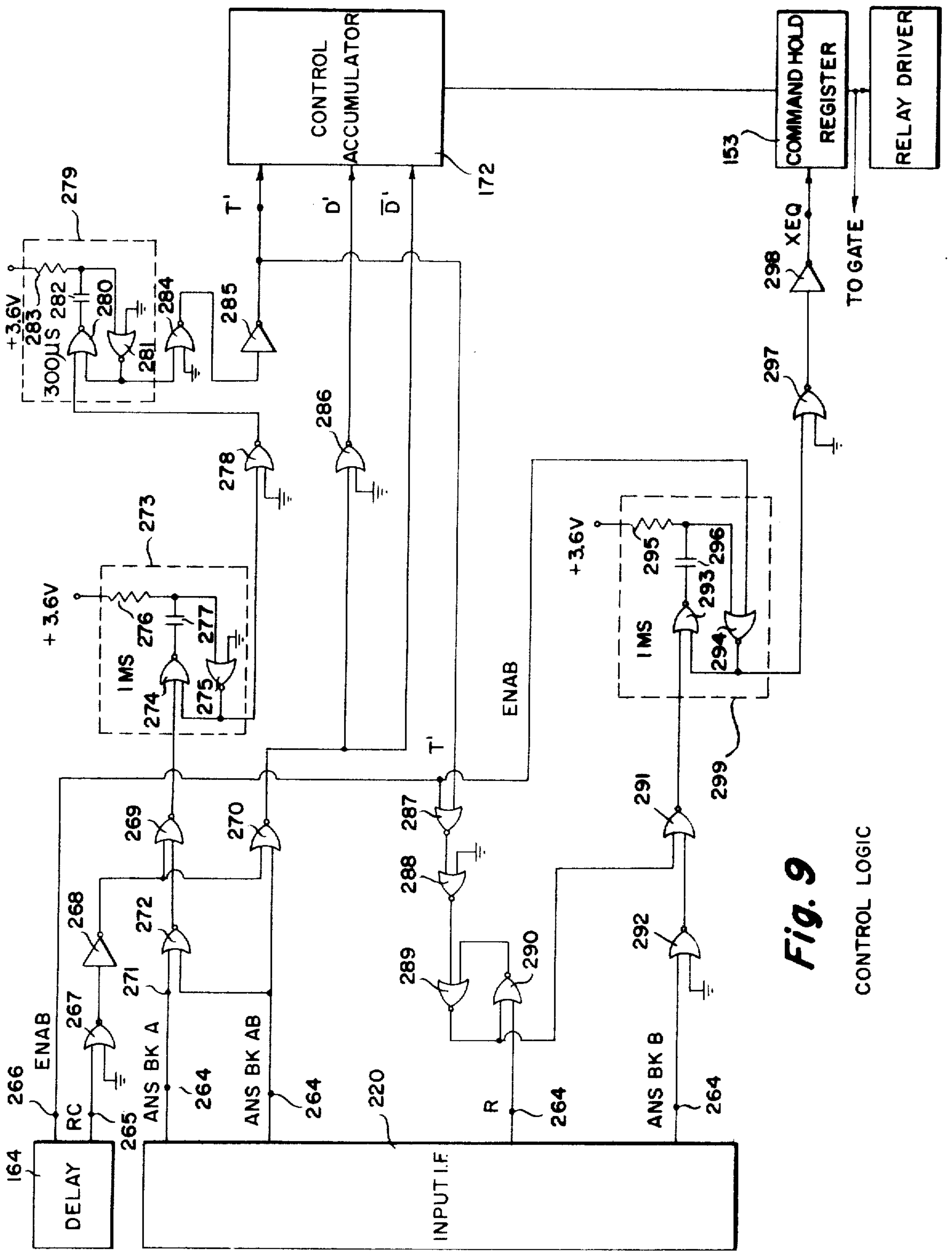
FIG. 9 is a schematic diagram of the control logic circuit of FIG. 7.

As shown in the control logic circuit of FIG. 9, the RC signal from the delay circuit 164 is twice inverted in a grounded input NOR-gate 267 and an inverter 268 and applied to one input terminal of the NOR-gates 269 and 270.

The ANS BK A signal from terminal 264 of the input interface circuit 220 of FIG. 8 is applied to one input terminal 271 of the NOR-gate 272. The ANS BK AB signal is applied to the other input terminal of the NOR-gates 272 and 270. The output terminal of the NOR-gate 272 is connected to the other input terminal of the NOR-gate 269 and the output terminal of the NOR-gate 269 connected to a 1 millisecond one-shot or monostable multivibrator 273.

The NOR gates mentioned supra and those to be subsequently discussed are commercially available logic circuits whose operation is well known in the art. They function to provide an output signal, a binary ONE, only in the absence of a signal, binary ZERO's, on both input terminals in accordance with the following table:

| INPUT A | INPUT B | OUTPUT |
|---|---|---|
| 1 | 1 | 0 |
| 1 | 0 | 0 |
| 0 | 1 | 0 |
| 0 | 0 | 1 |

The grounding of one input terminal of a NOR gate insures a ZERO input thereto and causes the NOR gate to invert the signal applied to the other input terminal in accordance with the following table:

| INPUT A (grounded) | INPUT B | OUTPUT |
|---|---|---|
| 0 | 1 | 0 |
| 1 | 0 | 1 |

The inverters discussed supra are likewise conventional logic circuits and functions in the manner of a grounded NOR as described above to invert the whatever binary signal is applied to the single input terminal.

As an example of these logic gates, the Fairchild U8B990028 or type 9900 inverter and the Fairchild U8A991428 or type 9914 dual NOR gate commercially available from the Semiconductor Division of Fairchild Camera and Instrument Co. Of Mountain View, California, have been found satisfactory. These particular logic gates are respectively associated with orders numbers U8B990028X and U8A991428X.

Multivibrator 273 comprises a pair of NOR-gates 274 and 275, a resistor 276 and a capacitor 277. The input terminal of the multivibrator 273 is one input terminal of the NOR-gate 274. The output terminal of the NOR-gate 274 is connected through the capacitor 277 to one input terminal of the NOR-gate 275 whose other input terminal is grounded. The output terminal of the NOR-gate 274 is also connected through the capacitor 277 and the resistor 276 to a 3.6 volt source of positive potential. The output terminal of the NOR-gate 275 is connected to the other input terminal of the NOR-gate 274 and also serves as the output terminal for the multivibrator 273.

The output of the multivibrator 273 is inverted in a grounded input NOR-gate 278 and applied to the input terminal of a 300 microsecond one shot or monostable multivibrator 279. Multivibrator 279 comprises NOR-gates 280 and 281, a capacitor 282 and a resistor 283. Operation of the multivibrator 279 is similar to that of the multivibrator 273 previously described.

The output terminal of the multivibrator 279 is connected through a grounded input NOR-gate 294 and an inverter 285 to the control accumulator 172 to provide the timing signal T'. The timing signal T' is used to effect the loading of the binary data signal D' or $\overline{D}'$ into the control accumulator 172. The generation of the T' signal is responsive to both ANS BK A and ANS BK AB signals unless inhibited by the presence of the RC signal.

The output of the NOR-gate 270 provides the inverted data signal $\overline{D}'$ which may, of course, be substituted for the D' signal if it is desired that the lower voltage logic signal be defined as a binary ONE. The inverted data signal $\overline{D}'$ may again be inverted in a grounded input NOR-gate 286 to provide a data signal D' input to the control accumulator 172. In this manner, the ANS BK AB signal produces the D' signal and effects the shifting of the control accumulator 172 to receive the next bit of the control word. The ANS BK A signal produces no D' signal, but does produce the timing signal T' which effects the loading of binary ZERO into the control accumulator 172.

The timing signal T' applied to the control accumulator 172 is also applied, together with the ENAB signal from the delay circuit 164, to the input terminals of a NOR-gate 287. The output terminal of the NOR-gate 287 is connected through a grounded input NOR-gate 288 to one input terminal of a NOR-gate 289.

The signal on the output terminal of the NOR-gate 289 and the R signal from terminal 264 of input interface circuit 220 are applied to the two input terminals of a NOR-gate 290 whose output terminal is connected to the other input terminal of the NOR-gate 289. The output terminal of the NOR-gate 289 is also connected to one input terminal of a NOR-gate 291.

The ANS BK B signal from terminal 264 of the input interface circuit 220 is applied through a grounded input NOR-gate 292 to the other input terminal of the NOR-gate 291. The output terminal of the NOR-gate 291 is connected to a 1 millisecond one-shot or monostable multivibrator 299 comprising NOR-gate 293 and 294, a resistor 295, and a capacitor 296. These elements are connected in the manner illustrated and discussed supra in connection with the multivibrator 273 with the exception of the application of an inhibiting ENAB signal from the delay circuit 164 to one input terminal of the NOR-gate 294. The output terminal of the multivibrator 299 is connected through a grounded input NOR-gate 297 and an inverter 298 to provide the XEQ signal input to the command hold register 153 as shown in FIG. 7.

In operation, the presence of an R signal inhibits the NOR-gate 290. In the absence of ENAB and T' signals, the output signal from the NOR-gate 288 is a binary ZERO which results in the generation in the NOR-gate 289 of a binary ONE signal inhibiting the NOR-gate 291. The inhibiting of the NOR-gate 291 renders the multivibrator 292 nonresponsive to an ANS BK B signal and thus prevents the application of an XEQ signal to the command hold register 153. The multivibrator 292 is also made nonresponsive to an ANS BK B signal by the presence of an ENAB signal from the delay circuit 164 at the NOR-gate 294 of the multivibrator 292.

The generation of an XEQ signal is thus prevented by the ENAB signal or by an ANS BK A or ANS BK AB signal. As will be shown, the ENAB signal is coexistent with the data mode. The execution or transferring of a control word stored in the control accumulator 172 through the command hold register 153 can thus only occur when the data set 26 is in the answer back or command mode. And while the answer back mode, the application of either an ANS BK A or ANS BK AB will also allow the later execution of the control word in the command hold register 153. The accidental production of an XEQ pulse by the ANS BK B command automatically generated by the data set during initial setup is prevented.

Exemplary values for the various electrical components of the control logic multivibrators 273, 279 and 292 shown in FIG. 9 are as follows:

| | |
|---|---|
| Resistors 276, 293 and 295 | 4.7 kΩ |
| Capacitors 277 and 296 | 0.33 microfarads |
| Capacitor 282 | 0.1 microfarads |

The command hold register 153 of FIGS. 7 and 9 is a transfer circuit similar in every respect to the transfer circuit 230 of FIG. 7 discussed subsequently in detail in connection with FIG. 18. Accordingly, it will not be separately here discussed.

The function of the command hold register 153 is to transfer the control word stored in the control accumulator 172 by the ANS BK A and ANS BK AB signals to the relay driver circuit 243 upon the application of the XEQ signal from the control logic 154. As indicated in FIG. 1, the relay driver circuit 243 may, for example, control the operation of the valves at the manifold 34 which connect a particular well to the well test unit 32.

The command hold register 153 may, in addition, have an output to one of the gate circuits 230–242 so that the computer 10 may not only check the admission of the control word to the control accumulator 172, but may check the control word as transferred to the relay driver circuit 243 on the execution thereof. As will be later seen, the switches 581 associated with the valve accumulator 184 of FIG. 7 may reflect the control word as executed and thus the actual execution of the control word may be checked by means of the valve accumulator 184.

As indicated in FIG. 7, the relay driver circuit 243 receives the eight bits of the control word from the command hold register 153 and transforms the same into control signals for operating valves or other equipment.

Figure 10:
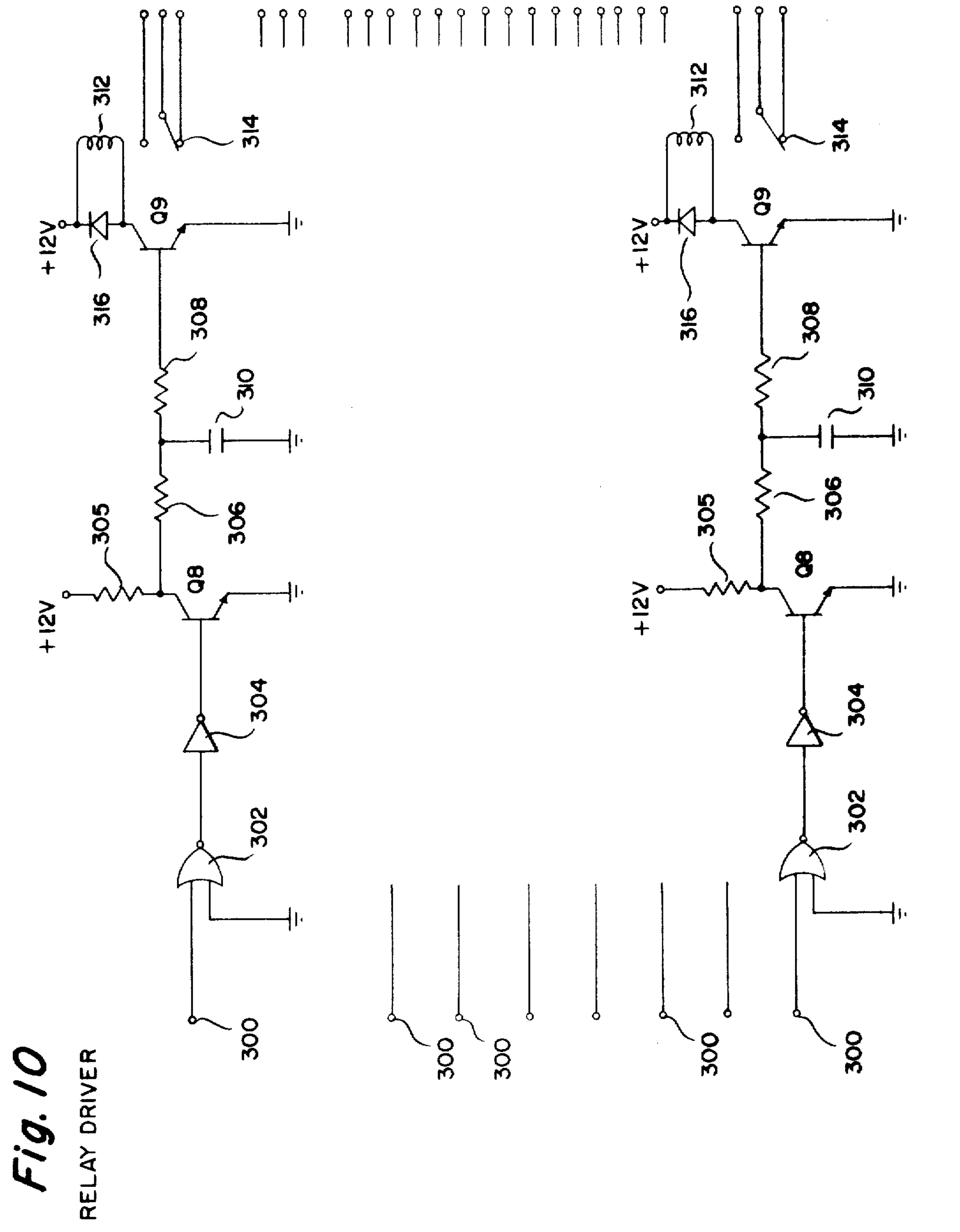
FIG. 10 is a schematic diagram of the relay driver circuit of FIG. 7.

Referring now to the circuit of FIG. 10, the relay circuit 243 comprises a plurality of input terminals 300 each adapted to receive a signal from one of the eight outputs of the command hold register 153. The number of operations to be controlled by a single eight bit control word may, of course, be varied by the addition of parallel control circuits or the number and arrangement of the contacts of the relay 314 ultimately controlled by each of the eight bits of the control word.

The control signal applied to one of the terminals 300 is connected through a grounded input NOR-gate 302 and an invertor 304 to the base electrode of an NPN-transistor Q 8. The emitter electrode of each of the transistors Q 8 is grounded and a positive bias is applied from positive 12 volt source through a resistor 305 to the collector electrode of each of the transistors Q 8.

The collector electrode of each of the transistors Q 8 is connected through a resistor 306, across a capacitor 310, and through a resistor 308 to the base electrode of a grounded emitter NPN-transistor Q 9. The collector electrode of each of the transistors. Q 9 is connected through the relay coil 312 of a relay 314 to a positive 12 volt source. Each of the relay coils 312 is paralleled by a diode 316 to suppress the generation of high-voltage transients when the current through the relay coil is interrupted.

In operation, the presence of a binary ONE, a +3.6 volt potential, on one of the input terminals 309 results in the application of a positive potential to the base electrode of the associated transistor Q 8. This drives transistor Q 8 into saturation, essentially grounding the collector electrode and removing the positive potential applied from the 12 volt source through resistor 305, 306 and 308 to the base electrode of the associated transistor Q9.

Resistors 306 and 308 together with capacitors 310 filter or shape the negative going signal applied to the base electrode of the associated transistor Q9 to limit the speed of the transition of the transistor Q9 from saturation to cutoff and vice versa to thus prevent random noise from accidentally causing the production of an erroneous signal.

The application of a negative pulse, i.e., the loss of the positive potential at the base electrode, drives the transistor Q9 into cutoff disrupting the current flow from the 12 volt source through the relay coil 312 and the emitter-collector of the transistor Q9 to ground. This, of course, causes the closures of the contact of the relay 312 to change. This change in the contact closures of the relays 314 may be used as desired for any number of control purposes in a manner well known in the art.

If it is desired that the control relays maintain their previous state in the event of power failure, the circuit of FIG. 10 may be modified by the replacement of the relay 314 with a magnetic or mechanical latching relay. The remainder of the circuit of FIG. 10 may be replaced by any conventional circuit which samples the data at the terminal 300 during or immediately after the presence of the XEQ signal and causes the latching relay to assume that state.

Exemplary values for the various electrical components of the circuit of FIG. 10 are as follows:

| | |
|---|---|
| Transistors Q8 | 2N 2923 |
| Transistors Q9 | 2N 679 |
| Diodes 316 | I N 3254 |
| Resistors 305 | I K ohms |
| Resistors 306 | I kΩ |
| Resistors 308 | I K ohms |
| Capacitors 310 | 100 microfarads |

As indicated in FIG. 7, the RC signal output of the input interface circuit 220 is not applied directly to the control logic 154 but is applied instead through the delay circuit 164 as shown in more detail in the circuit of FIG. 11.

With continued reference to FIG. 7, the delay circuit 164 provides, at appropriate intervals, the ZERO SR signal to the channel select shift register 170, the XFER (A) and ZERO SR signals to the sync circuit 228, the DS signal to the output interface circuit 224, and the ENAB signal to the clock 158 and the control logic 154. The generation of these signals will be explained infra and the relative occurrences thereof will be discussed in detail in connection with the timing diagram of FIGS. 20, 21 and 22.

Referring now to the delay circuit of FIG. 11, the RC signal is directly applied to the input terminal of a 4 millisecond one-shot or monostable multivibrator 320. Multivibrator 320 comprises NOR-gates 322, 324, a capacitor 326 and resistor 328 connected in a manner previously discussed in connection with the multivibrator 273, 279 and 299 of the control logic 154 of FIG. 9. The output terminal of the multivibrator 320 is connected through a grounded input NOR-gate 330 and an inverter 332 to terminal 331 of the channel select shift register 170 of FIGS. 7 and 15 and to terminal 333 of the sync circuit 228 of FIGS. 7 and 14. This twice inverted 4 millisecond output signal of the multivibrator 320 is the ZERO SR signal which prepares the channel select shift register 170 for the sequential generation of the READ signals which enable the gate circuits 230–242 of FIG. 7 for the transfer of data from the accumulators of the data accumulator bank 150 to data set 26. The ZERO SR signal is also used by the sync circuit 228 to control the initial generation of the LOAD signal.

In operation, the application of the RC signal, a binary ONE, to the first NOR-gate 322 of the multivibrator 320 results in a binary zero output signal therefrom which is applied to one input terminal of the grounded input NOR-gate 324. Inasmuch as the other input terminal of the NOR-gate 324 is grounded, the ZERO input signal from the NOR-gate 322 provides a binary ONE signal at the output terminal thereof further inhibiting the NOR-gate 322. The binary ONE output signal of the NOR-gate 324 is taken as the output of the multivibrator 320 and is twice inverted as earlier explained in the grounded input NOR-gate 330 and the inverter 332 to provide the positive ZERO SR signal to the channel select shift register 170. As capacitor 326 charges through the resistor 328, the NOR-gate 324 inhibits the NOR-gate 324 to produce a binary ZERO signal 4 ms. after the application of the RC signal. The 4 millisecond duration of the output signal of the multivibrator 320 is a function of the values of the capacitor 326 and the resistor 328, as is well known in the art.

With continued reference to FIG. 11, the inverted output signal from the multivibrator 320 is applied to a 1 millisecond one-shot or monostable multivibrator 334 comprising NOR-gates 336 and 338, a resistor 340 and a capacitor 342. The multivibrator 334 functions in the manner of the multivibrator 320 to produce a positive signal of 1 millisecond duration upon the termination of the 4 ms. signal generated by the application of the RC signal to the multivibrator 320. The output terminal of the multivibrator 334 is connected through a grounded input NOR-gate 344 and an inverter 346 to terminal 347 of the sync circuit 228 of FIGS. 7 and 14.

The 1 millisecond output signal of the multivibrator 334 which eventually results from the application of the RC signal from the input interface circuit 220 is then twice inverted to produce the transfer signal XFER (A) which is applied to the terminal 347 of sync circuit 228.

The RC signal from the input interface circuit 220 is also inverted in a grounded input NOR-gate 348 to produce an $\overline{RC}$ signal. This $\overline{RC}$ signal is applied to one input terminal of a NOR-gate 350. The ZERO SR signal taken from the output terminal of the inverter 332 is applied to other input terminal of the NOR-gate 350. The output terminal of the NOR-gate 350 is connected through a resistor 352, across a capacitor 354 and through a grounded input NOR-gate 356 and an inverter 358 to terminal 359 of the output interface circuit 224 of FIGS. 7 and 19.

The application of the $\overline{RC}$ signal from the input interface circuit 220 to the delay circuit 164 thus results in the generation of a DS signal in the absence of the ZERO SR signal. The generation of the DS signal is thus delayed until the termination of the 4 millisecond duration ZERO SR signal immediately produced from the application of the RC signal. Any short duration transient signals resulting from the inherent delays of the logic circuits are removed by the interaction of resistor 352 and capacitor 354. In this manner, the switching of the data set 26 of FIG. 4 to the data mode by the closing of the contacts DS-1 in the Data Send lead is delayed until the channel select shift register 170 is zeroed, disabling all of the accumulator bank 150 gate circuits 232–242 of FIG. 7. The resulting binary ZERO's at the input terminals of the transfer hold register 230 are then shifted to the output terminals thereof by the application of the XFER (A) signal produced by the trailing edge of the ZERO SR signal as will be described.

Referring still to FIG. 11, the RC signal from the input interface circuit 220 is additionally applied to the input terminal of a 200 millisecond one-shot or monostable multivibrator 360. The multivibrator 360 comprises NOR-gates 362 and 364, a capacitor 366, and a variable resistor 368. The components of the multivibrator 360 are connected in the manner of the multivibrators 320 and 334 earlier described to produce an output signal of 200 millisecond duration upon the application of the RC signal to the delay circuit 164. The duration of the output pulse from the multivibrator 360 is made variable by providing for the adjustment of the ohmic value of the resistor 368. The output pulse must, however, be of sufficient duration for the data set to receive the all space signal prior to the enabling of the clock 158. A 200 millisecond interval has been found sufficient for this purpose.

The output terminal of the multivibrator 360 is inverted in a grounded input NOR-gate 370 and is applied to the input terminal of a 1 millisecond one-shot monostable multivibrator 372 comprising NOR-gates 374 and 376, a capacitor 378 and a resistor 380 connected in the manner of the multivibrator 360. The output terminal of the multivibrator 372 is connected to the set input terminal of a flip-flop 386 comprising cross coupled NOR-gates 388 and 390. The output terminal of the NOR-gate 348 is connected to the reset terminal of the flip-flop 386, and the output terminal of the NOR-gate 388, the binary "1" output terminal of the flip-flop 386, is connected through a grounded input NOR-gate 392 and an inverter 394 to terminal 266 of the inhibit circuit 226 of FIGS. 7 and 13, the clock circuit 158 of FIGS. 7 and 12, and the control logic 154 of FIGS. 7 and 9.

In operation, the RC signal produces a 200 millisecond output signal from the multivibrator 360 which removes the input signal from the multivibrator 372. At the termination of the 200 millisecond period, the reapplication of a signal on the input terminal of the multivibrator 372 will produce a 1 millisecond output signal which sets a binary ONE at the output of the flip-flop 386 and thereby provides an ENAB signal to the control logic 154, the clock 158 and the inhibit circuit 226. The generation of the ENAB signal is thus delayed at least 200 milliseconds after receipt of the RC signal, principally by the multivibrator 360.

The application of the $\overline{RC}$ signal from the NOR-gate 348 to the Reset terminal of the flip-flop 386 immediately upon loss of the RC signal immediately removes the ENAB signal thereby dropping the system out of the "send data" mode.

Figure 12:
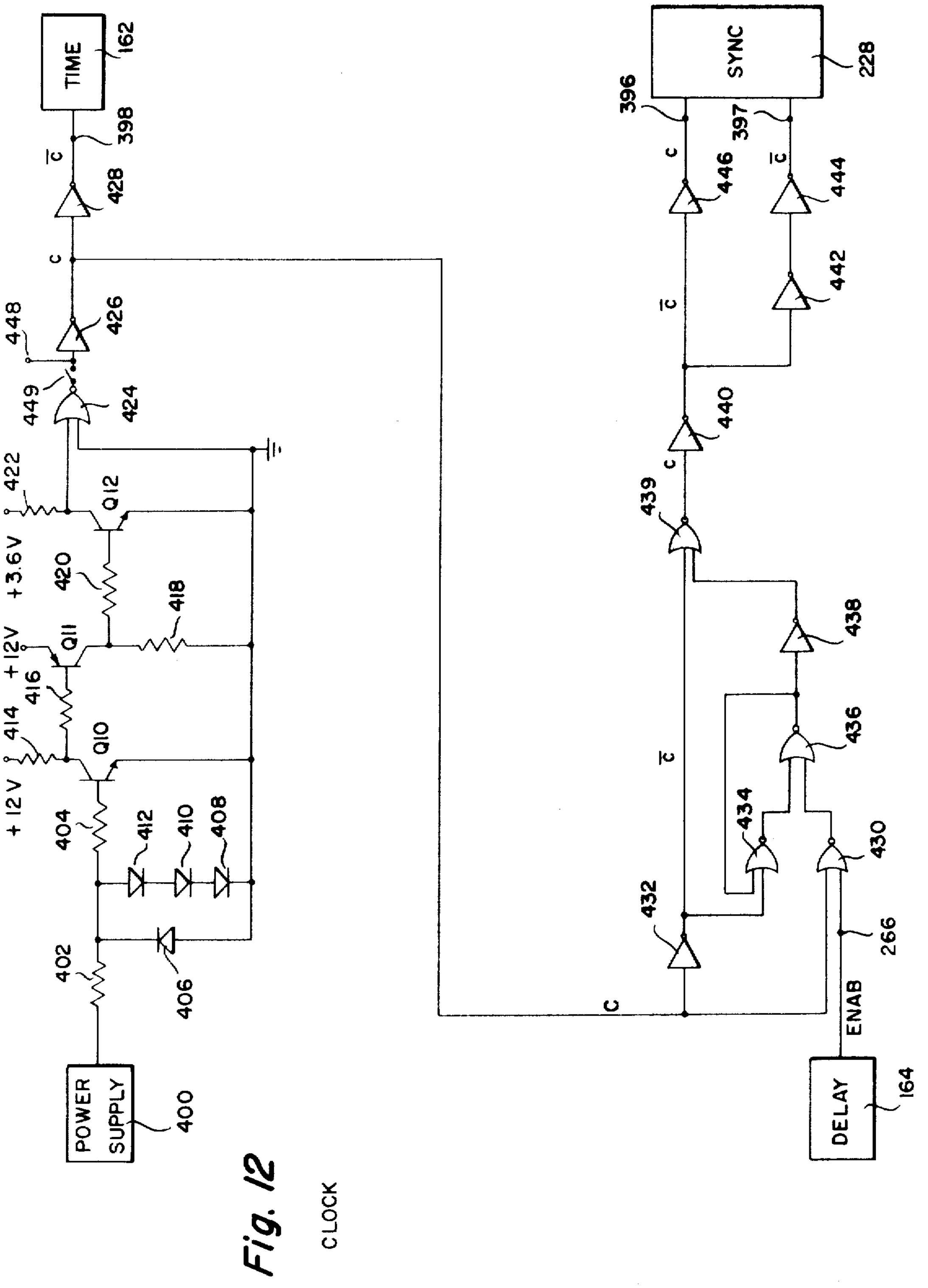
FIG. 12 is a schematic diagram of the clock circuit of FIG. 7.
Figure 14:
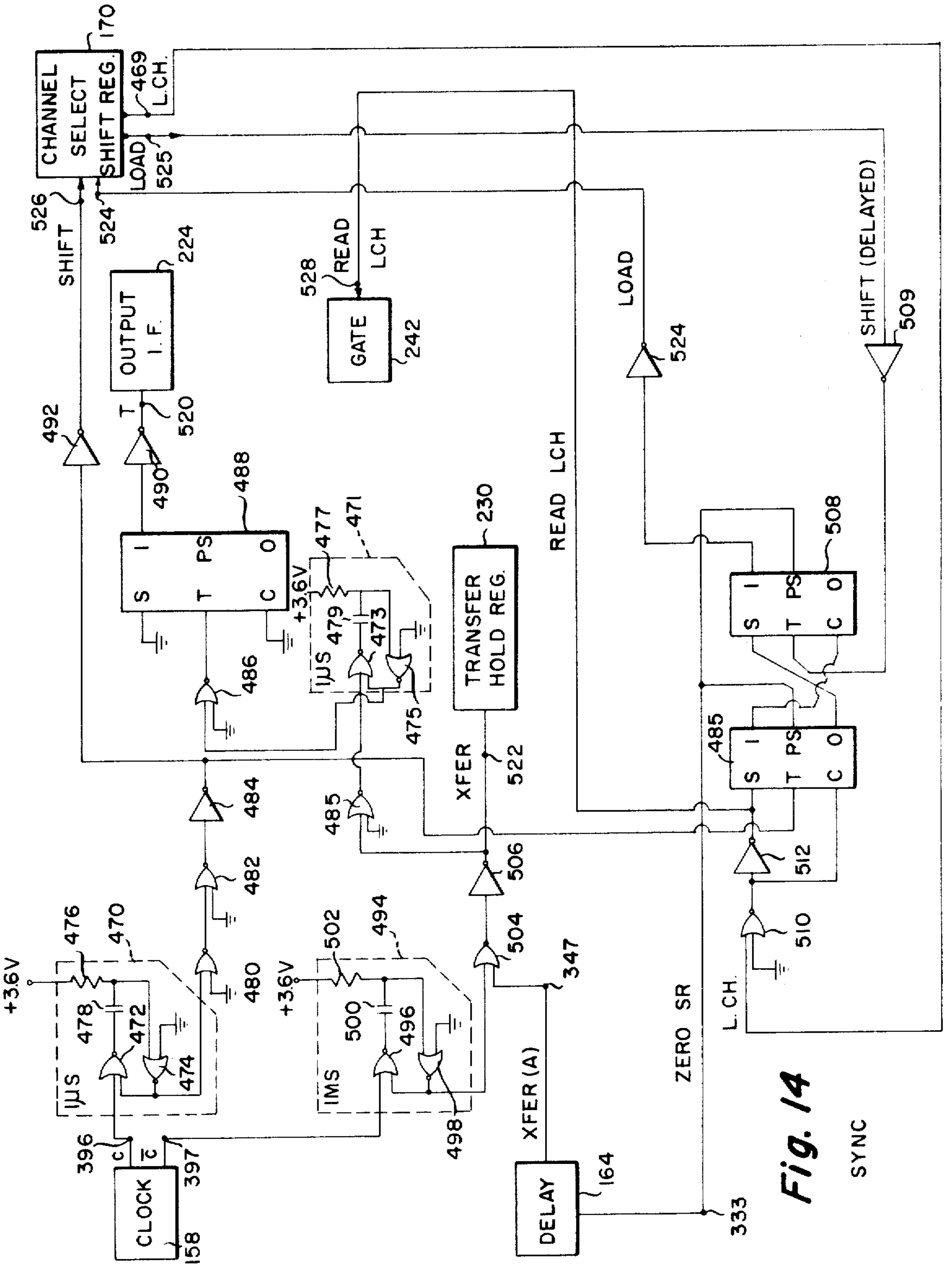
FIG. 14 is a schematic diagram of the sync circuit of FIG. 7.

As indicated in FIGS. 7 and 12, the clock 158 receives on terminal 266 the ENAB signal from the delay circuit 164 of FIG. 11 and provides the periodic C and $\overline{C}$ signals respectively to terminals 396 and 397 of the sync circuit 228 of FIG. 14 and the $\overline{C}$ signal to the terminal 398 of the time accumulator 162 in the data accumulator bank 150.

Referring now to the schematic drawing of FIG. 12, the clock 158 receives an input signal from the AC power supply 400 of the conventional data terminal unit 30. This power supply 400 input signal may be taken, for example, from one winding of a 12 volt power supply transformer (not shown). The periodic signal from the power supply 400 is connected to the base electrode of a grounded emitter NPN-transistor Q10 through resistor 402 and 404. The resistor 402 and 404 junction is isolated from ground by a diode 406 and the series connected diodes 408, 410 and 412. These diodes 406 and 408–412, respectively, perform the functions of half-wave rectification and clipping. The succeeding amplification stages are designed to saturate rapidly and to clip the waveform of the input signals so that the rise time of the output signal of the last amplification stage is sufficiently short to be compatible with the micrologic circuitry to which it is applied.

The collector electrode of transistor Q10 is biased from a positive 12 volt source through a resistor 414. The collector electrode of the transistor Q10 is also connected through a resistor 416 to the base electrode of a PNP-transistor Q11. The emitter electrode of the transistor Q11 is connected to a 12 volt source of positive potential and the collector electrode thereof is grounded through a biasing resistor 418.

The collector electrode of the transistor Q11 is also connected through a resistor 420 to the base electrode of a grounded emitter NPN-transistor Q12. The collector electrode of the transistor Q12 is biased from a positive 3.6 volt source through a resistor 422 and is connected through a grounded input NOR gate and inverters 426 and 428 to the time accumulator 162.

In operation, the application of the positive half cycle of the output signal taken from the power supply 400 to the base electrode of the transistor Q10 drives it into saturation essentially grounding the collector electrode and thus removing the positive potential from the base electrode of the transistor Q11.

The application of the negative going potential to the base electrode of the transistor Q11 drives it into saturation producing a positive going pulse at the collector electrode thereof. This positive pulse is applied through the resistor 420 to the base electrode of the transistor Q12 driving it into saturation, thus removing the 3.6 volt binary ONE signal at the collector electrode.

The removal of the potential of the positive half cycle of the signal applied to the base electrode of the transistor Q10 similarly results in the production of a 3.6 volt binary ONE at the collector electrode of the transistor Q12.

This periodic signal is twice inverted in the grounded input NOR-gate 424 and the inverter 426 to produce the periodic clocking signal C. The periodic C signal is again inverted in an inverter 428 to produce the mirror image or inverted clocking signal $\overline{C}$ which is applied to terminal 398 of the time accumulator 162 to provide an indication of the elapsed time since the adjacently antecedent reading of the accumulator bank 150 by the computer 10.

The C signal thus produced at the output terminal of the inverter 426 is applied to one input terminal of a NOR-gate 430. The ENAB signal from the delay circuit 164 of FIG. 11 is applied to the other input terminal of the NOR-gate 430. The output terminal of the NOR-gate 430 is connected to one input terminal of a NOR-gate 436.

The C signal from the NOR-gate 426 is also connected through an inverter 432 to one input terminal of a NOR-gate 434. The output terminal of the NOR-gate 434 is connected to the other input terminal of the NOR-gate 436 whose output terminal is connected back to the other input terminal of the NOR-gate 434. The output of the NOR-gate 436 is also connected through an inverter 438 to one input terminal of a NOR-gate 439. The $\overline{C}$ signal output of the inverter 432 is applied to the other input terminal of the NOR-gate 439.

The output of the NOR-gate 439 is connected through inverters 440 and 446 and through inverters 440, 442 and 444, respectively, to terminals 396 and 397 of the sync circuit 228 of FIG. 14.

In operation, the application of the periodic C signal from the NOR-gate 426 will produce the C and $\overline{C}$ periodic input signals to the sync circuit 228 for the duration of the ENAB signal from the delay circuit 164 since the ENAB signal inhibits the NOR-gate 430 thereby enabling the NOR-gate 436 and 439.

In the absence of the ENAB signal, the NOR-gate 430 is enabled and the high voltage level of the periodic clock signal C will inhibit the NOR-gates 436 and 439. During the high-voltage level of the periodic clock signal C, the NOR-gate 436 would be inhibited and the inverted clock signal $\overline{C}$ applied through the NOR-gate 434 to the NOR-gate 436.

The periodic C and $\overline{C}$ signals are thus generated only during the period in which the ENAB signal is present from the delay circuit 164. Due to the periodic nature of these C and $\overline{C}$ signals, i.e., oscillating between a binary ONE, and a binary ZERO, the first positive pulse which commences after the generation of the ENAB signal is the first pulse passed to the sync circuit 228. The ENAB signal may thus precede the first pulse of the C and $\overline{C}$ signals applied to the sync circuit by almost one full cycle.

With continued reference to the circuit of FIG. 12, a terminal 448 and a switch 449 may be provided between the NOR-gate 424 and the inverter 426. Inasmuch as the capacity of the present system is approximately 75 data operations per second (approximately 37 timing transitions) and since the frequency of the power supply 400 is expected to be approximately 60 Hz. (approximately 30 timing transitions), the substitution of an oscillator (not shown) having an output signal at a frequency not greater than 75 Hz. may be substituted for the illustrated power supply to obtain a material increase in the speed of data transmission.

Exemplary values of the various electrical components of the circuit of FIG. 12 are as follows:

| | |
|---|---|
| Transistor Q10 | 2N 497 |
| Transistor Q11 | 2N 3638 |
| Transistor Q12 | 2N 697 |
| Resistor **402** | 1 kΩ |
| Resistor **404** | 1 K ohms |
| Diode **406** | IN 3254 |
| Diode **408** | IN 3254 |
| Diode **410** | IN 3254 |
| Diode **412** | IN 3254 |
| Resistor **414** | 10 kΩ |
| Resistor **416** | 10 kΩ |
| Resistor **418** | 2.2 kΩ |
| Resistor **420** | 10 kΩ |
| Resistor **422** | 47 ohms |

Figure 13:
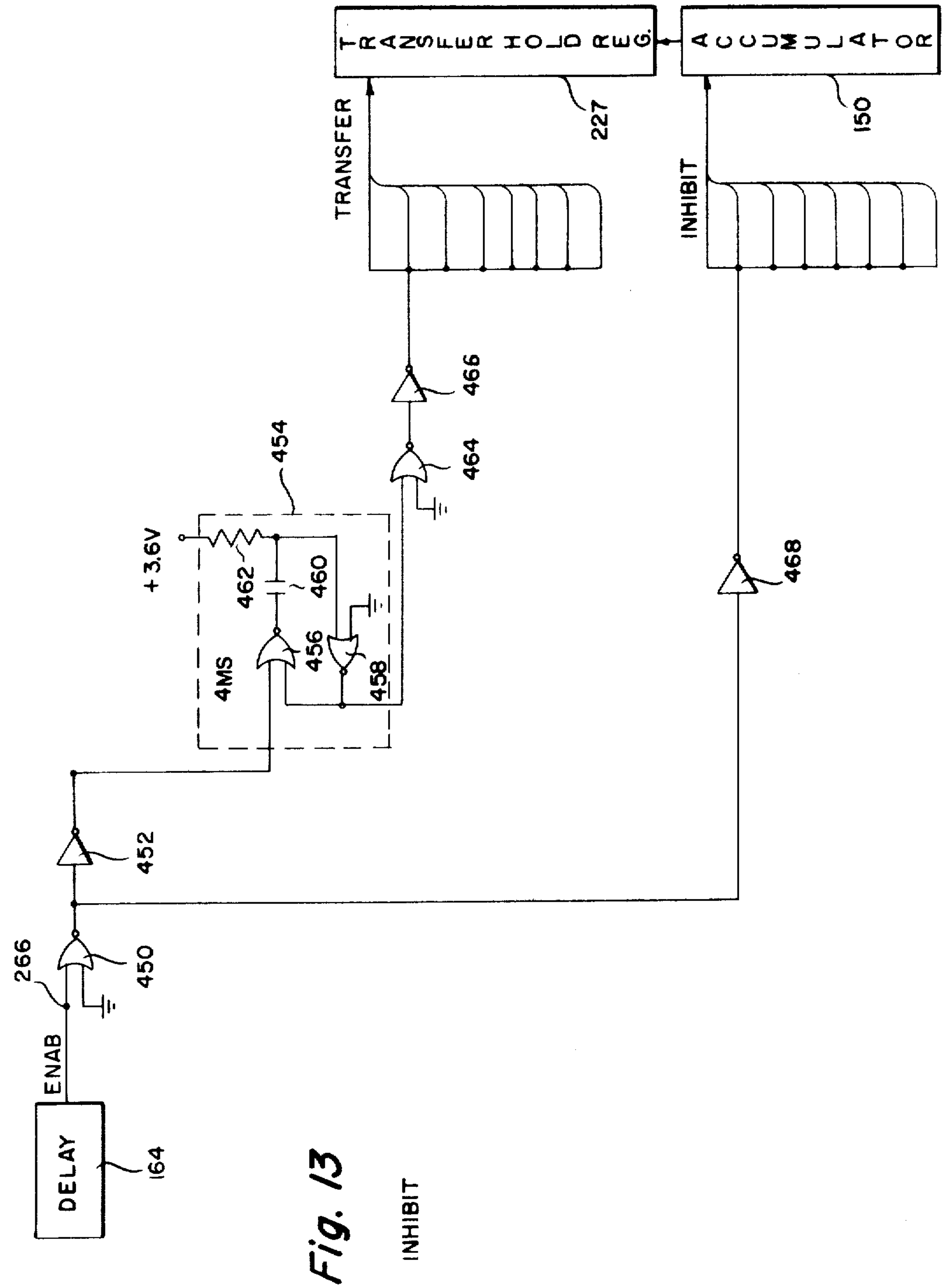
FIG. 13 is a schematic diagram of the inhibit circuit of FIG. 7.

As indicated in FIG. 7, the enabling signal ENAB from terminal 266 of the delay circuit 164 of FIG. 11 is also applied to an inhibit circuit 226. Referring now to FIG. 13 for the circuit diagram of the inhibit circuit 226. Referring now to FIG. 13 for the circuit diagram of the inhibit circuit 226, the ENAB signal is connected through a grounded input NOR-gate 450 and an inverter 452 to the input terminal of a 4 millisecond one-shot or monostable multivibrator 454. The multivibrator 454 comprises NOR-gate 456 and 458, a capacitor 460 and a resistor 462 connected in the manner of the multivibrators previously described to produce a positive signal of 4 milliseconds duration. The output terminal of the multivibrator 454 is connected through a grounded input NOR-gate 464 and an inverter 466 to a transfer hold register circuit 227 which may be between each of the counting type of accumulators in the data accumulator bank 150 and the gate circuits 232–242 of FIG. 7. The transfer hold register circuit 227 may be similar in all respects to the transfer hold register circuit 230 illustrated in FIGS. 7 and 18 and will not here be further discussed.

In operation, the ENAB signal from the delay circuit 164 is twice inverted in the NOR-gate 450 and the inverter 452 and used to trigger the 4 millisecond one-shot multivibrator 454. The output signal of the multivibrator 454 is twice inverted in the NOR-gate 464 and the inverter 466 to provide the transfer signal to the transfer hold register circuit 227.

The transfer circuit, as are the transfer hold register circuits 227 associated with the accumulators of the data accumulator bank 150, is required only when it is desirable to continue the accumulation of data in the accumulators 150 during the transmission of data. In such a situation, the count in the accumulator 150 is transferred by the Transfer signal to the output of the associated transfer hold register circuit 227 to be there transmitted at least twice while the accumulator continues to count. If the loss of the few data pulses is of negligible consequence to the total reading, the counting of the accumulator may be inhibited and the associated circuit 227 omitted. In certain operations such as those involving the monetary aspects of comingling oil leases, the loss of data pulses may not, as a matter of law, be disregarded.

The output terminal of the NOR-gate 450 may also be connected through an inverter 468 to each of the counting type of accumulators in the data accumulator bank 150.

In operation, the inverted ENAB signal taken from the output terminal of the NOR-gate 450 is further inverted in the inverter 468 to provide an INHIBIT signal to the accumulators of the data accumulator bank 150.

The purpose of the INHIBIT signal is, as earlier explained to prevent the continuing accumulation of data from disrupting the error checking process in which the computer 10 is programmed to compare two or more successive transmissions of the count contained in the accumulators 150.

Representative values of the various electrical components of the circuit of FIG. 13 are as follows:

| | |
|---|---|
| Resistor **462** | 3.3 K ohms |
| Capacitor **460** | 1.5 microfarads |

Figure 15:
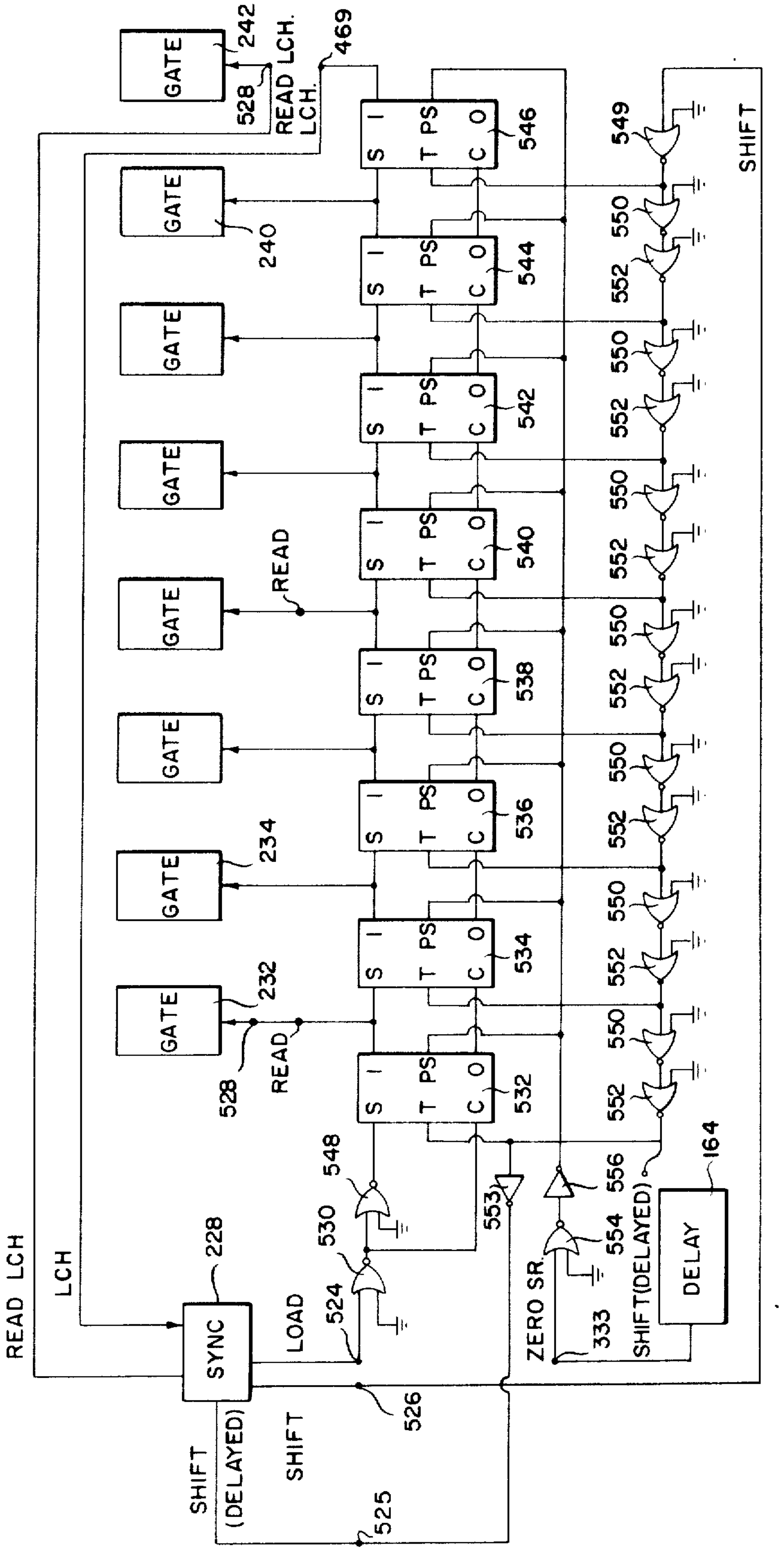
FIG. 15 is a schematic diagram of the channel select shift register of FIG. 7.

As indicated in FIG. 7, the sync circuit 228 receives the XFER (A) and ZERO SR signals from terminal 347 and 333, respectively, of the delay circuit 164 of FIG. 11, the LCH signal from terminal 469 of the channel select shift register 170 of FIG. 15, the periodic clocking signals C and $\overline{C}$ respectively from terminals 396 and 397 of the clock circuit 158 of FIG. 12 and the delayed shift signal SHIFT (DELAYED) from terminal 525 of the channel select shift register 170 of FIG. 15. From these inputs the sync circuit 228 provides the timing signal T to terminal 520 of the output interface circuit 224 of FIG. 19, the transfer signal to terminal 522 of the transfer hold register circuit 230 of FIG. 18, the LOAD and SHIFT signals respectfully to terminal 524 and 526 of the channel select shift register 170 of FIG. 15, and the READ L CH signal to terminal 528 of the last of the gate circuits 242.

Referring now to the sync circuit 228 of FIG. 14, the periodic C signal from the clock 158 is applied to a 1 microsecond one-shot or monostable multivibrator 470. Multivibrator 470 comprises NOR-gates 472 and 474, a resistor 476, and a capacitor 478 connected in the manner previously described to produce an output signal of one microsecond duration when triggered by a positive input signal.

The output terminal of the multivibrator 470 is connected through two grounded input NOR-gates 480 and 482, an inverter 484 to the toggle terminal of a JK-flip-flop 485 in the LOAD signal generating portion of the sync circuit 228 and through a inverter 492 to the terminal 526 of the channel select shift register 170.

As stated, the output terminal of the NOR-gate 484 is connected through an inverter 492 to the channel select shift register 170. The positive pulse of 1 microsecond duration which results from each application of a pulse in the periodic C signal to the multivibrator 470 is additionally inverted in the grounded input NOR-gates 480 and 482 and in the inverters 484 and 492 to provide the positive SHIFT signal input to terminal 526 of the channel select shift register 170 of FIG. 15. A positive SHIFT signal is thus produced for every pulse of the periodic C signal, and applied to terminal 520 of the output circuit 224 of FIG. 19.

With continued reference to FIG. 14, the periodic $\overline{C}$ signal output of the clock 158 is applied to 1 one millisecond one-shot or monostable multivibrator 494 comprising NOR-gates 496 and 498, a capacitor 500, and a resistor 502. These circuit elements are connected so as to provide positive output pulse of 1 millisecond duration each time the multivibrator 494 is triggered by a positive going pulse of the $\bar{C}$ signal.

The output terminal of the multivibrator 494 is connected to one input terminal of a NOR-gate 504. The XFER(A) signal from terminal 347 of the delay circuit 164 of FIG. 11 is applied to the other input terminal of the NOR-gate 504. The output terminal of the NOR-gate 504 is connected through an inverter 506 to terminal 522 of the transfer circuit 230 of FIG. 18.

In operation, a transfer signal input to the transfer circuit 230 will be produced upon the application of either a XFER(A) signal from the delay circuit 64 or the application of a pulse of the $\bar{C}$ signal responsive multivibrator 494 to the NOR-gate 504.

In addition, the output of the inverter 506 is connected to the input terminal of a grounded input NOR-gate 485 whose output terminal is connected to the input terminal of 1 microsecond one-shot or monostable multivibrator 471 comprising NOR-gates 473 and 475, a capacitor 479 and a resistor 477. These circuit elements are connected so as to provide a positive output pulse of 1 microsecond duration each time the multivibrator 471 is triggered by the positive going pulse resulting from the inversion in the grounded NOR-gate 485 of the negative trailing edge of the composite transfer signal. The production of the 1 microsecond pulses from multivibrator 471 thus coincide with the cessations of the transfer pulses.

The output signal from the multivibrator 471 is applied through the grounded input NOR-gate 486 to the toggle input terminal T of the flip-flop 488. Since toggling of the flip-flop 488 occurs with the negative transition of the signal applied to the toggle input terminal T, toggling will be substantially coincident with the leading edge of the 1 microsecond output pulse of the multivibrator 471 and with the trailing edges of the 1 millisecond output signal from the multivibrators 334 and 494 which produce the transfer signals. The flip-flop 488 changes state upon each application of a negative pulse to the toggle input terminal T thereof.

In operation, the application of a positive pulse from the inverted XFER signal triggers the multivibrator 471 to produce a positive pulse of 1 microsecond duration. This pulse, when inverted and applied to the toggle terminal of the flip-flop 488, causes the flip-flop to change its condition irrespective of its condition at the time the toggle pulse is applied. Successive positive pulses of the periodic inverted XFER signal thus switch the flip-flop 488 from its set to reset to set condition. Each time the flip-flop 488 is set, a low output voltage state (binary ZERO) with a positive logic system is produced at the "1" output terminal. This signal is inverted in the inverter 490 to provide the T signal input to terminal 520 of the output interface circuit 224. The flip-flop 488 thus effectively reduces the number of TRANSFER signal pulses by a factor of two. In this manner, a timing transition T is produced after the cessation of every 1 millisecond transfer pulse.

As indicated in FIGS. 7 and 14, the ZERO SR signal from terminal 333 of the delay circuit 164 of FIG. 11 is applied to the preset terminals PS of a pair of JK-fkip-flops 485 and 508. The toggle terminal of the JK-flip-flop 485 is connected to the output terminal of the inverter 484 to receive the C signal responsive inverted SHIFT signal also applied to the terminal 526 of the channel select shift register 170. The toggle terminal of the flip-flop 508 receives its input signal, the SHIFT (DELAYED) signal, from the terminal 525 of the channel select shift register 170 by way of the inverter 509, in a manner to be hereinafter described.

As indicated in FIG. 7, the L. CH. signal from terminal 469 of the channel select shift register 170 is also applied to the sync circuit 228. As shown in FIG. 14, this L. CH. signal is inverted in a grounded input NOR-gate 510 and is applied to the clear input terminal of the flip-flop 485. The output terminal of the NOR-gate 510 is also connected through an inverter 512 to the set terminal of the flip-flop 508 and also to the last of the gate circuits 242 as a READ L. CH. signal. The binary "1" output terminal of the flip-flop 485 is connected to the clear input terminal of the flip-flop 508. The binary "0" output terminal of the flip-flop 485 is connected to the set input terminal of the flip-flop 508.

Binary "1" output terminal of the flip-flop 508 is connected through an inverter 524 to the channel select shift register 170.

When described under the rules of positive logic where the higher voltage is a binary ONE and the lower voltage is a binary ZERO, toggling of the flip-flops described in conjunction with this and other circuits herein is effected by a negative going signal on the toggle input terminal T. The application of a binary ONE to the preset input terminal PS causes the voltage at the "1" output terminal to assume the binary ZERO state and the "0" output terminal the binary ONE state. The flip-flop will be held in this "set" condition for the duration of the high voltage signal on the PS terminal and will remain "-set" until the application of a further signal to one of the input terminals.

With a signal applied to the PC input terminal, toggling the flip-flop by a binary ZERO will produce output signals dependent upon the condition of the set S and clear C terminals. No action will occur on the positive going transitions of the signals applied to the toggle terminal T.

If both the set S and clear C input terminal signal levels are high or binary ONE's, the signal levels on the "1" terminals and "0" output terminals will remain unchanged. Toggling of the flip-flops may thus be inhibited.

If both the set S and the clear C input terminal signal levels are low or binary ZERO's, the signals on the "1" output terminals will reverse. Two positive transitions on which no change occurs and two negative transitions at the toggle input terminal T are thus required to produce one positive and one negative transition at the output terminals "1" and "0." Thus, the flip-flop effectively divides the number of input pulses applied to the toggle terminal T by two.

If the set input terminal S signal is a binary ONE and the clear input terminal signal C is a binary ZERO at the time the flip-flop is toggled, the "1" output terminal will assume the binary ONE state regardless of the previous condition. Subsequent toggling with the set S and clear C input terminals will produce no change. The flip-flop may be said to have been steered to the reset condition.

If the set input terminal S signal is a binary ZERO and the clear terminal C signal is a binary ONE when the flip-flop is toggled, the "1" output terminal signal will be a binary ZERO and the "0" output terminal signal will be a binary ONE regardless of their previous condition. The flip-flop may be said to have been steered to the "set" condition.

Figure 22:
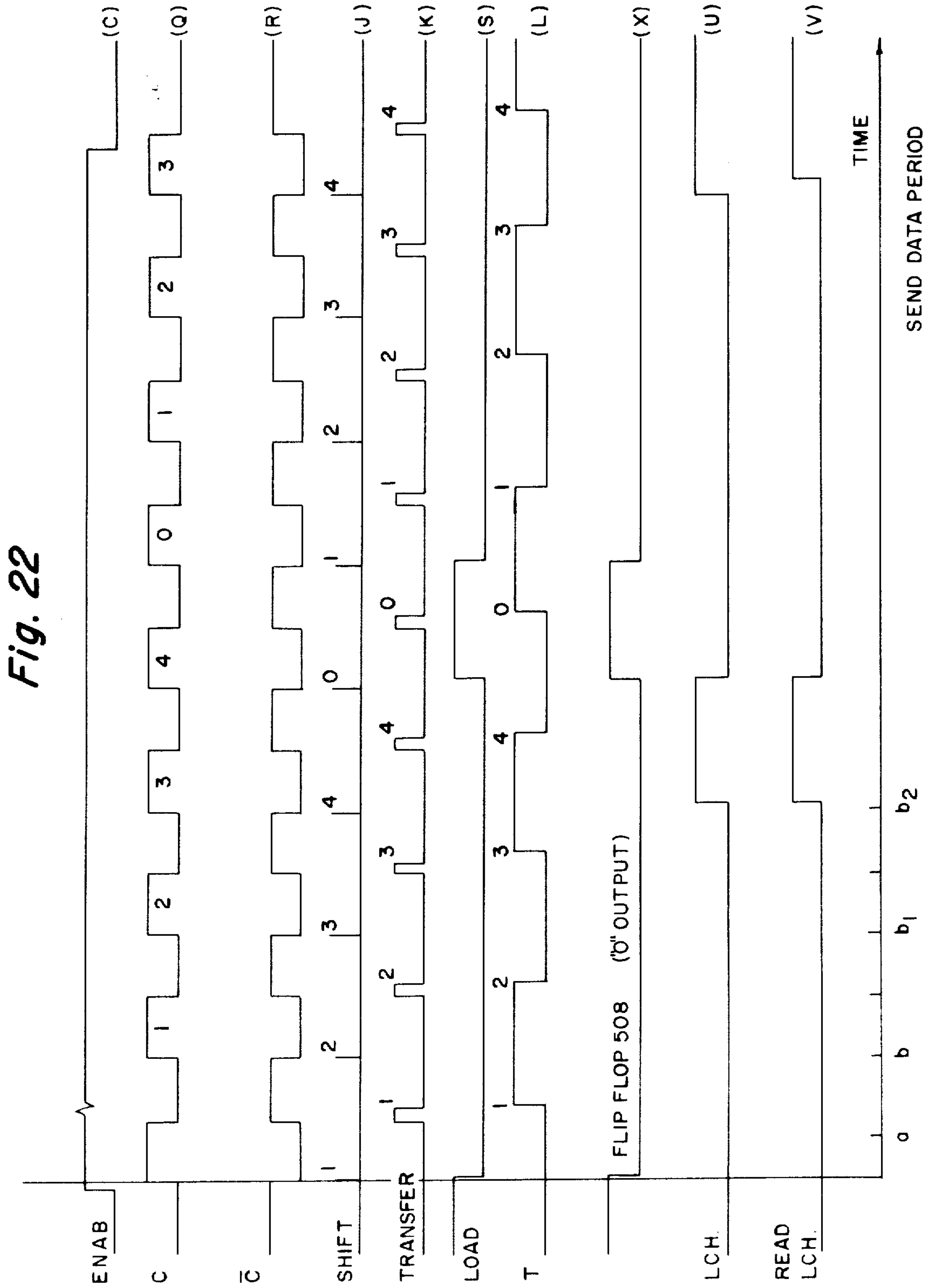
FIG. 22 is an expanded timing diagram of the send data period of the timing diagram of FIG. 20.

In operation, the ZERO SR signal from the delay circuit 164 of FIG. 22 is utilized to insure that the flip-flops 485 and 508 are in their "set" condition at the commencement of data transmission operation. This ZERO SR signal is also applied to each of the PS terminals of each of the flip-flops 532–546 comprising the channel select shift register 170 of FIG. 15 to inhibit all of the channel output signals, including the last channel signal L. CH.

The L. CH. signal is taken from the "1" output terminal of the last flip-flop 546 in a circular chain of flip-flops comprising flip-flop 508 of the sync circuit 228 of FIG. 14 and the flip-flops of the channel select shift register 170 of FIG. 15. The flip-flop 485 of the sync circuit 228 of FIG. 14 acts as a slave of the last flip-flop 546 in the chain the connects the chain together.

With continued reference to FIG. 14, the last channel signal L. CH. is applied through the grounded input NOR-gate 510 to the clear input terminal C of the flip-flop 485, and additionally through the inverter 512 to the set input terminal S of the flip-flop 485. In addition, the inverted L. CH. signal is also used to enable the last gate circuit 242 as the READ L. CH. signal.

The L. CH. signal, as inverted and applied to the clear input terminal C of the flip-flop 485 and the inverted L. CH. or READ L. CH. signals, provides the steering of the flip-flop 485.

The flip-flop 485 is thus always being steered so that, when toggled, the signal on the "1"

After the occurrence of the terminal thereof will correspond to presence or absence of the L. CH. signal from the channel select shift register 170. The flip-flop 508 is similarly steered by the flip-flop 485 to assume the binary state opposite to that of of the flip-flop 485.

After the occurrence of the ZERO SR signal, the low-level signal on the "1" output terminal of the flip-flop 508 is inverted and applied to the input terminal 524 of the channel select shift register 170 of FIG. 15 as the LOAD signal. The LOAD signal is thus provided whenever the flip-flop 508 in its "set " condition. With continued reference to FIG. 14, toggling of the flip-flop 485 results from the clock signal C responsive triggering of the multivibrator 470 which causes the generation of the SHIFT signal. The signal on the toggle input terminal T of the flip-flop 485 is a binary ONE in the absence of an output signal from the multivibrator 470 due to the inverter 484.

A signal is delayed a finite amount of time by passage through a circuit such as an inverter or a NOR gate. Thus, a change in the binary state of the signal on the input terminal of the inverter or NOR gate always precedes the change in state of the signal on the output terminal thereof. The 1 microsecond positive going output signal from the mulitvibrator 470 will, therefore, occur prior to the generation of the SHIFT signal by the inverter 492 due to the inherent delays of the grounded input NOR-gates 480 and 482. The use of an even number of inverters results, of course, in a pulse of the same polarity and essentially the same width, but delayed in time.

The clock signal C responsive 1 microsecond SHIFT signal applied to the channel select shift register 170 of FIG. 15 through the terminal 526 is, as will be explained, delayed and returned to the sync circuit 228 of FIG. 14 through the terminal 525 and the inverter 509 to the toggle input terminal T of the flip-flop 508. The inverter 509 will hold the signal on the toggle input terminal T of the flip-flop 508 in the binary ONE condition in the absence of the 1 microsecond SHIFT (DELAYED) signal from the channel select shift register 170.

The flip-flop 508 may also be toggled by the toggling of the multivibrator 485 by the output signal from the multivibrator 470. Thus, the flip-flop 485 will always toggle before the flip-flop 508 in response to the same pulse in the clock signal C.

The application of the first clock circuit 158 dependent shift signal will cause the signal on the "1" output terminal of the flip-flop 485 to assume the same state as that of the "1" output terminal of the last flip-flop 546 in the channel select shift register 170, in this case, a binary ZERO. Since the flip-flop 485 was preset to a binary ZERO, no change of state occurs.

The SHIFT (DELAYED) signal will thereafter toggle the flip-flop 508 which has been steered to produce a binary ONE at the "1" output terminal. The "1" output terminal of the flip-flop 508, preset to a binary ZERO state by the ZERO SR pulse, will be toggled to the reset condition to provide a binary ONE signal. This, in turn, inhibits, by means of the inverter 524, the generation of the LOAD signal.

The first flip-flop 532 in the channel select shift register 170 of FIG. 15 is reset to provide a binary ONE at the "1" output terminal while all of the other flip-flops 534–546 in the channel select shift register 170 maintain a binary ZERO at their "1" output terminals. The second SHIFT signal causes this binary ONE signal to move to the second flip-flop th in the channel select shift register 170 and the first flip-flop to assume the set condition. Thus, the N$^{th}$ SHIFT signal effects resetting of only the N$^{th}$ flip-flop in the chain. This procedure will be continued until the last flip-flop 546 in the channel select shift register 170 is the sole flip-flop in the reset condition, thereby providing the L. CH. signal.

The second and subsequent SHIFT signals do not thereafter affect the condition of the flip-flops 485 and 508 in the sync circuit of FIG. 14 due to the steering thereof by the L.CH. signal from the channel select shift register 170. After the occurrence of the SHIFT signal which resets the last flip-flop 546 in the channel select shift register 170 to generate the L. CH. signal, the grounded input NOR-gate 510 and the inverter 512 in the sync circuit 228 doubly invert the L. CH. signal to provide the enabling READ L. CH. signal at the input terminal 528 of the last gate circuit 242.

The L. CH. signal is, as has been stated, applied through the inverter 512 and the grounded input NOR-gate 510 to steer the flip-flop 485 for toggling to the reset condition upon the application of the next SHIFT signal. The next SHIFT signal resets the flip-flop 485 and steers the flip-flop 508 for resetting upon the application of a pulse to its toggle input terminal T.

This next SHIFT signal causes the last flip-flop 546 in the channel select shift register 170 to assume its set condition and terminates the L. CH. signal. The binary ONE signal has been "walked out" of the end of the channel select shift register 170 and every flip-flop in the chain is in the set condition as they were immediately after the application of the ZERO SR signal from the delay circuit 164 of FIG. 11.

The SHIFT (DELAYED) signal, which immediately follows, resets the flip-flop 508 to generate a LOAD signal which steers the first flip-flop 532 in the channel select shift register 170 for toggling to its reset condition upon the application of the next SHIFT signal.

Prior to the occurrence of the next SHIFT signal, all of the circuitry is in exactly the same condition as it was immediately prior to the occurrence of the first SHIFT signal following the ZERO SR signal. As will be later explained, this procedure has caused the sequential reading of the data stored in the accumulators associated with the gate circuits 232–242 of FIGS. 7 and 16 and the transmission of the timing signal T to the output interface circuit 224. The circuitry is now ready to retransmit or reread each of these accumulators upon the application of subsequent SHIFT signals. The various channels will again be read in sequence and the circuitry returned to its original condition after reading the last channel. This procedure will continue until the RC signal is lost at the input interface circuit 220 of FIG. 8 and at the terminal 264 of the delay circuit 164 of FIG. 11. The ENAB signal at terminal 266 of the delay circuit 164 will immediately be terminated, terminating the generation of the periodic clock signals C upon the completion of the next full clock signal by the clock circuit 158 of FIG. 12, as has been explained. Termination of the periodic clock signal C applied to terminal 396 of the sync circuit 228 of FIG. 14 terminates the SHIFT signal and interrupts the reading of the accumulators.

Reapplication of the RC signal, after an appropriate delay, and after reinitiation by the ZERO SR signal, et cetera, as described, from the data set to the input interface circuit 220, will begin the process anew.

Exemplary values of the various electrical components of the circuit of FIG. 14 are as follows:

| | |
|---|---|
| Resistor 476 | 3.3 kΩ |
| Resistor 502 | 3.9 kΩ |
| Capacitor 478 | 400 picrofarads |
| Capacitor 500 | 0.33 microfarads |

As indicated in FIGS. 7 and 14, the channel select shift register 170 receives the LOAD and SHIFT signals, respectively, from the sync circuit 228 on terminals 524 and 526, and the ZERO SR signal from the terminal 333 of the delay circuit 164 of FIG. 11. The gate circuits 232–240 enabling READ signals are produced as a result of these signals, as will be explained.

As shown in FIG. 7, the last gate circuit 242 is not directly enabled by a READ signal from the channel select shift register 170, but by means of a READ L. CH. signal from the sync circuit 228. As we have seen, the READ L. CH. signal applied to the gate circuit 242 is generated in response to a L. CH. signal from the channel select shift register 170.

Referring now to the channel select shift register of FIG. 15, the LOAD signal from terminal 524 of the sync circuit 228 of FIG. 14 is applied to a grounded input NOR-gate 530. The output of the NOR-gate 530 is applied to the clear input terminal C of the first of a group of serially connected JK-flip-flops 532–546. The number of flip-flops in the register may be, of course, made to vary as the number of 8 bit data accumulators desired to be included in the system.

The output terminal of the NOR-gate 530 is also connected through a grounded input NOR-gate 548 to the set terminal of the first flip-flop 532 in the group of serially connected flip-flops 532–546. The "1" output terminal of each of the flip-flops 532–544 is connected to the set terminal of the immediately adjacent one of the flip-flops 534–544 and also to a terminal 528 of the gate circuit associated with one of the accumulators of the data accumulator bank 150. The "1" output terminal of the last flip-flop 546 is connected to the sync circuit 228 as shown in FIG. 7. The sync circuit 228 in turn provides a READ L. CH. signal to the gate circuit 242 associated with the last to be read accumulator in the data accumulator bank 150. The "0" output terminal of each of the flip-flops 532–544 is directly connected to the clear input terminal C of the adjacent flip-flop in the group of flip-flops 532–546.

The SHIFT signal from the sync circuit 228 of FIG. 14 is applied through a grounded input NOR-gate 549 to the toggle terminals T of each of the serially connected flip-flops 532–546. A pair of grounded input NOR-gates 550 and 552 is connected between the toggle terminals of adjacent ones of the flip-flops 532–546 for delay purposes.

The ZERO SR signal from the delay circuit 164 of FIG. 11 is, as we have seen, also applied to the channel select shift register 170. This ZERO SR signal is applied through a grounded input NOR-gate 554 and an inverter 556 simultaneously to the preset terminals of each of the serially connected flip-flops 532–546.

In operation, the application of the ZERO SR signal from the delay circuit 164 to the preset terminals of each of the flip-flops 532–546 results in placing them in their set condition irrespective of their condition at the time the ZERO SR signal is applied. This simultaneously disables each of the gate circuits 232–242 by insuring that a binary ONE output, a READ signal, does not appear at the "1" output terminal 528 of any of the flip-flops 532–546.

With reference to FIG. 15, the generation of the LOAD signal by the sync circuit 228 upon the application of a SHIFT signal causes a binary ONE to be loaded into the first flip-flop 532, thereby generating a READ signal which enables the gate circuit 232.

Due to the inverting action of the grounded input NOR-gate 549, the toggle input terminal T of the last flip-flop 546 wild be held in the binary ONE state in the absence of a SHIFT signal. Thus, upon the application of the first positive going 1 microsecond SHIFT signal from the sync circuit 228 of FIG. 14, the flip-flop 546 assumes the state to which it is being steered by the signals present on its set S and clear C input terminals.

The ZERO SR signal having set the "1" output terminal of each of the flip-flops in the channel select shift register 170 to the binary ZERO condition and the "0" output terminals to the binary ONE condition, each of the flip-flops 532–546 is steered to its set condition and the first flip-flop 532 is steered to its reset condition by the LOAD signals acting through the grounded input NOR-gates 530 and 548. The first SHIFT signal thus effects no change in the output signals of the flip-flop 546.

The double inversion of the signal at the toggle input terminal of the flip-flop 546 by the two grounded input NOR-gates 550 and 552 delays the signal at the toggle input terminal of the flip-flop 544. Thus, the toggling of the flip-flops 532–546 occurs in reverse order with the flip-flop 532 being the first flip-flop in the chain.

The SHIFT signal which toggles the flip-flop 532 is inverted and applied to the terminal 525 of the sync circuit 228 of FIG. 14 as the SHIFT (DELAYED) signal.

Thus, each flip-flop 534–546 in the chain is steered to assume the state of the immediately adjacent flip-flop upon the application of a SHIFT signal. The first flip-flop 532 is steered to generate a READ signal at its "1" output terminal.

The first SHIFT signal then resets only the flip-flop 532 due to the LOAD signal to produce the READ signal at the input terminal 528 of the gate circuit 232. The flip-flop 532 now steers the flip-flop 534 to be reset and to produce the second channel READ signal to the gate circuit 234 upon the occurrence of the second SHIFT signal.

As explained, the first SHIFT (DELAYED) signal causes the sync circuit 228 to inhibit the LOAD signal and thus steer the first flip-flop 532 to its set condition. The sync circuit 228 will continue to inhibit the LOAD signal until after the last channel has been read and to provide the L. CH. signal to the sync circuit 228 and to enable the gate circuit 242 of FIG. 7.

Another SHIFT signal will cause the flip-flop 546 to be set and the generation of the SHIFT (DELAYED) signal will cause the generation of the LOAD signal. All of the flip-flops 532–546 in the channel select shift register 170 will then be set and all of the gate circuits 232–242 of FIG. 7 inhibited.

The sync circuit 228 thus precludes the setting of more than one flip-flop in the channel select shift register 170 at any one time. The next SHIFT signal will begin the cycle anew. In this manner, the data accumulator associated with each of the gate circuits 232–242 may be successively read by the stepping of the channel select shift register 170 in response to the SHIFT signal from the sync circuit 228.

As indicated in FIGS. 7 and 15, the binary ONE signals from the "1" output terminals of the flip-flops 532–546 of the channel select shift register 170 are used to generate the READ signals which selectively energize the gate circuits 232–242 to cause the transmission of the data contained in the associated accumulator of the data accumulator bank 150 to the input of the transfer hold register circuit 230. This data is transferred to the output of the transfer hold register circuit 230 and thus to the output interface circuit 224 upon the application of a XFER signal from the sync circuit 228, as will be explained infra.

The exception to the above procedure is the L. CH. signal taken from the "1" output terminal of the last flip-flop 546. As discussed in connection with FIG. 14, the L. CH. signal not only causes the generation of the gate circuit 242 enabling READ L. CH. signal, but also a LOAD signal, thus allowing the data to be read again.

Figure 16:
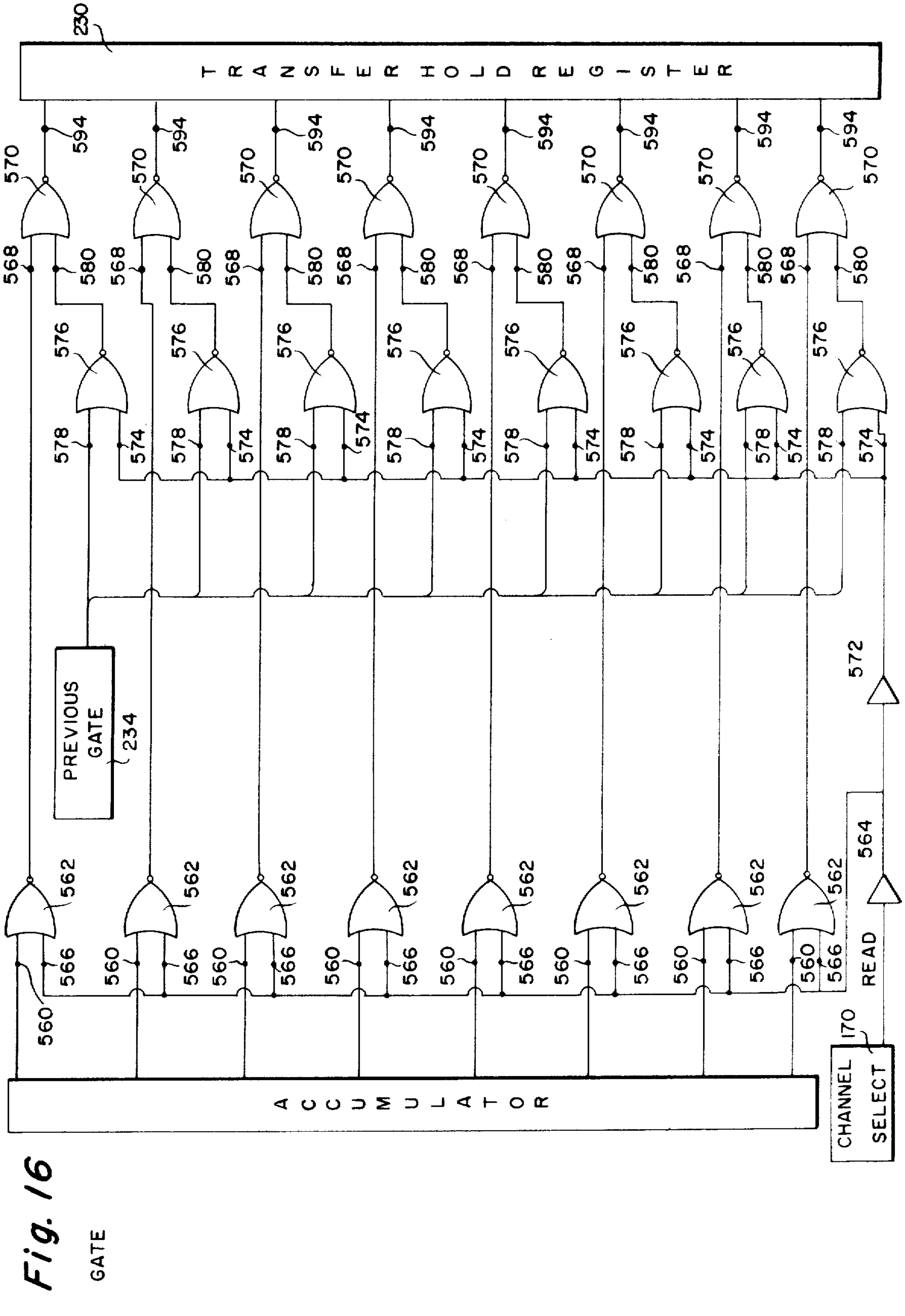
FIG. 16 is a schematic diagram of the gate circuit of FIG. 7.

Referring now to FIG. 16 for the circuitry of the gate circuit 232, the 8 bits of the D signal from one of the accumulators in the data accumulator bank 150 are applied in parallel to an input terminal 560 of the eight data channel input NOR-gates 562.

The READ signal from terminal 528 of the channel select shift register 170 of FIG. 15 is applied through an inverter 564 to the other input terminal 566 of each of the eight data channel input NOR-gates 562. The output terminal of each of the NOR-gates 562 is, in turn, connected to one input terminal 568 of an associated output NOR-gate 570. The output terminals 594 of each of the NOR-gates 570 are connected to the like numbered input terminals of the transfer hold register circuit 230 of FIGS. 7 and 18.

The output terminal of the inverter 564 is also connected through an inverter 572 to one input terminal 574 of a NOR-gate 576 associated with each of the eight data channels. The output terminals (not shown) from the eight data channels of the immediately antecedent one of the gate circuits 232–242 are connected to the other input terminal 578 of the appropriate one of the NOR-gates 576. The output terminal of each of the NOR-gates 576 is connected to the other input terminal 580 of the NOR-gates 570 at the input of the transfer hold register circuit 230.

In operation, the application of a binary ONE data input signal from one of the data channels to the terminal 560 of the associated NOR-gate 562 when the inhibiting binary ONE signal on the other input terminal 566 is removed by the READ signal from the channel select shift register 170 will produce a binary ZERO at the output terminal of the NOR-gate 562. This ZERO is applied to the input terminal 568 of the associated NOR-gate 570.

Irrespective of the output of the immediately antecedent one of the gate circuits 234–242, the additional inversion of the READ signal from the channel select shift register 170 in the inverter 572 will disable each of the NOR-gates 576 to provide a binary ZERO at the other input terminal 580 of each of the NOR-gates 570. The ZERO signal output from the NOR-gate 562 will thus appear as a binary ONE at the input to the transfer hold register circuit 230.

If, on the other hand, a binary ZERO is present in the data channel of the accumulator and therefore on the terminal 560 when the inhibiting binary ONE signal on the terminal 566 is removed by the READ signal, a binary ONE will appear on the output terminal of the NOR-gate 562 and will cause the associated NOR-gate 570 to present a binary ZERO to the input of the transfer hold register circuit 230. The data signal presented to one of the terminals 560 from the accumulator is thus reproduced at the appropriate input terminal of the transfer hold register circuit 230.

The gate circuit described in the foregoing has been the gate circuit 232 directly connected to the transfer hold register circuit 230. The D signals of each of the other gate circuits 234–242 as enabled must be passed through the intermediate gate circuits to reach the transfer hold register circuit 230.

With continued reference to FIG. 16, assume that the immediately antecedent gate circuit 234 has been enabled by a READ signal from the channel select shift register 170. The D signal output from the accumulator associated with the enabled gate circuit 234 will be applied from the output terminal of the NOR-gate 570 of that gate circuit 234, not to the transfer circuit 230 as shown in FIG. 16, but to the input terminals 578 of the NOR-gate 576.

Since the READ signal from the channel select shift register 170 which enables the previous gate circuit 234 is not applied to the gate circuit 232, the NOR-gates 562 of the gate circuit 232 are inhibited, thus enabling the NOR-gates 570. Since the absence of the READ signal also enables each of the NOR-gates 576 of the gate circuit 232, the D signals applied to the terminal 578 of the NOR-gates 576 from the gate circuit 234 will thus appear, inverted, on the output terminals of the associated NOR-gates 570. Inasmuch as the NOR-gates 570 are enabled, the signals will be again inverted and applied to the transfer hold register circuit 230.

In this manner, the 8 bits of parallel data from the READ signal enabled gate circuit 234–242 will be passed without change successively through each of the intermediate but disabled gate circuits to the input terminals of the transfer hold register circuit 230.

In the absence of a gate enabling signal in the channel select shift register 170, none of the gates 232–244 of FIG. 7 will be enabled. The eight binary ZERO signals at the terminal 594 of the last gate circuit 242 are passed without change through each successive gate circuit and appear at the input of the transfer hold register 230. In this manner, an 8 bit all ZERO signal is transmitted at the end of each complete data cycle.

This all ZERO signal indicated to the computer that all of the "ZERO" transmitters in the data set 26 are functioning correctly and that such signals are being correctly received. An added measure of protection may be obtained by permanently insuring that the data input signals to one of the gate circuits, for example, the last, are all ONE's thereby testing the "ONE" transmitters and their reception and providing the worse case transition from all ONE's to all ZERO's.

The position in which these channels with known data are received may also give an indication that the Data Terminal Unit and Computer are properly synchronized, i.e., the channel is the particular channel thought to be.

Figure 17:
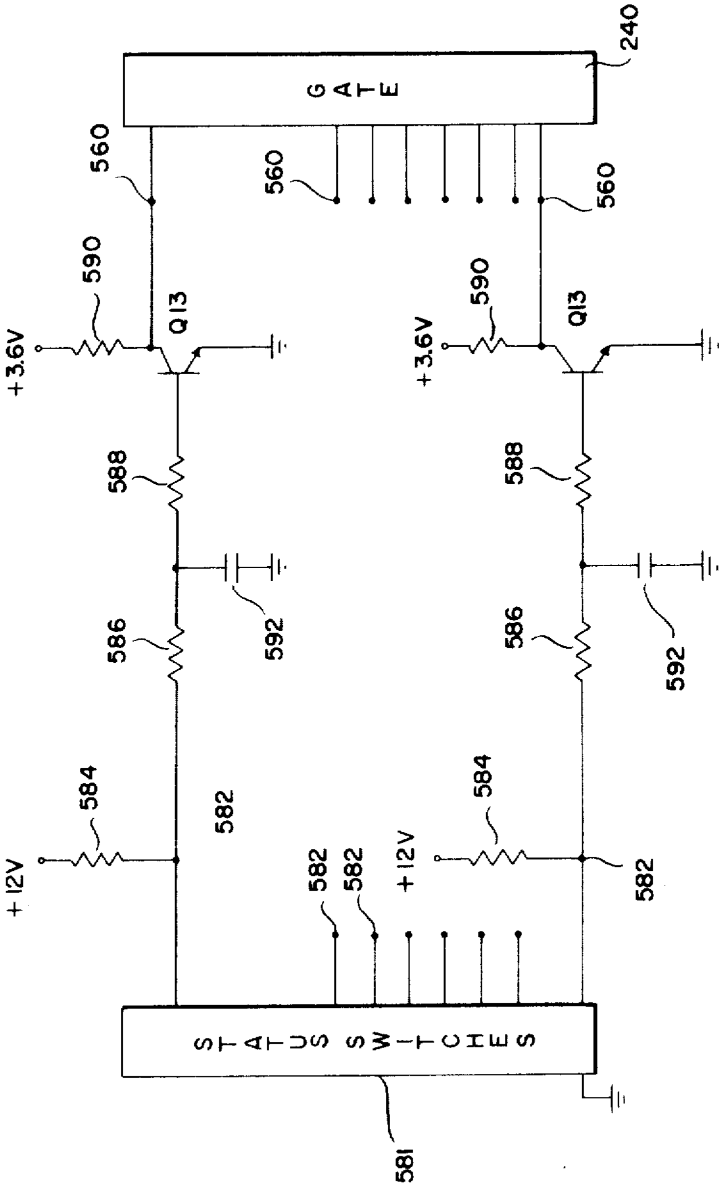
FIG. 17 is a schematic circuit diagram of the valve accumulator circuit of FIG. 7.

As an example of the type of information other than a simple digital count which may be contained in the accumulators of the data accumulator bank 150 of FIG. 6, consider the valve accumulator 184 of FIGS. 6 and 7 as illustrated in greater detail in FIG. 17.

Referring to FIG. 17, the switches 581 may be any suitable switches indicating the open or closed position of a particular valve at the manifold 34, or the presence or absence of particular fluid level, pressure or the like. As shown schematically in FIG. 17, each of the eight status switches of a particular data accumulator indicated generally at 581 completes an individual circuit from one of the eight terminals 582 to ground.

Each of the terminals 582 is connected through resistors 586 and 588 to the base electrode of a grounded emitter NPN-transistor Q13. Each of the terminals 582 is connected to a positive 12 volt DC source through resistors 584. The resistor 586 and 588 junction is isolated from ground by a capacitor 592. The collector electrode of each of the transistors Q13 is connected through a resistor 590 to a positive 3.6 volt DC source and to the appropriate one of the eight data channel input terminals 560 of the gate circuit 240 of FIG. 16.

If the particular status switch being monitored is closed, effectively grounding the terminal 582, the positive potential on the base electrode of the associated transistor Q13 is removed. This reduction in potential on the base electrode drives the NPN-transistor Q13 into cutoff, thereby raising the potential on the collector electrode to substantially that of the 3.6 volt source. This potential is applied as a binary ONE input signal to one of the eight data channels of the associated gate circuit 240 of FIG. 16.

If, on the other hand, a particular status switch 581 is open, the positive potential of the 12 volt source will be felt at the base electrode of the associated transistor Q13. The transistor Q13 will thus be driven into saturation, effectively grounding the collector electrode. The grounding of the collector electrode provides the zero voltage or ZERO binary input signal to the associated data channel of the gate circuit 240 of FIG. 16.

The relationship of the resistors 586 and 588 and the capacitor 592 serves to make the transistor Q13 less susceptible to changes in conduction induced by noise.

Exemplary values of the various electrical components of the circuit of FIG. 17 are as follows:

| | |
|---|---|
| Transistors Q13 | 2N697 |
| Resistors 584 | 1 kΩ |
| Resistors 586 | 1 kΩ |
| Resistors 588 | 1 kΩ |
| Resistors 590 | 47 ohms |
| Capacitors 592 | 100 microfarads |

As indicated in FIGS. 7 to 16, the transfer hold register circuit 230 receives the 8 binary bits which comprise the D signal from the gate circuit 232. Referring now to FIG. 18, the eight bits of the D signal are applied in parallel to the input terminals 594 of an associated NOR-gate 596.

Figure 18:
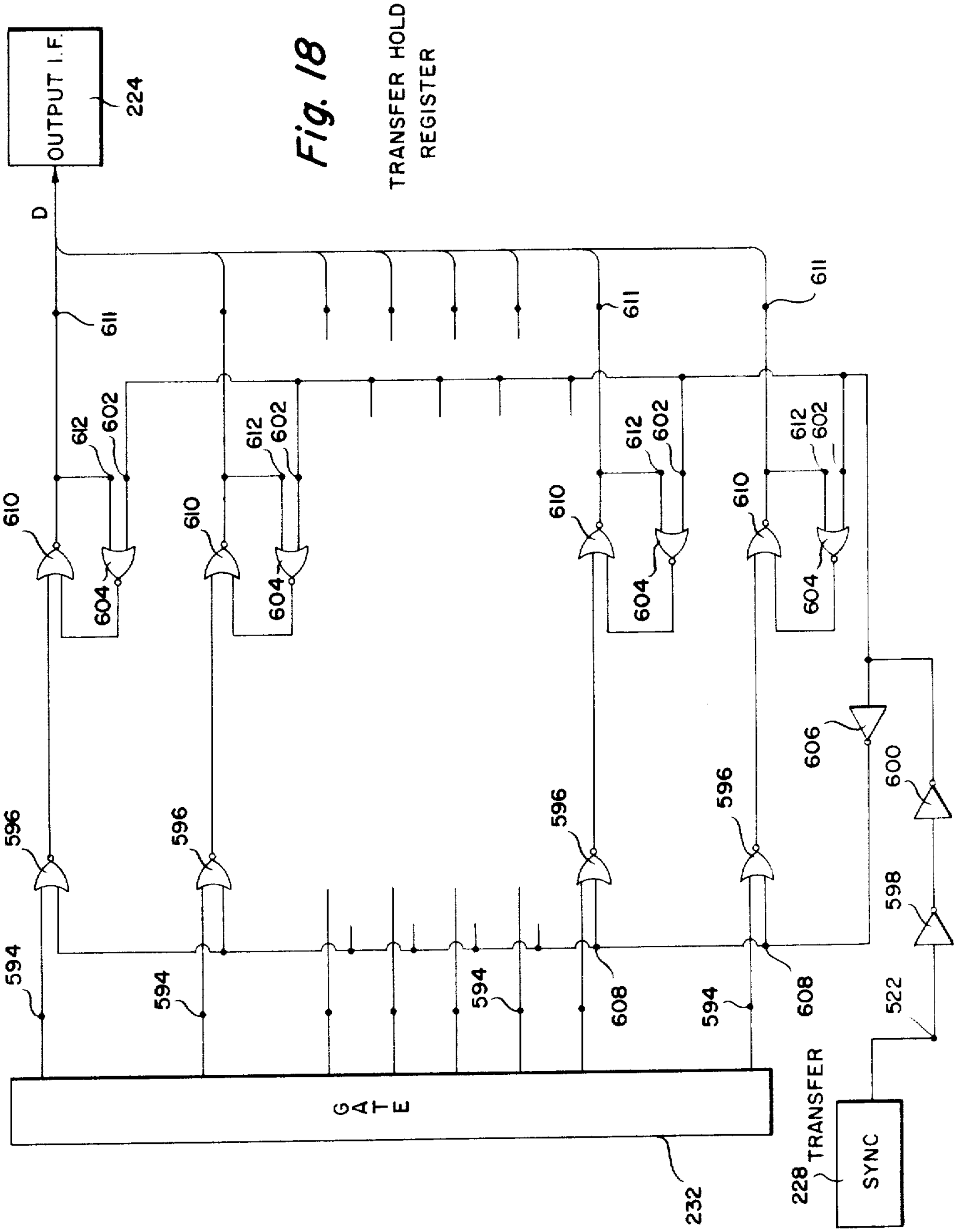
FIG. 18 is a schematic circuit diagram of the transfer hold register of FIG. 7.

With continued reference to FIG. 18, the TRANSFER signal from terminal 522 of the sync circuit 228 of FIG. 14 is applied through a pair of serially connected inverters 598 and 600 to an input terminal 602 of a NOR-gate 604 associated with each of the eight data channels. The output terminal of the NOR-gate 600 is also connected through an additional inverter 606 and applied to the other input terminal 608 of each of the eight data channel input NOR-gates 596.

The output terminal of each of the NOR-gates 596 is connected to one input terminal of an associated NOR-gate 610. The output terminal of each of the NOR-gates 610 is connected to a terminal 611 of the output interface circuit 224 of FIGS. 7 and 19, and also to the other input terminal 612 of the NOR-gate 604 associated with that data channel. The output terminal of each of the NOR-gates 604 is connected to the other input terminal of the associated NOR-gates 610.

In operation, the TRANSFER signal from the sync circuit 228 is three times inverted to remove the inhibiting binary ONE input signal from the terminal 608 of each of the NOR-gates 596. Each of the NOR-gates 596 thus functions as an inverter and will provide a binary ZERO at the output terminal thereof if a binary ONE is presented to the terminal 594 of the associated data channel from the gate circuit 232. Conversely, the binary ONE will be provided if a binary ZERO is presented to the terminal 594.

Since the TRAnsfer signal from the sync circuit 228 is also twice inverted and applied as an inhibiting signal to the terminal 602 of each of the NOR-gates 604, the output of each of the NOR-gates 604 will be a NOR-gate 610 enabling binary ZERO. The inhibiting signal thus being removed from the NOR-gates 610, each of the NOR-gates 610 will also function as a inverter to provide 1 bit of the D signal applied to the output interface circuit 224. The D signal thus presented to terminal 611 of the output interface circuit 224 is thus the same signal applied to the input terminal 594 from the gate circuit 232.

Upon removal of the TRANSFER signal, the output signal of the inverter 606 becomes a binary ONE disabling each of the NOR-gates 596. However, due to the delay introduced in the inverter 606, the NOR-gates 604 will be enabled and the output signal taken therefrom will be the opposite binary state of the signal applied to the input terminal 612 from the respective NOR-gate 610.

If the output signal from the NOR-gate 610 is a binary ZERO, the output signal from the NOR-gate 604 will be a binary ONE which holds the output signal from the NOR-gate 610 at the binary ZERO level.

If the output signal from the NOR-gate 610 is a binary ONE, the output signal from the NOR-gate 604 will maintain a binary ZERO output signal and the disabling of the NOR-gate 596 will insure the application of a binary ONE signal at the output terminal 611.

Thus, during the presence of the TRANSFER signal, the output signals from the transfer hold register circuit 230 will be the same as the signal applied to the input terminal 594 from the gate circuit 232. In the absence of a TRANSFER signal, the signals on the terminals 611 are "held" and further changes in the level of the signals applied to the input terminals 594 will be ignored.

As stated in connection with the input interface circuit 220 described in connection with the circuit of FIG. 8, the purpose of the output interface circuit 224 is to convert the voltage levels of the data terminal unit 30 to voltage levels usable by the data set 26 at the satellite station 28 for transmission to the computer 10 at the master station 12. (See FIG. 1).

As shown in FIG. 7, the eight parallel bit data signal D from the transfer hold register circuit 230 of FIG. 18, the timing signal T from from the sync circuit 228 of FIG. 14, and the Data Send signal DS from the delay circuit 164 of FIG. 11 are applied to the output interface circuit 224.

Figure 19:
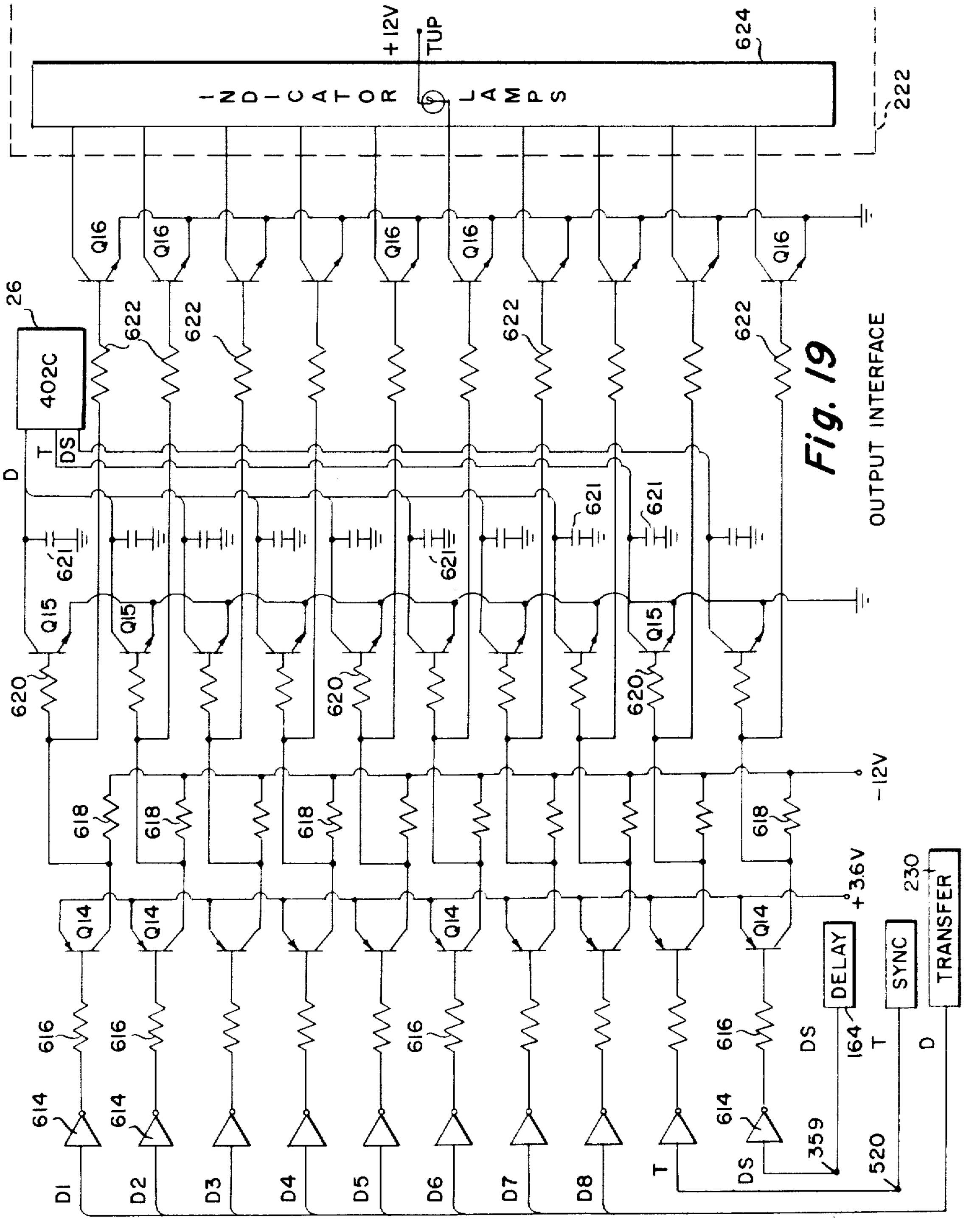
FIG. 19 is a schematic circuit diagram of the output interface circuit of FIG. 7.

Referring now to the output interface circuit 224 illustrated in FIG. 19, these D, T, and DS signals may be applied through an inverter 614 and a resistor 616 to the base electrode to a PNP-transistor Q14. The emitter electrodes of each of the transistors Q14 are connected to a 3.6 volt source of positive potential. The collector electrode of each of the transistors Q14 is biased from a negative 12 volt source through a resistor 618. The collector electrode of each of the transistors Q14 is also connected through resistor 620 to the base electrode of an associated grounded emitter NPN-transistor Q15 and through a resistor 622 to the base electrode of a grounded emitter NPN-transistor Q16. The collector electrode of each of the transistors Q15 is connected to the data set 26. The connection of the collector electrode of each of the transistors Q15 to the data set 26 is isolated from ground by a capacitor 621. The collector electrode of each of the transistors Q16 is connected to a positive 12 volt source through the appropriate one of the indicator lamps 624 in the status board 222 of FIG. 7.

In operation, the application to the base electrode of one of the transistors Q14 of the binary ZERO which results from the inversion follows:

inverter 614 of a binary ONE of the D, T, or DS signals will drive the transistor Q14 into saturation, providing a path for current flow from the plus 3.6 volt source through the collector emitter path of the transistor Q14 and the resistor 618 to the negative 12 volt source. The saturation of the transistor Q14 removes the negative potential applied by the negative 12 volt source through resistors 618 and 620 from the base electrode of the Q15. SEQUENCE-TIMING application this positive going signal Above-described base electrode drives the associated transistor Q15 into saturation, effectively grounding the collector electrode and providing a negative going signal to the data set 26. The positive source (not shown) "setup" electrode of each of the transistors Q15 is provided by the data set 26. The current path from the source within the data set 26 includes a capacitor grounded by the saturation of the appropriate transistor Q15 to adjust the frequency of the output signal of the data transmitter 139 of FIG. 4.

Exemplary values of the various electrical components of the circuit of FIG. 19 are as follows:

| | |
|---|---|
| Transistors Q14 | 2 N 3905 |
| Transistors Q15 | 2 N 2923 |
| Transistors Q16 | 2 N 697 |
| Resistors 618 | 3.6 kΩ |
| Resistors 618 and 622 | 2.2 kΩ |
| Resistors 620 | 3.6 kΩ |
| Capacitor 621 | Adjusted to provide a 300 pf. load to data set including lead capacitance. |

OPERATIONAL SEQUENCE-TIMING DIAGRAMS

Figure 20:
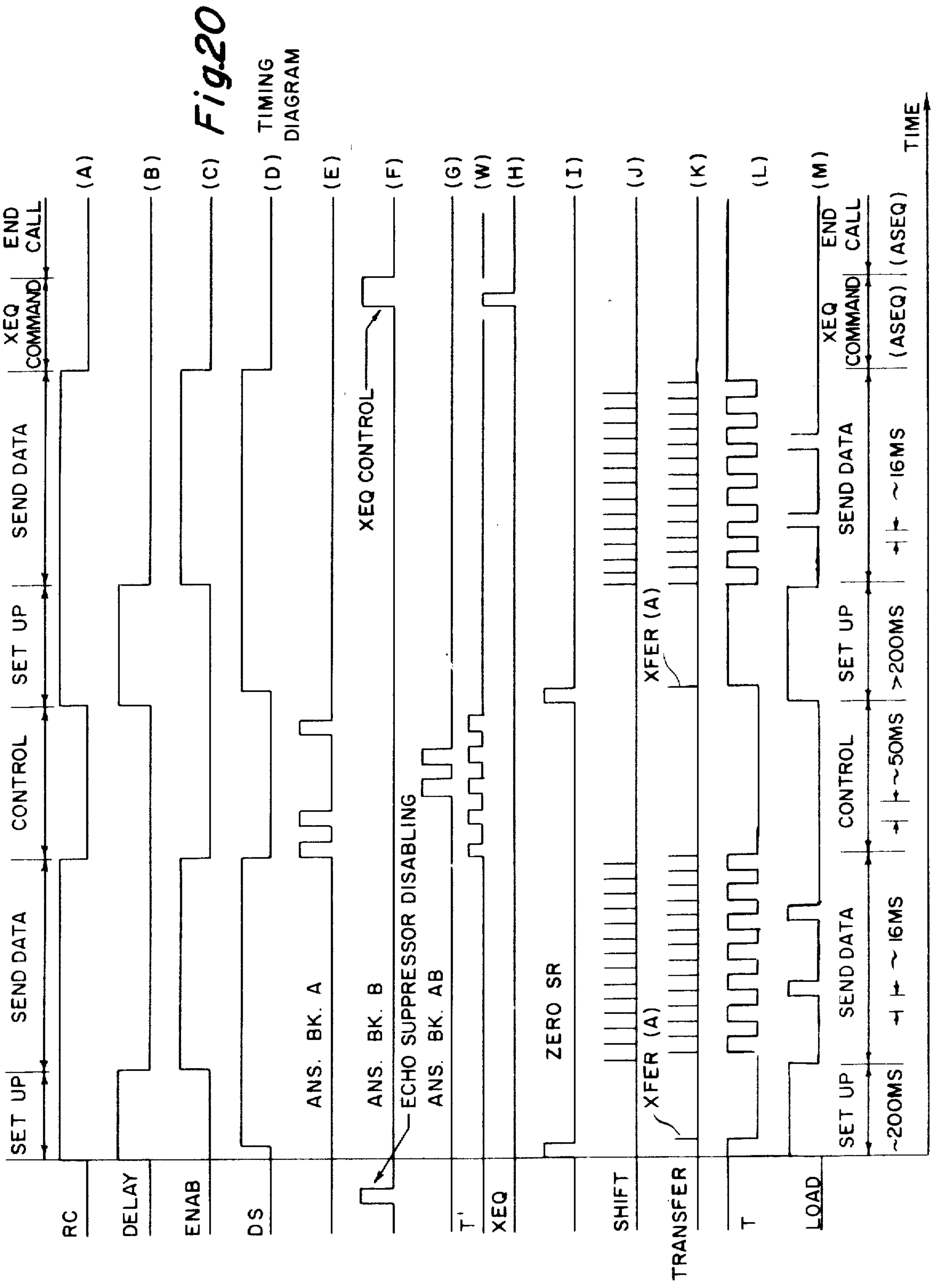
FIG. 20 is a timing diagram illustrating the overall operation of the circuit of FIG. 7.

The operation of the above-described data terminal unit 30 may be summarized by reference to the block diagram of FIG. 7 and to the timing diagram of FIG. 20. As indicated in FIG. 20, the "setup" period is initiated by the computer 10 controlled RC signal (waveform A) which occurs subsequent to the disabling of the telephone line echo suppressors by the ANS BK B signal (waveform F). To prevent the execution of whatever control word happens to be stored in the control accumulator 154 of FIG. 7 by this first ANS BK B signal, the multivibrator 299 of the control logic (see FIG. 9) which generates the XEQ signal (waveform H) is made nonresponsive until after receipt of either the DS (waveform D), ANS BK A (waveform E), or ANS BK AB (waveform G) signals.

During the "setup" period of approximately 204 milliseconds duration, the ZERO SR signal (waveform I) generated by the delay circuit 164 in response to the RC signal input (see FIG. 11) zeros the channel select shift register 170, thereby disabling all of the gate circuits 232–242 of FIG. 7.

The generation of an XFER (A) signal (waveform K) by the delay circuit 164 transfers the ZERO outputs of the disabled gate circuit 232 to the output of the transfer hold register circuit 230.

The DS signal (waveform D) is subsequently generated by the delay circuit 164 in response to the RC signal and the termination of the ZERO SR signal (see FIG. 11). The transmission of the DS signal to the data set 26 operates the Data Send relay DS of FIG. 4 to close the DS–1 relay contacts. Operation of the Data Send relay DS thus switches the data set 26 to the data mode by connecting the data transmitter 130 of FIG. 4 to the telephone lines through contacts M–1 of the Data Mode Receive relay M.

Figure 21:
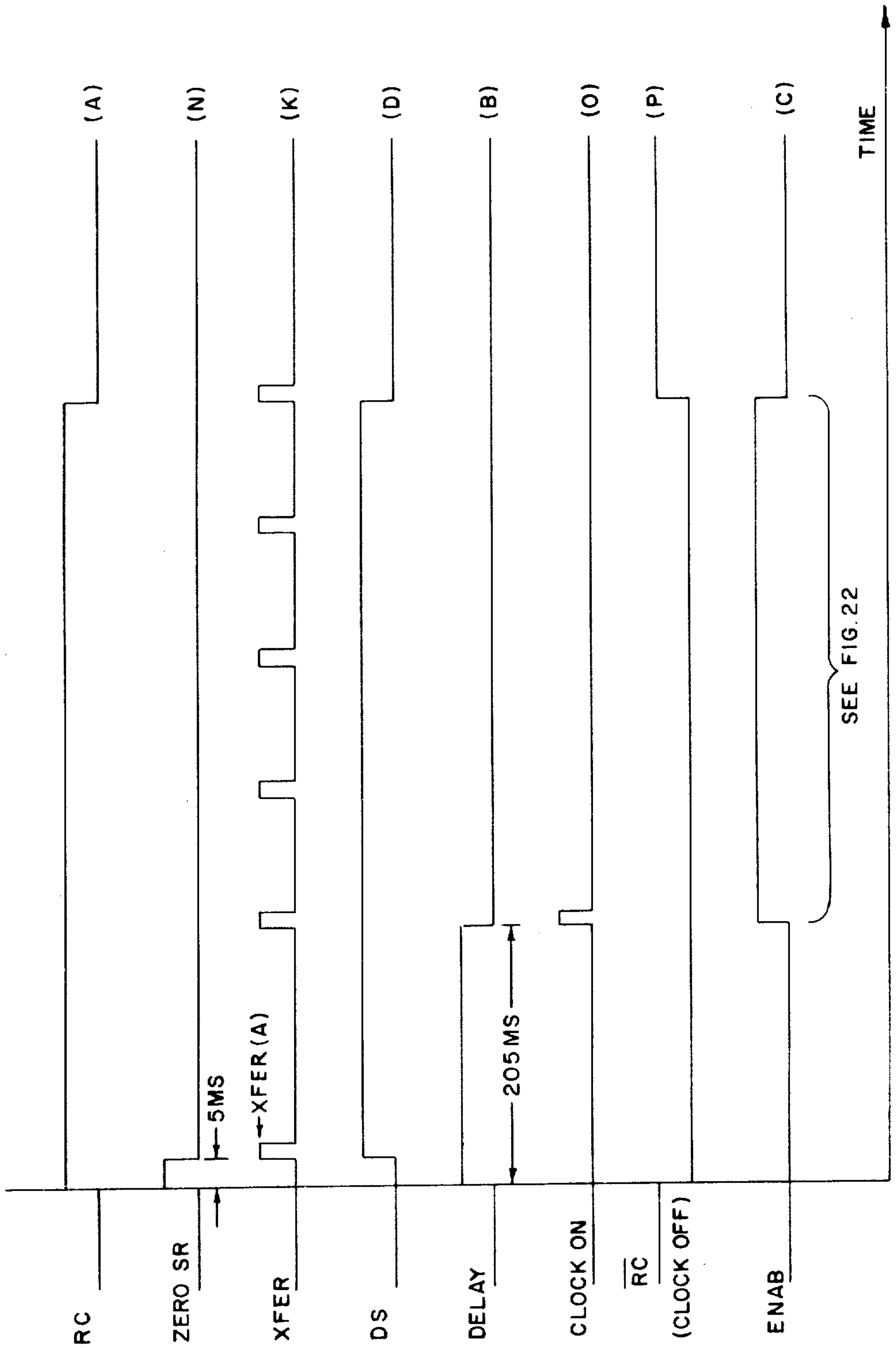
FIG. 21 is a timing diagram of the set up and send data periods of FIG. 20.

A somewhat expanded timing diagram of one "setup" and "control" period of the timing diagram of FIG. 20 is shown in FIG. 21, where like waveforms are like numbered to facilitate an understanding of operation enab the system.

As indicated in FIG. 21, the ENAB signal (waveform C) is commenced by the 1 millisecond duration "clock on" pulse (waveform O) generated by the multivibrator 372 of FIG. 11. The ENAB signal is terminated by the $\overline{RC}$ signal (waveform P) from the NOR-gate 348 of FIG. 11, i.e., the loss of the RC signal (waveform A) by the delay circuit 164.

The end of the "setup" period is marked by the termination of the DELAY signal (waveform B) generated by the multivibrators 360 and 372 of the delay circuit 164 of FIG. 11. The ENAB signal (waveform C) generated by the delay circuit 164 upon the termination of the DELAY signal is applied to the clock 158 where the periodic C and $\overline{C}$ signals (waveforms Q and R) are generated (see FIG. 12). Referring to FIG. 3, the transmission of eight ZERO's by the data set 26 is detected by the All Space gate 90 of the data receiver 54 at the data set 16 to operate the Carrier On relay CO.

During the "setup" period, the data output signal from the transfer hold register current 230 will be maintained in the all zero condition and the reception of the all zero signal by the receiving data set 16 at the master station 12 of FIG. 1 is required before the data set 16 will indicate that it is ready to receive data.

The timing transition caused by the XFER(A) signal which occurs at the same time that the output signal from the transfer hold register circuit 230 is set to zero will not be received by the computer 10 since the data set 12 is not prepared to receive data at that time. The all zero signal is presented to the computer 10 by the data set 16 during the later portion of this 200 millisecond "setup" period but no timing signal will be presented to the computer 10 to effect reading the data.

An all zero signal of data is transmitted after the transmission of the last channel of data and before the retransmission of the data of the first channel. Thus each cycle of data transmission is separated from the one following by the transmission of an all zero signal which may be used by the computer 10 for indexing checks and for security. This all zero signal may, of course, proceed or follow the data channels as desired.

If an initial transmission of all zeros is desired, an additional pulse may be applied to the toggle input terminal of the flip-flop 488 of the signal circuit 228 of FIG. 14 approximately 40 milliseconds after the occurrence of the XFER(A) signal. Alternatively, the C and $\overline{C}$ signals applied from the clock circuit 158 of FIG. 12 to the delay circuit 164 of FIG. 11 may be interchanged.

Referring now to FIG. 22 for an expanded presentation of the "send data" period of FIGS. 20 and 21, the first pulse of the clock signal C (waveform Q) causes the generation of the sync circuit 228 of FIG. 14 of a SHIFT signal (waveform J) which loads the input of the transfer circuit 230 of FIG. 7 with the data stored in the first accumulator.

As indicated in FIG. 22, the loss of the first pulse of the C signal (waveform Q) coincides with the first pulse of the $\overline{C}$ signal (waveform R) and causes a transfer signal TRANSFER (waveform K) to be generated by the sync circuit 228 and applied to the transfer hold register circuit 230 of FIG. 7. The load signal (waveform S) resulting from the condition of the flip-flop 508 of FIG. 14 (waveform X) will be inhibited in the channel select shift register 170.

The first TRANSFER signal causes the data loaded into the input of the transfer hold register circuit 230 by the FIRST SHIFT signal pulse to be moved to the output thereof.

The loss of the TRANSFER pulse causes the one shot 471 of the sync circuit 228 of FIG. 14 to toggle the flip-flop 488 to the opposite binary state causing a timing transition T. Receipt of this T signal by the data set 26 results in the eight bits of data being sampled and the data presented to the computer. The action of the timing signal T depends on its transitions and not its binary state and the signal is illustrated (waveform L) as a binary at the initiation of the zero data period. This timing signal T is fed through the output interface circuit 224 to the data set 26 to cause the transmission of the data contained in the output of the transfer circuit 220 to the data set 16 at the master station 12.

The second pulse of the C signal causes the generation of the second SHIFT signal by the sync circuit 228 which moves the binary ONE loaded into the channel select shift register 170 by the LOAD signal (waveform S) and the first SHIFT signal (waveform J) to the second gate circuit 232 enabling position.

A binary ZERO is also loaded by the LOAD signal (waveform S) into the input of the channel select shift register 170 because of the reset condition of the flip-flop 508 of FIG. 14 (waveform X) when the second SHIFT signal pulse occurs (see FIG. 14). Upon the termination of the second pulse of the C signal, i.e., the second $\overline{C}$ signal pulse, the sync circuit 228 generates the second TRANSFER signal which moves the data from accumulator associated with the second gate circuit 232 from the input of the transfer hold register circuit 230 to the output thereof for subsequent transmission to the data 16 by the timing transition resulting from the termination of this TRANSFER signal.

Each successive C signal pulse (waveform Q) causes the binary ZERO to be loaded into the channel select shift register 170 by the generation of the SHIFT signal (waveform J) pulses and the next gate circuit to be enabled in sequence.

Likewise, each successive $\overline{C}$ signal pulse (waveform R) generates an XFER signal pulse (waveform K) which transfer the data of the enabled gate circuit to the output of the transfer circuit 230. The subsequent timing transition causes the data associated with enabled gate, i.e., that data just transferred to the output of the transfer hold register circuit 230 and thus to the output interface circuit 224, to be transmitted. A binary ZERO is loaded into the channel select shift register 170 on each of the shift signal pulses due to the reset condition of the flip-flop 508.

As indicated in FIG. 20, the termination of the "send data" portion of the system operation and the commencement of the "control" portion begins with the loss of the RC signal (waveform A) under the control of the computer 10. The loss of the RC signal terminates the ENAB signal (waveform C) and the DS signal (waveform D). As shown in FIG. 22, the generation of the clocking signals C and $\overline{C}$ (waveforms Q and R) are inhibited by the loss of the ENAB signal. The loss of the clocking C AND $\overline{C}$ inhibits the generation of further TRANSFER, LOAD, and SHIFT signals by the sync circuit 228 (see FIG. 14).

The computer 10 then may be programmed to cause the generation of ANS BK A signals (waveform E) and ANS BK AB signals (waveform G) which load the control word into the control accumulator 172 of FIG. 7. Each of the bits of the control word require approximately 50 milliseconds for transmission for decoding in the control logic 154 and for insertion into the control accumulator 172. The ANS BK A and ANS BK AB signals are summed to provide timing signal timing signal T (waveform W) which shifts the control accumulator to allow the serial loading thereof by the ANS BK A and ANS BK AB control word bits.

The termination of the "control" period and the reinitiation of the "setup" period commences with the computer 10 controlled generation of the RC signal (waveform A). As earlier explained, the RC signal causes the generation of the DELAY signal (waveform B) of the delay circuit 164 which inhibits the generation of the ENAB signal waveform C) for approximately 205 milliseconds. The RC signal also causes the generation of a (waveform X). Each cycle of the data transmission, i.e., the transmission of the output of one accumulator and the shifting of the channel select shift register 170 by a C signal pulse and the shifting of the data from the accumulator to the output of the transfer circuit 230 by the $\overline{C}$ signal and the loading of the channel select shift register 170 by the C signal pulses, may be repeated 75 times per second at its maximum rate. Slower rates such as 60 data transmissions per second may be used.

As indicated in FIGS. 7 and 14, the enabling of the last gate circuit 242 is accomplished by routing the L. CH. signal from the channel select shift register 170 through the sync circuit 228 where the READ L. CH. signal is generated for application to the last of the gate circuits 242.

The L. CH. signal (waveform U) in addition to causing the generation of the READ L. CH. signal (waveform V), also, as shown in FIG. 14, causes the setting of the flip-flop 508 (waveform X) so that the next subsequent signal (waveform J) will cause the generation of a second pulse in LOAD signal (waveform S).

The generation of the second LOAD signal pulse enables the system to transmit the data from the data accumulator bank 150 two or more times successively without requiring the computer 10 to drop and then to reinitiate the telephone call. It is anticipated that the computer 10 will be programmed to allow the continuous cycling of the data transmission, checking to see if two or more successive data transmissions are identical, at which time the computer 10 may terminate the call or switch the system to the answer back mode for the transmission of commands. ZERO SR signal (waveform) I) by the delay circuit 164 as well as an XFER signal (waveform K) by the sync circuit 238.

The channel select shift register 170 is zeroed by the ZERO SR signal (waveform I) and binary ZERO's are transferred to the output of the transfer circuit 230 by the XFER (A) signal (waveform K). The subsequent generation of the DS signal (waveform D) effects the switching of the data set 26 to the "-data" mode.

The generation of the ENAB signal (waveform C) by the delay circuit 164 upon the termination of the delay signal (waveform B) terminates the "setup" period and commences the second "send data" period. The enabling of the clock 158 by the ENAB signal causes the generation of the periodic C and $\overline{C}$ signals (waveforms Q and R) which in turn cause the loading of a binary ONE into the channel select shift register 170 from the LOAD signal (waveform S) and the sequential enabling of each gate circuit. The termination of each of the C signals, the $\overline{C}$ signal pulses, causes the sync circuit 228 to generate a TRANSFER signal (waveform K) which moves the data from the enabled one of the gate circuits 232–242 from the input of the transfer hold register circuit 230 to the output thereof for subsequent transmission by the timing transition T (waveform L) caused by the cessation of the TRANSFER signal.

The procedure of successively enabling each of the gate circuits 232–242 while transmitting the data of the immediate antecedently enabled gate circuit is repeated as is the transferring of the data from the enabled gate circuit through the transfer circuit 230 by the TRANSFER signal and loading the channel select shift register 170 by the LOAD signal until the data in each of the data accumulators has been retransmitted to and checked by the computer 10.

At the end of the second "send data" period, i.e., the loss of the RC signal (waveform A), the generation of an ANS BK B signal (waveform F) provides the XEQ Control pulse. The XEQ Control pulse causes the generation of the XEQ signal (waveform H) by the control logic 154 which in turn causes the execution of the command word stored in the input of the command shift register 153. The execution of the command and the subsequent ending of the telephone call are asynchronously controlled by the computer 10 and may thus occur at any time that the computer program provides.

The increase in the potential of the base electrode of the transistor Q15 is also felt through the resistor 622 at the base electrode of the associated transistor Q15 driving it into saturation. The conduction of transistor Q16 provides a current path from the 12 volt source of positive potential of the status board 222 of FIG. 7 through the associated indicator lamp 624 to ground. A visual indication of the presence of a signal in that channel at the output interface circuit 224 is thus provided for purposes of maintaining or trouble shooting the data terminal unit 30.

What is claimed is:

1. Apparatus for the remote testing of a plurality of producing oil wells comprising
   - a master station including digital data processing means and control means for selectively generating command signals;
   - a satellite station remote from said master station and including digital data storage means, switch means, a plurality of condition-responsive sensors each remote from said storage means for monitoring production fluid at each of said plurality of oil wells and for generating a digital signal having a frequency related to a condition thereof, circuit means for applying said digital signals to said storage means; and
   - a data transmission system connected between said master station and said satellite station including commercial, voice quality telephone lines and a plurality of commercial telephone switching exchanges for selectively connecting said data processing means at said master station to said data storage means at said satellite station for the selective transmission of data from said data storage means at said satellite station to said data processing means at said master station and for the selective transmission of command signals from said generating means at said master station to said switch means at said satellite station.

2. The apparatus of claim 1 wherein said data transmission system includes bandwidth limiting means, and wherein said master station includes means for generating a bandwidth limiting means disabling signal.

3. The apparatus of claim 2 wherein said satellite station includes means responsive to said bandwidth limiting means disabling signal for retransmitting a bandwidth limiting means disabling signal to said master station.

4. The apparatus of claim 2 wherein said bandwidth limiting means comprises a plurality of echo suppressors spaced along said commercial telephone lines, and wherein the disenabling signals are effective to disable said suppressors.

5. The apparatus of claim 1 wherein said satellite station includes means responsive to commercial telephone dialing signals, and wherein said master station includes means for selectively generating commercial telephone dialing signals.

6. The apparatus of claim 5 wherein the generation of said dialing signals is automatically and periodically instituted by said command signal generating means.

7. The apparatus of claim 1 wherein said sensors are responsive to the temperature, the pressure and the constituency of the production fluid.

8. The apparatus of claim 7 wherein said satellite station includes means responsive to command telephone dialing signals, and wherein said master station includes means for automatically and periodically instituting said command signal generating means.

9. The apparatus of claim 8 wherein said data transmission system includes bandwidth limiting means comprising audio frequency echo suppressors;
   - wherein said master station includes means for transmitting an echo suppressor disabling signal; and
   - wherein said satellite station includes means responsive to said echo suppressor disabling signal for retransmitting an echo suppressor disabling signal to said master station.

10. The apparatus of claim 1 wherein said satellite station digital data storage means includes a plurality of digital accumulators, at least one of said accumulators being responsive to the condition of said switch means.

11. The apparatus of claim 1 wherein said satellite station includes:
   - a gas/liquid separator having both gas and liquid outlet means;
   - means responsive to said switch means for supplying the production fluid from a selected one of said oil wells to said separator; and
   - a net oil analyzer for generating a digital signal related to the constituency of the fluid in said liquid outlet means.

12. The apparatus of claim 11 wherein said satellite station digital data storage means includes a plurality of digital accumulators, at least one of said accumulators being responsive to the condition of said switch means.

13. The apparatus of claim 1 wherein said data storage means includes;
   - a plurality of digital data accumulators; and
   - a multiplexer comprising a transfer circuit, a plurality of gate circuits each connected between one of said accumulators and said transfer circuit for transferring the data in said one accumulator to said transfer circuit when enabled, and a channel select shift register connected to each of said gate circuits for the successive enabling thereof.

14. The apparatus of claim 13 wherein said multiplexer includes recycling means for automatically renewing the successive enabling of said gate circuits.

15. The apparatus of claim 14 including means for disabling said recycling means in response to a command signal from said master station.

16. The apparatus of claim 13 wherein at least one of said accumulators is responsive to a condition of said switch means;

wherein said satellite station includes a gas/liquid separator having both gas and liquid includes: means, means responsive to said switch means for supplying the production fluid from a selected one of said oil wells to said separator, and a net oil analyzer for generating a digital signal related to the constituency of the fluid in said liquid outlet means; and wherein a second one of said accumulators is responsive to said generated digital signal.

17. The apparatus of claim 13 wherein said data transmission system includes bandwidth limiting means;

wherein said master station includes means for generating a bandwidth limiting means disabling signal and means for automatically and periodically generating commercial telephone dialing signals; and wherein said satellite station further includes means responsive to commercial telephone dialing signals.

18. The apparatus of claim 13 wherein said digital data processing means includes: a computer, means for storing the data transmitted from said satellite station, means for displaying said stored data, and circuit means interfacing said computer to said data transmission system.

19. The apparatus of claim 18 wherein said satellite station includes:

a gas/liquid separator having both gas and liquid outlet means;

means responsive to said switch means for supplying the production fluid from a selected one of said oil wells to said separator; and a net oil analyzer for generating a digital signal related to the constituency of the fluid in said liquid outlet means.

20. The apparatus of claim 1 wherein said digital data processing means includes: a computer, means for storing the data transmitted from said satellite station, means for displaying said stored data, and circuit means interfacing said computer to said data transmission system.

21. The apparatus of claim 1 wherein said control means includes means for effecting the generation of six command signals, and wherein said control signals for effecting the transmission of data from said storage means at said satellite station to said data processing means at said master station.

22. The apparatus of claim 21 wherein two of said command signals are utilized respectively as binary mark and space signals and a third of said command signals is utilized to effect execution of the command represented by said mark and space signals.

23. The apparatus of claim 1 wherein said control means includes means for selectively generating three command signals each having different frequencies; and wherein said switch means includes a shift register;

a first one of said command signals loading a binary ONE into said shift register, a second one of said command signals loading a binary ZERO into said shift register, and a third one of said command signals effecting the execution of the command represented by the signals located into said shift register.

24. The apparatus of claim 23 wherein said shift register is clocked responsively to the sum of said first and second command signals.

25. The apparatus of claim 24 wherein said data processing means includes means for comparing commands; and wherein one of said sensors is responsive to said shift register whereby the command in said shift register may be compared with the command generated prior to the execution thereof by said third command signal.

26. The apparatus of claim 1 wherein said digital data storage means comprises:

a plurality of digital data accumulators;

a transfer circuit;

a like plurality of gate circuits each connected between one of said accumulators and said transfer circuit for transferring signals indicative of the digital data accumulated in said one accumulator to the input of said transfer circuit when enabled and for otherwise blocking the transfer of the data from said one accumulator to the input of said transfer circuit;

a channel select shift register connected to each of said gate circuits for the selective enabling thereof; and a source of periodic pulses connected to said transfer circuit and to said channel select shift register for transferring the data in the input of said transfer circuit to the output thereof and for controlling the enabling of said gate circuits by said channel select shift register whereby the data accumulated in each of said accumulators may be selectively gated through the associated one of said gate circuits to the input of said transfer circuit for transfer to the output thereof by said source.

27. The data terminal unit of claim 26 wherein alternative pulses from said source effect the mutually exclusive enabling of one of said gate circuits to transfer the digital data from one of said accumulators to the input of said transfer circuit; and wherein alternative pulses from said source effect the transferring of the digital data from the input to the output of said transfer circuit whereby said accumulators may be successively enabled.

28. The data terminal unit of claim 27 including recycling means for automatically reinstituting the successive enabling of said gate circuits.

29. The data terminal unit of claim 28 including means for selectively disabling said recycling means.

30. The data terminal unit of claim 28 including means for inhibiting the accumulation of data in said accumulators during the period of time in which one of said gates is enabled.

31. The data terminal unit of claim 30 including means for disabling said recycling means in response to remote comparison of the data in at least two successive cycles.

32. The apparatus of claim 26 including means for storing digital command signals in one of said accumulators and switch means for executing said stored command signal, said switch means being enabled only after the one of said gate circuits associated with said one accumulator has been enabled by said channel select shift register and the data contained in said accumulator transferred to the output of said transfer circuit for remote comparison with the command signals intended to have been stored in said one accumulator.

33. The apparatus of claim 26 including:

a second transfer circuit connected between one of said gate circuits and said transfer circuit; and means for transferring the data from said one accumulator to the output of said second transfer circuit whereby said second transfer circuit may be enabled for the transferring of data to the input of said first-mentioned transfer circuit independently of the continued accumulation of data in said one accumulator.

34. The apparatus of claim 1 wherein the transfer of data from said storage means at said satellite station to said data processing means of said master station is asynchronous.

35. A data terminal unit comprising:

a plurality of digital data accumulators;

a transfer circuit;

a like plurality of gate circuits each connected between one of said accumulators and said transfer circuit for transferring signals indicative of the digital data accumulated in said one accumulator to the input of said transfer circuit when enabled and for otherwise blocking the transfer of the data from said one accumulator to the input of said transfer circuit;

a channel select shift register connected to each of said gate circuits for the selective enabling thereof, and a source of periodic pulses connected to said transfer circuit and to said channel select shift register for transferring the data in the input of said transfer circuit to the output thereof and for controlling the enabling of said gate circuits by said channel select shift register whereby the data accumulated in each of said accumulators may be selectively gated through the associated one of said gate circuits to the input of said transfer circuit for transfer to the output thereof by said source.

36. The data terminal unit of claim 35 wherein alternative pulses from said source effect the mutually exclusive enabling of one of said gate circuits to transfer the digital data from one of said accumulators to the input of said transfer circuit; and wherein alternative pulses from said source effect the transferring of the digital data from the input to the output of said transfer circuit whereby said accumulators may be successively enabled.

37. The data terminal unit of claim 36 including recycling means for automatically reinstituting the successive enabling of said gate circuits.

38. The data terminal unit of claim 37 including means for selectively disabling said recycling means.

39. The data terminal unit of claim 37 including means for inhibiting the accumulation of data in said accumulators during the period of time in which one of said gates is enabled.

40. The data terminal unit of claim 39 including means for disabling said recycling means in response to remote comparison of the data in at least two successive cycles.

41. The data terminal unit of claim 35 including means for storing digital command signals in one of said accumulators and switch means for executing said stored command signal, said switch means being enabled only after the one of said gate circuits associated with said one accumulator has been enabled by said channel select shift register and the data contained in said accumulator transferred to the output of said transfer circuit for remote comparison with the command signals intended to have been stored in said one accumulator.

42. The data terminal unit of claim 35 including:

a second transfer circuit connected between one of said gate circuits and said transfer circuit; and means for transferring the data from said one accumulator to the output of said second transfer circuit whereby said second transfer circuit may be enabled for the transferring of data to the input of said first-mentioned transfer circuit independently of the continued accumulation of data in said one accumulator.

43. A data handling system for sequentially connecting a central control station to each of a plurality of satellite stations for monitoring and recording data received from said satellite stations and for transmitting command and command execution signals to control conditions at the satellite station, said central control station and each of said satellite stations being connected by a commercial voice quality telephone transmission channel including commercial telephone switching exchanges whereby each satellite station is called by dialing a telephone at the central control;

said central station comprising register means for recording data received from each satellite station, means for generating command signals and for generating signals for effecting said commands at the satellite station, and means for generating a reverse channel signal at any time during the cycle of communication between said central station and a satellite station;

a data transmission link connecting said central control station to each of said satellite stations comprising a commercial telephone line connected through switching exchanges and having voice quality characteristics; and a plurality of satellite stations remote from each other and from the central control station with each satellite station comprising: a plurality of registers for storing data indicative of conditions detected at said remote station, a plurality of means for varying said conditions, multiplexing means for scanning sequentially the data storage registers, and switching means responsive to the reverse channel signal from said central control station for selectively enabling one of said multiplexing means and said means for varying said conditions.

44. The system as defined in claim 43 wherein said multiplexing means comprises:

a plural channel register with means for sending simultaneously the binary elements in each of said channels;

a separate channel for timing signals generated at said satellite station; and means for supplying said plural channel data and said timing signals into separate terminals connected to said telephone transmission line for simultaneous transmission to said central control station.

45. A method of testing the production of a plurality of remote oil wells comprising:

a. generating a plurality of digital data signals each related to a condition at one of the wells,
b. storing the generated digital data signals at a common location;
c. selectively generating electrical signals at a central station for establishing a voice quality telephonic transmission link including commercially installed transmission lines and switching exchanges between the central station and the common location,
d. generating electrical signals at the central station for transmission over the telephonic transmission link to the common location to effect the selective transmission of the stored digital data signals from the common location to the central station; and
e. visually manifesting the digital data signals received at the central station.

46. The method of claim 45 including the steps of:

inhibiting the storing of the digital data signals during the transmission thereof;

comparing the successive transmission of the stored digital data signals, and retransmitting the stored digital data signals until a predetermined comparison has been made.

47. The method of claim 45 including the step of selectively generating electrical signals at the central station for transmission over the telephonic transmission link to the common location to effect the modification of a condition of one of the wells.

48. The method of claim 45 including the step of transmitting bandwidth limiting means disabling signals in both directions over the telephonic transmission link prior to the transmission of the stored data signals.

49. The method of transferring digital data from a satellite station to a remote master station over commercial, voice quality telephone lines and through a plurality of telephone exchanges comprising the steps of:

a. storing data signals at a satellite station;
b. generating a data transmission enabling signal at the master station,
c. detecting the data transmission enabling signal at the satellite station;
d. generating a periodic signal responsively to the detection of the data transmission enabling signal;
e. successively enabling a plurality of gates responsively to the periodic signal; and
f. transmitting the stored data through the enabled gate responsively to the periodic signal.

50. Apparatus comprising:

a master station including digital data processing means and control means for selectively generating command signals and a disabling signal;

a satellite station remote from said master station and including digital data storage means, switch means, a plurality of condition-responsive sensors each remote from said storage means for generating a digital signal, and circuit means for applying said digital signals to said storage means; and a data transmission system connected between said master station and said satellite station, including bandwidth limiting means responsive to said disabling signal, commercial, voice quality telephone lines, and a plurality of commercial telephone switching exchanges for selectively connecting said data processing means at said master station to said data storage means at said satellite station for the selective transmission of data from said data storage means at said satellite station to said data processing means at said master station and for the selective transmission of command signals from said control means at said master station to said switch means at said satellite station.

51. Apparatus comprising:

a master station including digital data processing means and control means for selectively generating three command signals, two of said signals being utilized respectively as binary mark and space signals and a third of said signals being utilized to effect execution of the command represented by said mark and space signals;

a satellite station remote from said master station and including digital data storage means, switch means, a plurality of condition-responsive sensors each remote from said storage means for generating a digital signal, and circuit means for applying said digital signals to said storage means; and a data transmission system connected between said master station and said satellite station including commercial, voice quality telephone lines, a plurality of commercial telephone switching exchanges for selectively connecting said data processing means at said master station to said data storage means at said satellite station for the selective transmission of data from said data storage means at said satellite station to said data processing means at said master station and for the selective transmission of command signals from said control means at said master station to said switch means at said satellite station.

52. Apparatus comprising:

a master station including digital data processing means and control means for selectively generating command signal;

a satellite station remote from said master station and including a plurality of digital data accumulators, a transfer circuit, a like plurality of gate circuits each connected between one of said accumulators and said transfer circuit for transferring signals indicative of the digital data accumulated in said one accumulator to the input of said transfer circuit when enabled and for otherwise blocking the transfer of the data from said one accumulator to the input of said transfer circuit, a channel select shift register connected to each of said gate circuits for the selective enabling thereof, a source of periodic pulses connected to said transfer circuit and to said channel select shift register for transferring the data in the input of said transfer circuit to the output thereof and for controlling the enabling of said gate circuits by said channel select shift register whereby the data accumulated in each of said accumulators may be selectively gated through the associated one of said gate circuits to the input of said transfer circuit for transfer to the output thereof by said source, switch means, a plurality of condition-responsive sensors, each remote from said storage means for generating a digital signal, and circuit means for applying said digital signals to said storage means; and a data transmission system connected between said master station and said satellite station including commercial, voice quality telephone lines, and a plurality of commercial telephone switching exchanges for selectively connecting said data processing means at said master station to said data storage means at said satellite station for the selective transmission of data from said data storage means at said satellite station to said data processing means at said master station and for the selective transmission of command signals from said control means at said master station to said switch means at said satellite station.

* * * * *